United States Patent
Terlecki et al.

(10) Patent No.: US 12,174,847 B2
(45) Date of Patent: Dec. 24, 2024

(54) SYSTEMS AND METHOD FOR PROCESSING TIMESERIES DATA

(71) Applicant: MongoDB, Inc., New York, NY (US)

(72) Inventors: Pawel Terlecki, Miami, FL (US); Geert Bosch, Brooklyn, NY (US); James Wahlin, Queens, NY (US); Eric Cox, Brooklyn, NY (US); Edward Tuckman, New York, NY (US); Bora Beran, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 17/858,957

(22) Filed: Jul. 6, 2022

(65) Prior Publication Data

US 2023/0037619 A1    Feb. 9, 2023

Related U.S. Application Data

(60) Provisional application No. 63/220,332, filed on Jul. 9, 2021.

(51) Int. Cl.
*G06F 11/00* (2006.01)
*G06F 16/22* (2019.01)
*G06F 16/2458* (2019.01)

(52) U.S. Cl.
CPC ........ *G06F 16/2477* (2019.01); *G06F 16/221* (2019.01); *G06F 16/2246* (2019.01); *G06F 16/2474* (2019.01)

(58) Field of Classification Search
None
See application file for complete search history.

(56) References Cited

U.S. PATENT DOCUMENTS

| | | | |
|---|---|---|---|
| 11,010,223 B2 | 5/2021 | Dasgupta et al. | |
| 2007/0255758 A1 | 11/2007 | Zheng et al. | |
| 2017/0262517 A1 | 9/2017 | Horowitz et al. | |
| 2018/0232459 A1* | 8/2018 | Park | G06F 16/9024 |
| 2018/0300381 A1 | 10/2018 | Horowitz et al. | |
| 2019/0087696 A1 | 3/2019 | Verhoeven et al. | |
| 2020/0050586 A1* | 2/2020 | Pal | G06F 16/148 |
| 2020/0372004 A1 | 11/2020 | Barber et al. | |
| 2020/0387509 A1 | 12/2020 | Florendo | |

(Continued)

OTHER PUBLICATIONS

Jeong et al. A data management infrastructure for bridge monitoring. Proceedings vol. 9435, Sensors and Smart Structures Technologies for Civil, Mechanical and Aerospace Systems 2015; 94350P (2015). pp. 1-16 (Year: 2015).

(Continued)

*Primary Examiner* — Tuankhanh D Phan
(74) *Attorney, Agent, or Firm* — Wolf, Greenfield & Sacks, P.C.

(57) ABSTRACT

In some implementations, events measured at various points in time may be organized in a data structure that defines an event represented by a document. In particular, events can be organized in columns of documents referred to as buckets. These buckets may be indexed using B-trees by addressing metadata values or value ranges. Buckets may be defined by periods of time. Documents may also be geoindexed and stored in one or more locations in a distributed computer network. One or more secondary indexes may be created based on time and/or metadata values within documents.

22 Claims, 32 Drawing Sheets

(56) References Cited

U.S. PATENT DOCUMENTS

| | | |
|---|---|---|
| 2021/0034598 A1 | 2/2021 | Arye |
| 2022/0067980 A1 | 3/2022 | Kletter |
| 2023/0040530 A1 | 2/2023 | Terlecki et al. |
| 2023/0041129 A1 | 2/2023 | Terlecki et al. |
| 2023/0367752 A1 | 11/2023 | Bosch et al. |
| 2023/0367781 A1 | 11/2023 | Bosch et al. |
| 2023/0367801 A1 | 11/2023 | Bosch et al. |

OTHER PUBLICATIONS

MongoDB Manual, https://www.mongodb.com/docs/v4.4 pp. 1-122 (Year: 2020).

Qi M. Digital Forensics and NoSQL Databases, 2014 11th International Conference on Fuzzy Systems and Knowledge Discovery pp. 1-6 (Year: 2014).

\* cited by examiner

```
{ _id: ObjectId(...),
  control: {
    version: 1, // to support versioning
    min: { _id: ..., time: ISOdate("2020-09-09T16:54.04.174Z"), field0: 0.01, ... },
    max: { _id: ..., time: ISOdate("2020-09-09T16:54.04.450Z"), field0: 0.99, ... },
  },
  meta: ...
  data: { _id: { 0: ..., 1: ..., ...},
          time: { 0: ISODate("2020-09-09T16:54:04.174Z"),
                  1: ISODate("2020-09-09T16:54:04.450Z"), ...},
          field0: { 0: 0.99, 1: 0.01,...},
          field1: { 2: "high", 42: "low",...}, // Missing fields are omitted
          ...}
}
```

FIG. 2

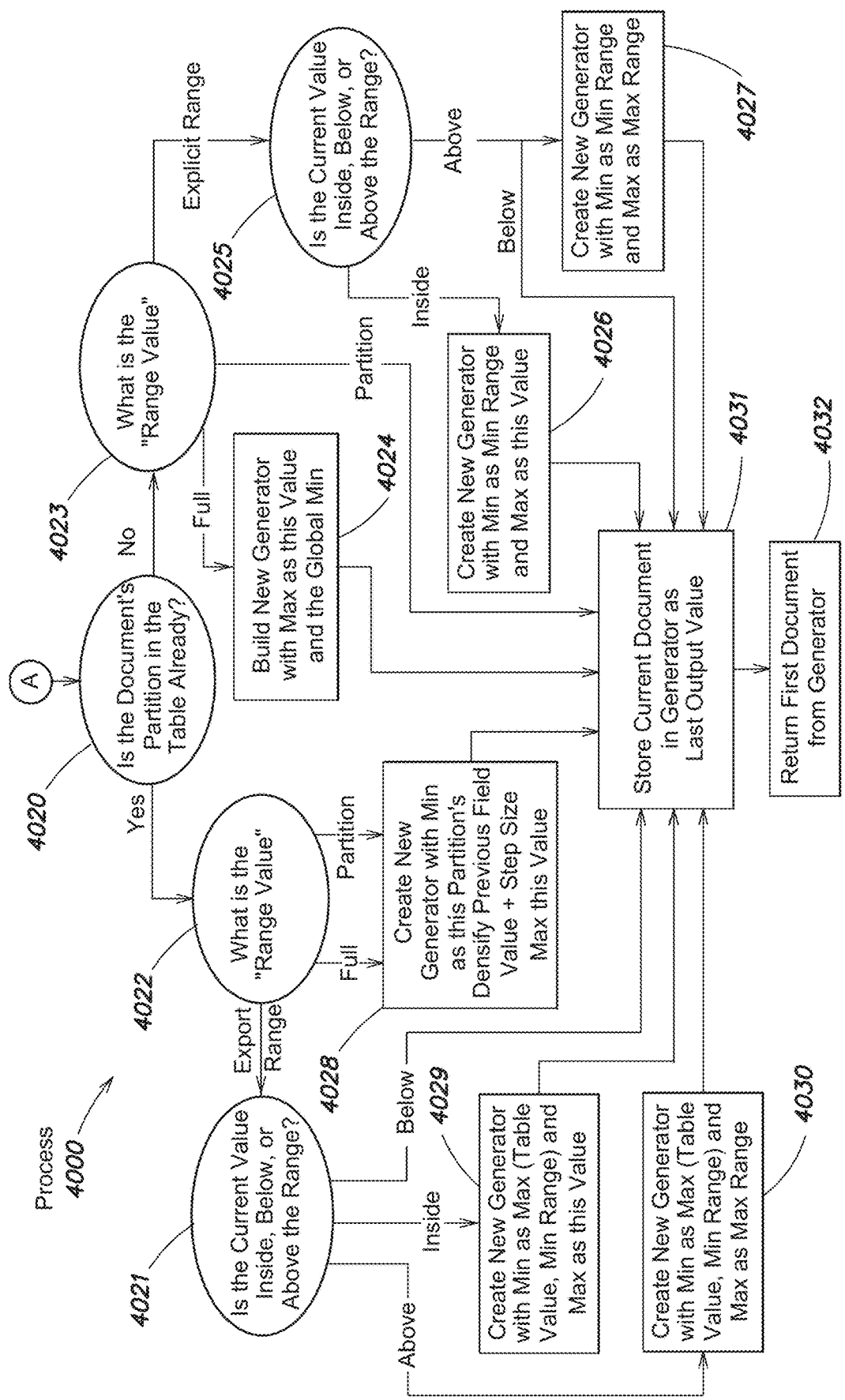

US 12,174,847 B2

SYSTEMS AND METHOD FOR PROCESSING TIMESERIES DATA

CROSS-REFERENCE TO RELATED APPLICATIONS

This application is a Non-Provisional of Provisional (35 USC 119(e)) U.S. Application Ser. No. 63/220,332, filed Jul. 9, 2021, entitled "SYSTEMS AND METHOD FOR PROCESSING TIMESERIES DATA", which is hereby incorporated by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

SUMMARY

According to some aspects described herein, it is appreciated that it would be useful to be able to store timeseries data in a non-relational database format. Timeseries information is used by a number of systems for recording data retrieved over time, such is done in multiple types of systems/industries such as the Internet of Things (IoT), manufacturing, utilities, energy, retail, advertising, E-commerce, financial services, banking, stock brokerages, among others that store and analyze data over time.

Historically, nonrelational database formats such as those provided by MongoDB include NoSQL formats which were previously non-conducive for storing timeseries collections, as many of these formats are based upon documents, not time. Conventionally, timeseries data would be stored natively in an SQL database format or converted to such a format to perform SQL-like functions. In some embodiments described herein, event data may be stored in a data structure defined by documents. It is appreciated also that other document-based databases or other database formats may be modified to or suitably use timeseries information.

In some implementations, events measured at various points in time may be organized in a data structure that defines an event represented by a document. In particular, events can be organized in columns of documents referred to as buckets. These buckets may be indexed using B-trees by addressing metadata values or value ranges. Buckets may be defined by periods of time. Documents may also be geoindexed and stored in one or more locations in a distributed computer network. One or more secondary indexes may be created based on time and/or metadata values within documents.

A number of additional functionalities may be defined that processes elements of the storage format, such as, for example methods for manipulating timeseries data in association with an aggregation pipeline of operations, such as an aggregation pipeline provided in NoSQL systems commercially available from MongoDB. Aggregation pipelines and their operations are more fully described in U.S. Pat. No. 10,366,100, entitled "AGGREGATION FRAMEWORK SYSTEM ARCHITECTURE AND METHOD," filed May 25, 2017, incorporated by reference by its entirety. Using pipelines, the database may create an on-demand materialized view of the data which comprises an independent collection upon which operations can be performed. Further, methods may be provided for sampling data elements over buckets, performing bucket unpacking operations, performing densification operations on data sets, archiving data buckets to cold storage, performing fast deletes of bucket data, performing windowing operations, among other functionalities that can be used with timeseries data.

According to one aspect a system is provided. The system comprises a database engine configured to store, in a database, a plurality of timeseries events as a plurality of documents within a bucket, the database engine being further configured to: store, in a columnar format, the plurality of timeseries events represented by the plurality of respective documents, and index the plurality of timeseries events represented by the plurality of respective documents based on time values.

According to one embodiment the database is a non-relational database comprising the plurality of documents. According to one embodiment the database engine is configured to index the plurality of documents using a B-tree. According to one embodiment the database engine is configured to store a time-based event that is represented by a single logical document. According to one embodiment the database engine is configured to index the plurality of documents.

According to one embodiment the database engine is configured to index the plurality of documents based on a user-defined entity. According to one embodiment the user-defined entity includes metadata values within the plurality of documents, and wherein the metadata values include at least one of the group comprising a data source and a data region. According to one embodiment the database engine is further configured to create an on-demand materialized view of the plurality of documents. According to one embodiment the on-demand materialized view of the plurality of documents is an independent collection of data. According to one embodiment the independent collection of data is created within a pipeline processing stage using at least one pipeline operator.

According to one embodiment each bucket of documents represents data collected at a particular moment of time. According to one embodiment the database engine is adapted to sample the database comprising the plurality of documents within buckets. According to one embodiment the bucket includes a group of measurements each having the same metadata over a limited period of time. According to one embodiment each bucket is indexed with a respective key. According to one embodiment the database engine is configured to perform a random sampling of buckets. According to one embodiment the database engine is configured to perform an unpacking of the bucket using a pipeline operator.

According to one embodiment the database engine is configured to perform windowing operations using window bounds based on time and/or the plurality of documents. According to one embodiment the database engine is adapted to perform a windowing operation that produces an output stage that depends upon a range of input documents defined by the window bounds and a partition key. According to one embodiment the bucket defines a window of a predetermined amount of time. According to one embodiment at least one or more buckets associated with a plurality of windows are overlapping with respect to time. According to one embodiment the database engine is configured to index the plurality of time series events based on geographically-based indices. According to one embodiment the database engine is configured to archive data associated with a selected one or more buckets to a cold storage entity and delete, from a hot storage location, the selected one or more buckets. According to one embodiment the database engine is configured to archive data to a cold storage entity based on one or more parameters based on the documents.

According to one aspect a method is provided. The method comprises storing, by a database engine in a database, a plurality of timeseries events as a plurality of documents within a bucket, the database engine being further configured to perform acts of: storing, in a columnar format, the plurality of timeseries events represented by the plurality of respective documents, and indexing the plurality of timeseries events represented by the plurality of respective documents based on time values.

According to one embodiment the database is a non-relational database comprising the plurality of documents. According to one embodiment, the method further comprises indexing the plurality of documents using a B-tree. According to one embodiment the database engine is configured to store a time-based event that is represented by a single logical document. According to one embodiment, the method further comprises an act of indexing, by the database engine, the plurality of documents based on a user-defined entity. According to one embodiment the user-defined entity includes metadata values within the plurality of documents, and wherein the metadata values include at least one of the group comprising a data source and a data region. According to one embodiment, the method further comprises an act of creating an on-demand materialized view of the plurality of documents.

According to one aspect a system is provided. The system comprises a database engine configured to store, in a database, a plurality of timeseries events as a plurality of documents within a bucket, the database engine being further configured to: store, in a columnar format, the plurality of timeseries events represented by the plurality of respective documents, and to sample the database comprising the plurality of documents within buckets. According to one embodiment the database engine is configured to perform a sampling of buckets. According to one embodiment the database engine is configured to perform a random sampling of buckets. According to one embodiment the database engine is configured to perform an unpacking of the bucket using a pipeline operator. According to one embodiment the plurality of documents are stored in the database as BSON objects. According to one embodiment the database engine is further configured to implement a sampling function as part of an aggregation operation of a BSON database.

According to one embodiment the bucket is constructed by hashing measurements on a predetermined field. According to one embodiment the database engine is further configured to perform a sampling algorithm that causes the database engine to: select a random bucket of a plurality of buckets in the database, place a cursor on the selected random bucket, generate a random integer, determine bucket depth, and if the random integer is determined to be less than the bucket depth, mark a sampling iteration as a miss and move the cursor to the next bucket for sampling, if the random integer is determined not to be less than the bucket depth, extract a sampled element from selected bucket, and place the sampled element in an output sample set. According to one embodiment the database engine is further configured to eliminating duplicate samples from a sampled data set. According to one embodiment the database engine is configured to determine a duplicate sample based on a determined hash value of a bucket and an associated measurement. According to one embodiment the database engine is configured to determine the depth of a bucket by inferring an upper and lower bound. According to one embodiment the database engine is configured to determine an average bucket fullness of a plurality of buckets associated with the database.

According to one embodiment the database engine is configured to implement a sampling algorithm based on the determination of average bucket fullness. According to one embodiment the database is a non-relational database comprising the plurality of documents. According to one embodiment the database engine is configured to store a time-based event that is represented by a single logical document. According to one embodiment the database engine is further configured to create an on-demand materialized view of the plurality of documents. According to one embodiment the on-demand materialized view of the plurality of documents is an independent collection of data. According to one embodiment the independent collection of data is created within a pipeline processing stage using at least one pipeline operator. According to one embodiment each bucket of documents represents data collected at a particular moment of time. According to one embodiment the database engine is adapted to sample the database comprising the plurality of documents within buckets. According to one embodiment the bucket includes a group of measurements each having the same metadata over a limited period of time.

According to one aspect a method is provided. The method comprises storing, by a database engine in a database, a plurality of timeseries events as a plurality of documents within a bucket, the database engine being further configured to perform acts of: storing, in a columnar format, the plurality of timeseries events represented by the plurality of respective documents, and sampling the database comprising the plurality of documents within buckets.

According to one embodiment, the method further comprises performing, by the database engine, a sampling of buckets. According to one embodiment, the method further comprises performing, by the database engine, a random sampling of buckets. According to one embodiment performing an unpacking of the bucket using a pipeline operator. According to one embodiment, the method further comprises an act of storing the plurality of documents in the database as BSON objects. According to one embodiment implementing a sampling function as part of an aggregation operation of a BSON database. According to one embodiment, the method further comprises an act of constructing a bucket responsive to hashing measurements on a predetermined field. According to one embodiment, the method further comprises an act of performing a sampling algorithm that causes the database engine to perform acts of: selecting a random bucket of a plurality of buckets in the database, placing a cursor on the selected random bucket, generating a random integer, determining bucket depth, if the random integer is determined to be less than the bucket depth, marking a sampling iteration as a miss and move the cursor to the next bucket for sampling, if the random integer is determined not to be less than the bucket depth, extracting a sampled element from selected bucket, and place the sampled element in an output sample set. According to one embodiment, the method further comprises an act of eliminating duplicate samples from a sampled data set. According to one embodiment, the method further comprises an act of determining a duplicate sample based on a determined hash value of a bucket and an associated measurement.

According to one aspect a system is provided. The system comprises a database engine configured to store, in a database, a plurality of timeseries events as a plurality of documents within a bucket, the database engine being further configured to: store, in a columnar format, the plurality of timeseries events represented by the plurality of respective documents; and perform an unpacking of the bucket using a pipeline operator.

According to one embodiment the database engine is configured to unpack one or more of the plurality of timeseries events from the bucket. According to one embodiment the database engine is configured to identify one or more buckets of a data collection identified in the database to unpack. According to one embodiment the database engine is configured to unpack the one or more of the plurality of timeseries events from the bucket one event at a time. According to one embodiment the database engine is configured to inspect a top-level data region of the bucket based on field names and wherein the database engine is further configured to construct a list of events to unpack from the bucket. According to one embodiment the database is a non-relational database comprising the plurality of documents. According to one embodiment the database engine is configured to store a time-based event that is represented by a single logical document. According to one embodiment the database engine is configured to create an on-demand materialized view of the plurality of documents responsive to an unpacking event. According to one embodiment the on-demand materialized view of the plurality of documents is an independent collection of data. According to one embodiment the independent collection of data is created within a pipeline processing stage using at least one pipeline operator. According to one embodiment the bucket includes a group of measurements each having the same metadata over a limited period of time.

According to one aspect a method is provided. The method comprises storing, by a database engine in a database, a plurality of timeseries events as a plurality of documents within a bucket, the database engine being further configured to perform acts of: storing, in a columnar format, the plurality of timeseries events represented by the plurality of respective documents, and performing an unpacking of the bucket using a pipeline operator.

According to one embodiment, the method further comprises an act of unpacking one or more of the plurality of timeseries events from the bucket. According to one embodiment, the method further comprises an act of identifying one or more buckets of a data collection identified in the database to unpack. According to one embodiment, the method further comprises an act of unpacking the one or more of the plurality of timeseries events from the bucket one event at a time. According to one embodiment, the method further comprises an act of inspecting a top-level data region of the bucket based on field names and constructing a list of events to unpack from the bucket.

According to one embodiment the database is a non-relational database comprising the plurality of documents. According to one embodiment, the method further comprises an act of storing a time-based event that is represented by a single logical document. According to one embodiment, the method further comprises an act of creating an on-demand materialized view of the plurality of documents responsive to an unpacking event. According to one embodiment the on-demand materialized view of the plurality of documents is an independent collection of data. According to one embodiment the independent collection of data is created within a pipeline processing stage using at least one pipeline operator. According to one embodiment the bucket includes a group of measurements each having the same metadata over a limited period of time.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 2 shows an example schema that may be used to store timeseries data;

FIG. 40A-40B shows a detailed densification process according to various embodiments.

DETAILED DESCRIPTION

As discussed, various aspects relate to storing timeseries data in non-relational database formats such as NoSQL. In some embodiments, timeseries event information is stored as a discrete document within a database. The database may be arranged in buckets which represent periods of time in which the events occur, and therefore the documents are collected within the buckets. The documents may include timestamp information as well as one or more metadata values (e.g., a key-value pair) which can be defined that describe the timeseries. For instance, in the case of an IoT device, one or more measurements may be stored as metadata within a particular document that represents the event. Measurement data associated with measured values during events (and are stored in documents) may include key-value pairs observed at a specific time (e.g., by an IoT device). A compilation of measurement data may be stored as a timeseries defined as a sequence of measurements over time.

Further, a bucket may be defined which includes a number of measurements having the same metadata types measured over a limited period of time. A bucket collection may be defined that is used for storing multiple buckets in a time series collection. In some embodiments, database operations such as replication, sharding, and indexing may be performed at the level of buckets in the bucket collection.

Buckets may be stored in a columnar format and may be indexed by a B-tree for easy retrieval. Further, the data structure may be indexed based on time and/or one or more metadata values within the documents. Further, as discussed, one or more pipeline operators may be used to perform operations associated with the timeseries data. In some embodiments, an on-demand materialized view that comprises an independent collection of data may be operated on by the system using one or more pipeline operators and/or stages.

Figure 1:
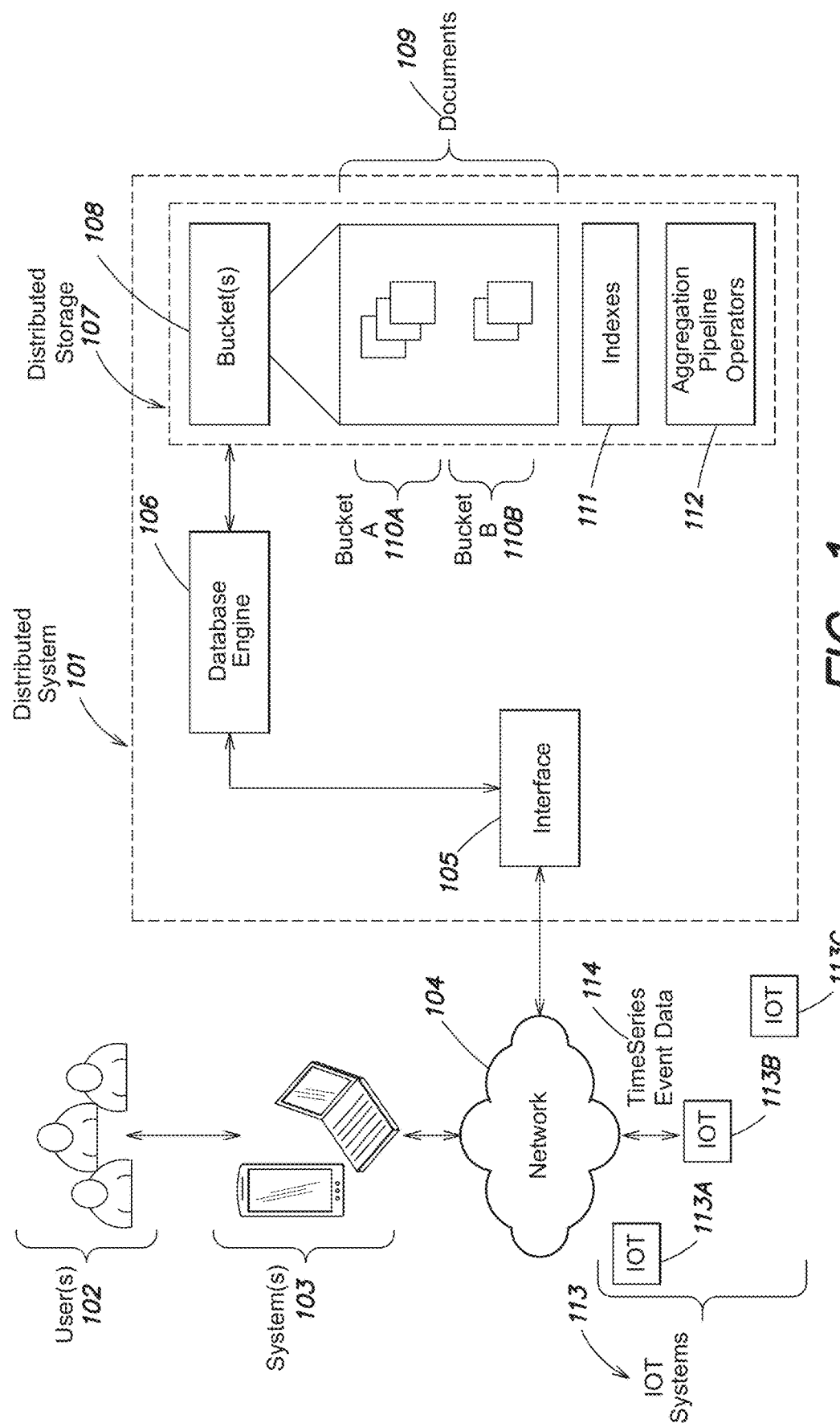
FIG. 1 shows a block diagram of an example distributed database system that may be used to store timeseries data, according to some embodiments.

FIG. 1 shows a block diagram of an example distributed database system 101 that may be used to store timeseries data, according to some embodiments. In particular, a distributed system 101 is provided that includes a number of components coupled to one or more networks (e.g., network 104). Distributed system 101 fulfills one or more database operations requested by one or more systems 103 which may be, in some embodiments, in turn operated by one or more users 102 or other entities. For instance, in some examples, applications running on end user devices may be programmed to use a database for underlying data management functions. It should be appreciated that other systems, applications, client systems, or other entities may use database services.

In some embodiments as described herein, one or more data sources may generate timeseries event data 114 which is then processed and stored by database engine (e.g., database engine 106). For example, timeseries data may be generated by one or more systems such as those that may typically create event data such as in the manufacturing, financial services, or other types of systems. In some embodiments, one or more IoT systems (e.g., systems 113 (elements 113A-113C)) may generate events which are stored within the distributed system 101. For example, it is appreciated that there may be a number of systems that can generate and store timeseries data that may be stored by distributed system 101, and various embodiments are not limited to any particular number or type of data generating systems.

Timeseries event data is passed to the distributed system 101, received by an interface (e.g., interface 105) and forwarded to a database engine 106 which is configured to perform one or more database operations. Database engine 106 may include a number of elements including processors, elements such as routers, or other elements. Database engine 106 may include any entity related to storing data, may include hardware and/or software. In some embodiments, the database engine may include one or more processes and one or more storage entities that manage and store database entities such as documents. In some embodiments, the database engine may include a modified mongod process (commercially available from MongoDB) that is executed by a processor. Data is stored in a distributed storage entity 107 which includes one or more systems and/or storage elements.

In some embodiments, a logical structure is defined referred to herein as a bucket (e.g. bucket 108) which defines a period of time in which event data may be stored. Storage 107 may store one or more buckets (e.g., bucket A (element 110A), bucket B (element 110B)). These buckets may contain one or more documents 109 that correspond to event data collected from one or more systems. Further, system 101 may include one or more indexes used to index timeseries data, one or more pipeline operators used to perform operations on timeseries data, and other elements used to facilitate timeseries operations (e.g., windowing commands).

FIG. 2 shows as an example schema format that may be used to store timeseries data in a bucketized format. For example, the _id is chosen by the database server and is an ObjectId. The control field is an object that includes the version number as well as min and max fields that hold the minimum and maximum value of each field as determined by a BSON comparison order, taking into account any specified collation. The minimum/maximum of two BSON documents or of two arrays is the field-by-field minimum or maximum. The meta field may be of any BSON type and contains either the value of the metaField field as specified at collection creation time, or null if that field is absent. This means that measurements with explicit null metadata and absent metadata will be placed into the same bucket. Measurements with an equal meta field (ignoring field order, and not considering collation) are included in the same bucket. The data field is an object that contains a nested object for each field present in any of the inserted measurements. These nested objects have field names that are decimal string representations of an incrementing counter starting at "0", reflecting the number of measurements inserted so far.

As discussed, by defining timeseries data as a collection of buckets and associated documents, other operations and functions may be performed on this timeseries data. For example, methods may be provided for sampling data elements over buckets, performing bucket unpacking operations, performing densification operations on data sets, archiving data buckets to cold storage, performing fast deletes of bucket data, performing windowing operations, among other functionalities that can be used with timeseries data.

Figure 3:
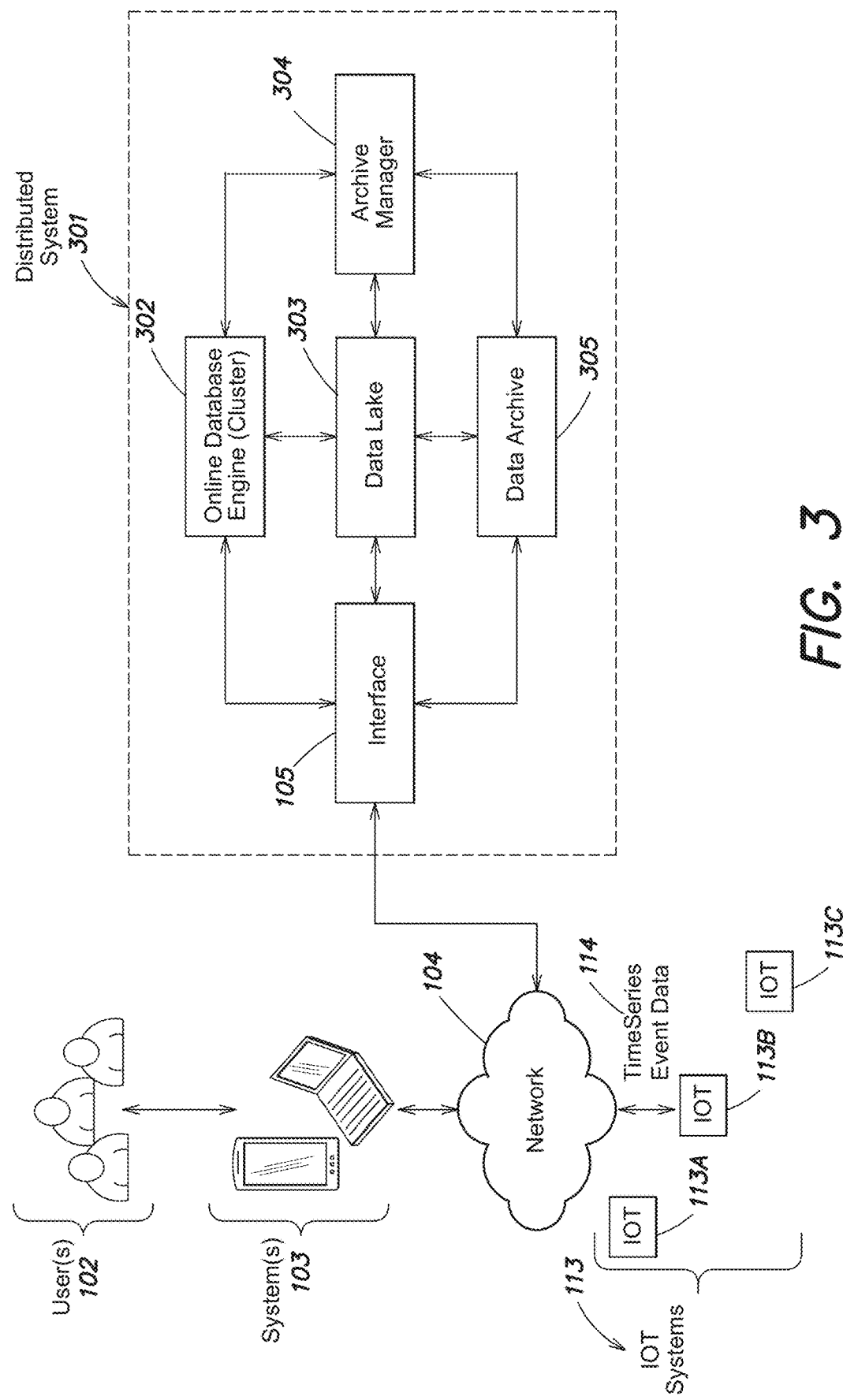
FIG. 3 shows an example distributed system that may be used to store and archive timeseries data.

FIG. 3 shows an example distributed system that may be used to store and archive timeseries data in accordance with various embodiments. In some embodiments, it is appreciated that timeseries data may be stored in one or more systems and databases, and in some embodiments, timeseries data may be more intelligently archived to long term (or cold) storage. Some implementations are described in U.S. patent application Ser. No. 17/341,896 filed Jun. 8, 2021, incorporated by reference by its entirety.

FIG. 3 shows a block diagram of an example distributed database system 301 according to some embodiments. In particular, a distributed system 301 is provided that includes a number of components coupled to one or more networks (e.g., network 104). Distributed system 301 fulfills one or more database operations requested by one or more systems 103 which may be, in some embodiments, in turn operated by one or more users 102 or other entities. For instance, in some examples, applications running on end user devices may be programmed to use a database (e.g., a DaaS) for underlying data management functions. It should be appreciated that other systems, applications, client systems, or other entities may use database services. As discussed, the system may be configured to store and process timeseries data generated by one or more systems (e.g., timeseries event data generated by IoT systems 113).

In some embodiments, distributed system 301 includes a hot-storage-type database as well as a cold-storage-type database for fulfilling database requests. In one embodiment, the distributed system provides a single access interface 105 performing database operations on both types of databases. In some examples, the online database is a DaaS-type database and may include, for example, cluster-based system. Online database engine 302 may be provided that performs read and write operations to storage entities configured in a database cluster (e.g., a cluster-based database such as the ATLAS database commercially available from MongoDB).

In some embodiments, an archive manager (e.g., archive manager 304) is provided that controls how data is archived from the online database to a data archive (e.g., data archive 305). In some implementations, the data archive may be implemented as cloud-based storage elements. For example, the data archive may use data buckets defined on S3 to create one or more archives associated with an online database. In some embodiments, a capability is provided for archiving data by the database management system that reduces management effort on behalf of application creators. In some embodiments, an archive manager 304 is provided that automatically archives data from an online database to an off-line database while maintaining a single point of interface to the database. In this manner, archiving operations are transparent to end user applications.

Further, a database may be provided that fulfills data read operations from one or more hot and cold data sources. In some embodiments, a data lake (e.g., data lake 303) is provided that provides a single view of offline and online storage. As is known, data lakes generally have the ability to store both structured and unstructured data. In some embodiments, the data lake may service read operations that reference an online database. In some embodiments, the database is a DaaS-based database that implements online storage using a cluster of nodes (e.g., online database (cluster) 302). Further, the data lake services read operations to a data archive (e.g., data archive 305, such as for example, one or more S3 databuckets). In some embodiments, the data lake may be used as a single view of online cluster data and archive data.

Managing the lifecycle of time series data is an important aspect to time series customers and their workloads. The inventors appreciate that time series data will often exponentially grow to large volumes quickly and lead to considerable performance degradation and increased costs without action and planning from the user.

Users who process time series data have a few primary options when it comes to managing their data lifecycle often based on how long they wish or need to maintain data. Users can continue to scale, vertically or horizontally as their data volume grows and they choose to maintain that data in hot storage. Additionally, users can choose, if their requirements allow, to delete data directly from hot storage. Lastly, users can choose to age out data by archiving older data and keep only the freshest or most frequently accessed data stored in their active cluster.

Figure 4:
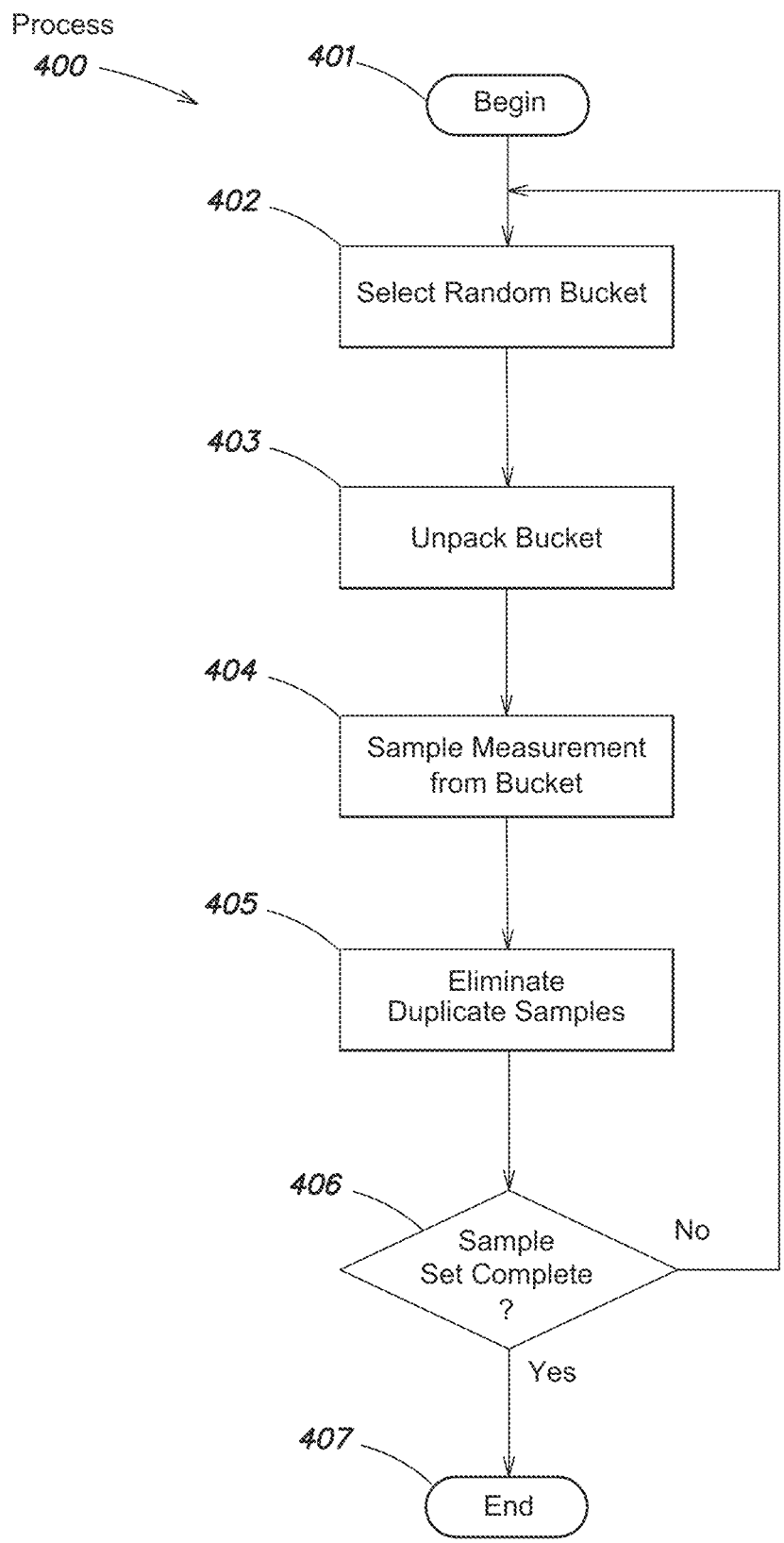
FIG. 4 shows an example process used to sample bucket data according to various embodiments.

To implement a timeseries data storage system, it is noted that the following should be considered:

Data tiering via archiving is considered important for most time series users as it is often impossible to simply delete older data due to many reasons such as legal/user requirements and the analysis period for which data is needed to be aggregated over time Without Online Archive users face:
An increase in costs to scale for storing data that is rarely used, but cannot be deleted
A decrease in read operation performance over large data sets as data rapidly grows Example Implementations The following example is implemented in a MongoDB Atlas online archive database. In some embodiments, timeseries support is provided for users to create, manage and process timeseries data within a non-relational database. Some of the implementations may have some of the following behaviors, either alone or in combination with other functionality:

Users are able to configure an Online Archive in the MongoDB Online Archive Atlas UI
When entering a Namespace, a user should be able to specify a Time Series Collection non-materialized view
Currently, client-side validation rules allow users to specify a Namespace for a view
Currently, Online Archive prevents users from archiving a view at runtime because of the lack of a UUID and provides the error message: Error starting archive: error finding collection uuid: unexpected value '<nil>' for 'firstBatch[0].info.uuid'
Online Archive is configured to recognize if a Namespace specified is a Time Series Collection non-materialized view
Chosen Option: Users will tick a "Time Series" collection toggle to indicate the collection type and determine Online Archive behavior
Online Archive implements the ability to archive documents from Time Series Collection non-materialized views by using the UUID of the underlying systems bucket collection
Online Archive allows Time Series Collection non-materialized views to be archived, and continue to not support the archive of views for general collections In some implementations, Atlas Online Archive archives individual documents and not
Time Series Collection buckets (although in some implementations, bucket could be archived)
Online Archive issues read operations on Time Series Collections like any other client, queries executed on a Time Series Collection should be issued to the non-materialized view specified as the Namespace by the user
The MongoDB Server will execute Online Archive queries issued to the non-materialized view on the underlying system.buckets.foo collection and the internal $unpackBucket stage will return individual documents
In some implementations, data should be archived in Parquet rather than JSON (e.g., using the BSON-⇔Parquet library). Other formats may be used, however.
A user should not be able to specify "Custom Criteria" when they have chosen a Time Series Collection Namespace
Client-side validation may require a user utilizing a Time Series Collection to use a ISODate type field. (Customers cannot use "Custom Criteria" or other date formats with Time Series Collections)
A validation error message may be displayed to the user when attempting to proceed: error Custom Criteria not allowed for timeseries collections
Atlas Online Archive may be configured to delete data that is ready for archive in a user's active cluster by deleting entire buckets directly from the system.buckets collection
The decision to store individual documents in Atlas Data Lake instead of the buckets that the MongoDB Server stores can be accomplished based on the following advantages related to storing buckets:
Faster outputting, entire buckets without unwinding
There may be a way to take advantage of the (partial) columnar representation in case $out targets an external columnar format Bucket Sampling Also, it may be desired to sample timeseries data for the purpose of determining certain attributes regarding the measurement data. Samples are critical for understanding flexible schemas of document collections. They can also be used for other purposes, including cardinality estimation. FIG. 4 shows an example process used to sample bucket data according to various embodiments. At block 401, process 400 begins. At block 402 the system selects a random bucket from the collection to be sampled. For instance, this may be accomplished using one or more randomization functions provided by the system.

At block 403, the system unpacks the bucket, and at block 404 sample measurement is taken from at least one document within the bucket. It should be appreciated that this process can involve accidentally sampling duplicate entries, therefore a system and process may be provided for eliminating duplicate samples such as at block 405. For instance, sampled items can be tracked and if selected again, the system may proceed without performing a duplicate sample. At block 406, it is determined whether the sample set is complete. If yes, process 400 ends at block 407. If not, the system proceeds to select another random bucket at block 402.

As discussed in more detail below, some aspects relate to an ARHASH algorithm that speeds up sampling over buckets preserving desirable statistical properties.

Fast Random Sampling for Timeseries Collections Using ARHASH

In some embodiments, a NoSQL (e.g., non-relational) database may be modified to support for time series collections. MongoDB tools such as Compass, BI Connector, and Charts rely on $sample to sample collections in order to present views to the user or infer schema information from sampled documents in collections. To support $sample of time series collections in these types of products (and for users interested in sampling time series collections) it would be beneficial to have a way to efficiently generate random samples without replacement for time series collections.

According to some embodiments, a random sampling algorithm called ARHASH may be adapted to implement $sample pushdown for time series collections. The new ARHASH-based algorithm as described herein shows a significant speed improvement over the current implementation and in some cases a 300× speedup.

Time Series Collections

According to some embodiments, time series collections are implemented as non-materialized views that are backed by a system level collection that store "buckets". A user can create a time series collection by issuing a createCollection command with TimeseriesOptions,

```
db.createCollection("point_data", {
    timeseries: {
        timeField: "time",
        metaField: "tags"
    }
})
```

Buckets hold multiple pivoted time series measurements where each measurement field _id, time, A, and B are stored in a BSONObj column since the metaField is the same for each pivoted measurement, tags are only stored once. As an example, suppose we insert three measurements into the point_data collection,

```
{_id: 1, time: ISODate("2020-01-01T10:00:00.000Z"), tags: {tag1: 'foo', tag2: 'bar'}, A: 1, B: 2}
{_id: 2, time: ISODate("2020-01-01T10:10:00.000Z"), tags: {tag1: 'foo', tag2: 'bar'}, A: 2}
{_id: 3, time: ISODate("2020-01-01T10:20:00.000Z"), tags: {tag1: 'foo', tag2: 'bar'}, A: 3, B: 4}
```

Each measurement is pivoted into a bucket according to the data in the metaField specified during collection creation, in this case the metaField is tags and because, in the example, each measurement has the same data for tags the buckets collection stores all three entries in a single bucket. Each measurement field aside from the metadata value will be pivoted into columns stored as a BSONObj indexed by a "row key" which is a zero-based null-terminated decimal string.

```
{control: {...},   // control stores min/max values for time, _id, A, B.
 meta: {tag1: 'foo', tag2: 'bar'},
 data: {
    time: {
       "0": ISODate("2020-01-01T10:00:00.000Z"),
       "1": ISODate("2020-01-01T10:10:00.000Z"),
       "2": ISODate("2020-01-01T10:20:00.000Z")
    },
    _id: {        A: {          B: {
       "0": 1,       "0": 1,       "0": 2
       "1": 2,       "1": 2,       "2": 4
       "3": 3        "2": 3        }
    }             }
 }
```

Notice that in the example the bucket compresses the missing B value from the measurement with row key "1". Another important detail that is helpful is that the time column is non-sparse. This is due to the fact that, in some embodiments, the timeField is required for each measurement, and we can use this knowledge to determine how many measurements (bucketDepth) in a given bucket.

In some implementations, the time series collection view is backed by a new stage called $_internalUnpackBucket. This new $_internalUnpackBucket stage unpacks all measurements in a given bucket from the system.buckets.X collection where X is the name of the time series collection. For example, an $_internalUnpackBucket stage can be used in pipelines with $sample and other stages. For example, if one wishes to extract a random sample of size 100 from a time series collection all the user needs to do run the following aggregation pipeline against their collection:

```
> db.point_data.explain( ).aggregate([{$sample: {size: 100}}])
{
   "explainVersion" : "1",
   "queryPlanner" : {...},
   "command" : {
      "aggregate" : "system.buckets.point_data",
      "pipeline" : [
         {
            "$_internalUnpackBucket" : {
               "timeField" : "time",
               "metaField" : "tags",
               "bucketMaxSpanSeconds" : 3600,
               "exclude" : [ ]
            }
         },
         {
            "$sample" : {
               "size" : 100
            }
         }
      ],
      "cursor" : {
      },
      "collation" : {
         "locale" : "simple"
      }
   },
   "serverInfo" : { ... },
   "serverParameters" : {...},
   "ok" : 1
}
```

In the explain output, it can be seen that the pipeline is rewritten to have an $_internalUnpackBucket stage at the front of the pipeline followed by a $sample. If this pipeline were to run by itself, it would unpack each bucket in the db.point_data collection and run top-k sorting and choose the first 100 ranked measurements for the sample set. Now imagine that the collection stored millions of measurements and the system runs the top-k algorithm for this small sample size. The top-k sorting algorithm will materialize every single measurement in the collection only to select the top 100 ranked measurements and discard all other BSONObjs.

For better performance, it would be beneficial to find a suitable algorithm that will have the following characteristics:

Only extract measurements that will participate in the final sample.

All measurements must be equally likely to be selected according to a uniform random distribution.

It should be simple and adaptable to sample the time series bucket format.

The inventors appreciate that an old algorithm called ARAHSH was originally designed to generate random samples from hash files on disk in relational database systems. It is appreciated that a similar algorithm can be used for sampling documents representing timeseries collections. In particular, as discussed below, an ARHASH algorithm described here (called "ARHASH") is suited to sample a bucket format as described herein. In some embodiments, buckets are treated as hash table buckets where each bucket is built by hashing measurements on the metaField. Given this symmetry between buckets and hash files, according to some embodiments, it was determined that ARHASH may be used for implementing fast random sampling of time series collections.

ARHASH

The ARHASH algorithm as described below is an iterative algorithm that attempts to extract a measurement from a random bucket repeatedly until it successfully builds a sample of the target sample size, m. It should be appreciated that the algorithm performs roughly O(m) work instead of doing roughly O(n*log n) work during top-k sorting where n is not the sample size, but rather n the number of measurements in the collection.

ARHASH by Example

Figure 10:
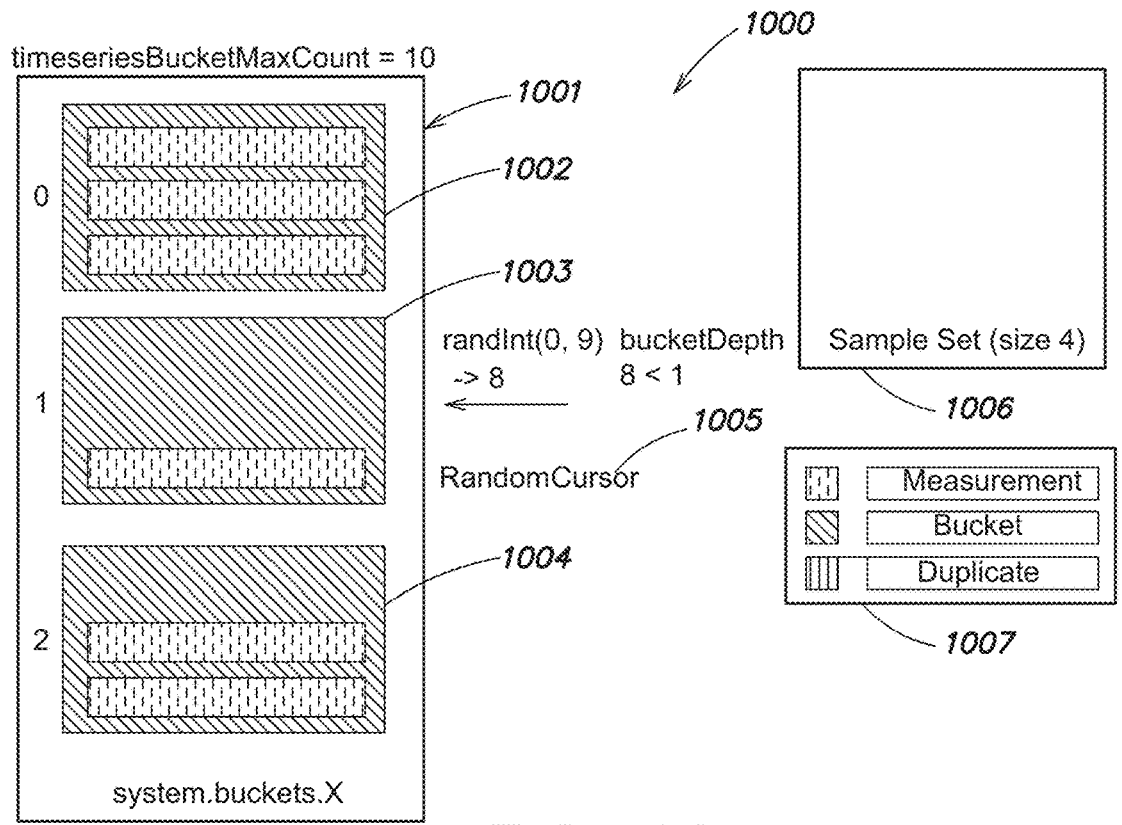
FIG. 10 is a block diagram showing a bucket sampling algorithm according to various embodiments.
Figure 11:
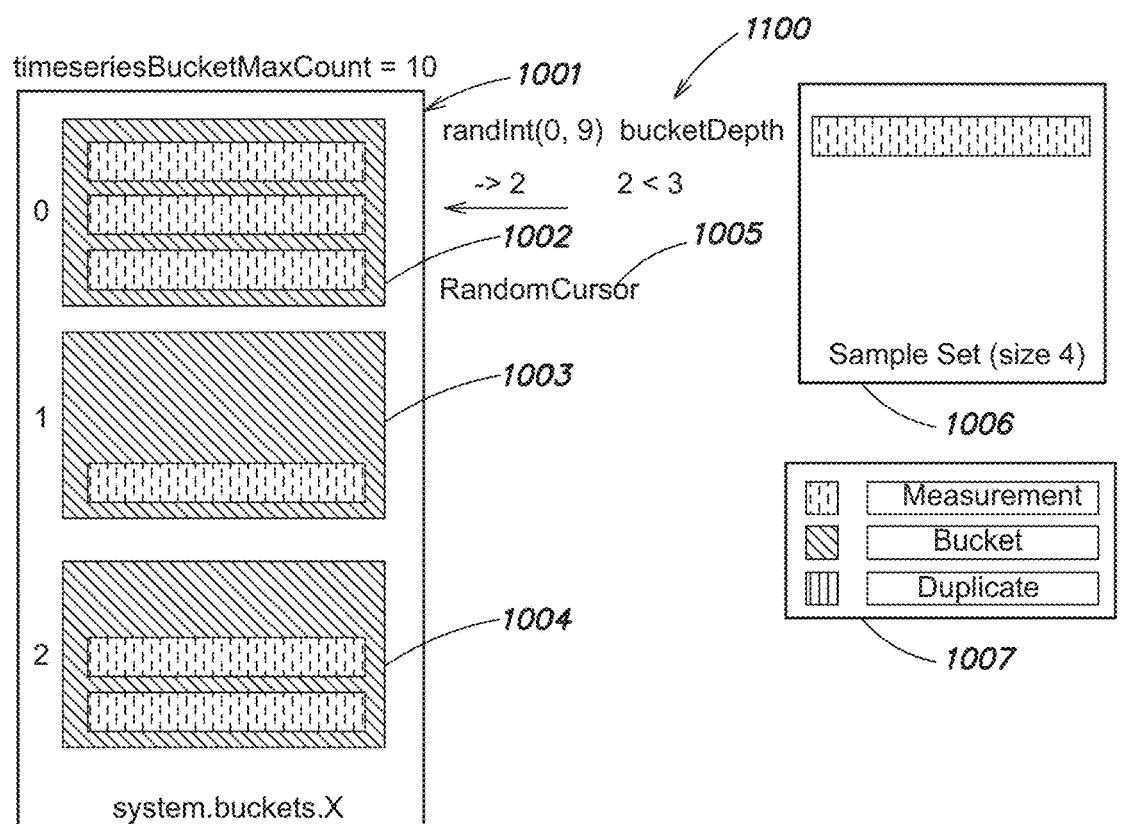
FIG. 11 is another block diagram showing a bucket sampling algorithm according to various embodiments.
Figure 12:
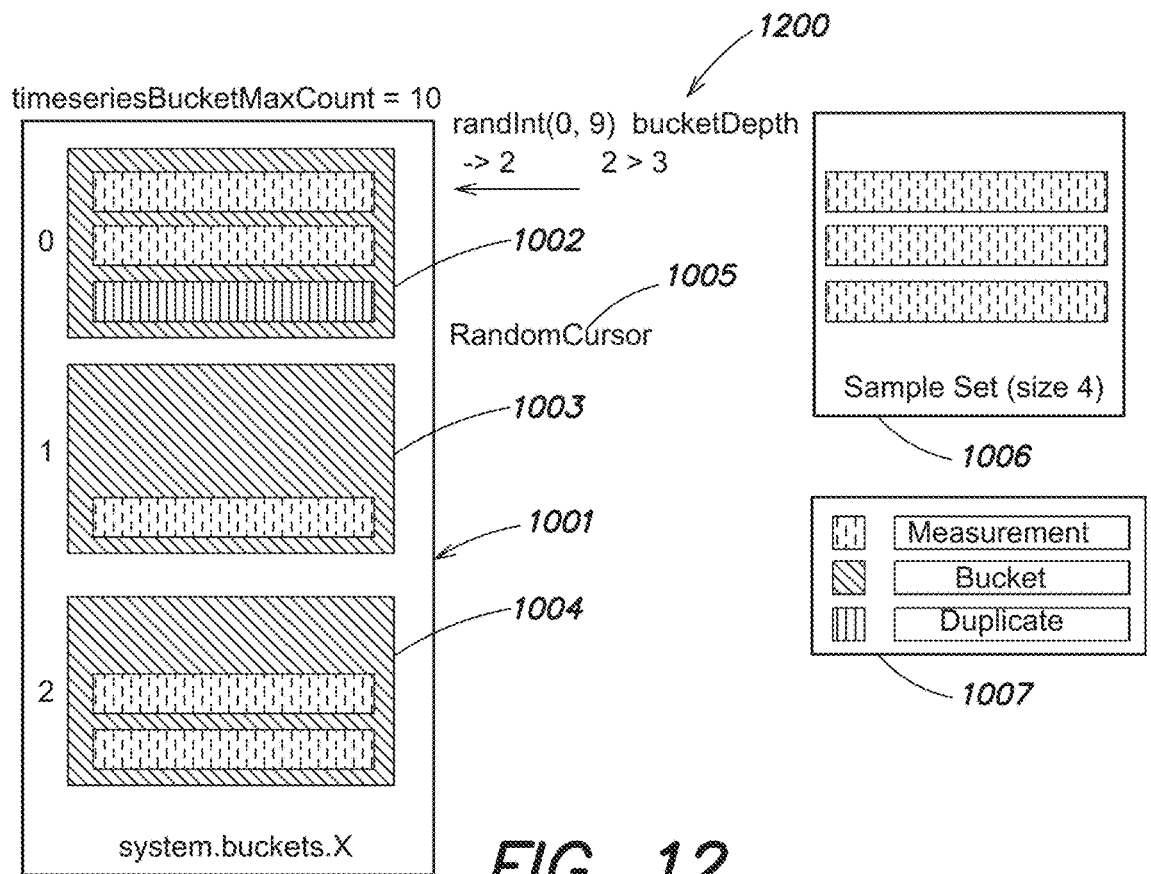
FIG. 12 is another block diagram showing a bucket sampling algorithm according to various embodiments.
Figure 13:
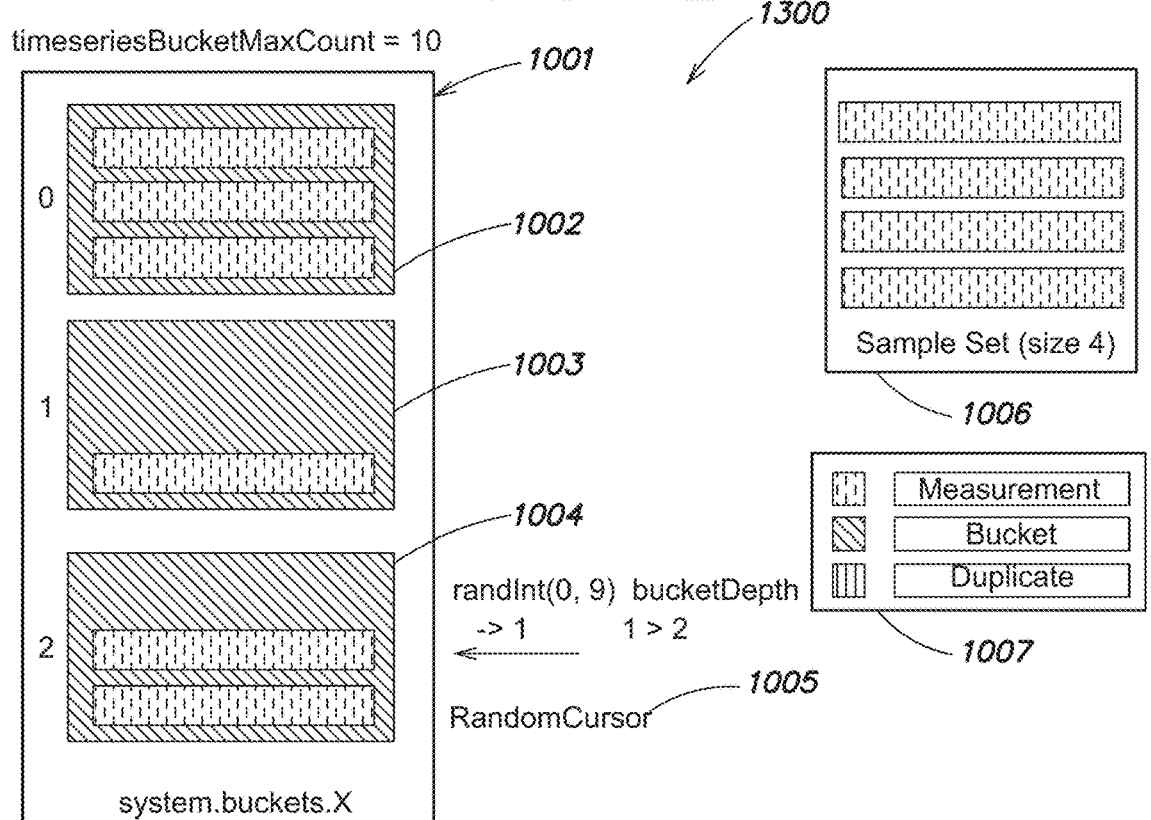
FIG. 13 is another block diagram showing a bucket sampling algorithm according to various embodiments.

The algorithm is best described by example below that shows the algorithm performance through a series of diagrams as shown in FIGS. 10-13. Suppose a system is building a sample of size 4 from a system.buckets.X collection that has 3 buckets labeled 0, 1, 2 respectively. Each bucket is illustrated as a box on the left of the diagrams in FIGS. 10-13, and each measurement in a bucket is labeled with their corresponding row key (measurements are shown in the buckets by as shaded according to a key 1007, along with their corresponding buckets and duplicate hits). In the example, FIG. 10 shows a systems.buckets.X collection (element 10001) that includes three buckets, bucket 0 (element 1002), bucket 1 (element 1003) and bucket 2 (element 1004). The maximum depth a bucket can hold is dictated by a server parameter timeseriesBucketMaxCount which is set to 10 in this example.

There is a sample set created (e.g., of size=4, element 1006)

The first step of the algorithm selects a bucket at random. To do this, in some implementations, a random bucket selection may be implemented using a storage-optimized RandomCursor exposed via a storage engine (e.g., the WiredTiger storage engine commercially available by MongoDB). Here, in the first step of the ARHASH algorithm as shown in FIG. 10, the RandomCursor (element 10005) selected bucket 1 (element 1003). Now the next step of the algorithm generates a uniform random integer on the half-open interval (0, timeseriesBucketMaxCount. This ensures that every measurement in a given bucket has a fair opportunity at being sampled. As can be appreciated, each measurement is equally likely to end up in the sample set by using some basic probability theory. For this iteration, the random integer was chosen to be 8. The next step is to compute the bucketDepth which is 1 for bucket 1. To decide if the system attempts to extract a random measurement from bucket 1, the ARHASH algorithm checks if the random Int is less than the bucketDepth, and in this case 8<1 so the test fails. The system counts this iteration as a miss and move the RandomCursor to the next bucket, these steps are repeated. Now the RandomCursor is pointing to bucket 0, and the system generates a random Int, 2. Because 2 is less than the bucketDepth of 3, the system can extract the measurement with row key 2 from bucket 0 and place the measurement in the sample set. The system can continue this for a few iterations and then sample measurement 0 from buckets 1 and 2, subsequently.

When the system has selected a measurement that has already been selected, the system advances the RandomCursor to bucket 0 and then generates a random Int, 2, attempting to extract the measurement with row key 2 from bucket 0. Duplicates are tracked by hashing a std::pair<BucketId, MeasurementId> in a std::unordered_map. When a duplicate is encountered the system counts it as a miss and proceeds on.

The ARHASH algorithm is terminated when the system has built the entire sample set, and in this case the system would have sampled a final measurement from bucket 2 by generating a random Int 1 and extracting the measurement at row key 1, and the algorithm terminates.

In some embodiments, this algorithm may be implemented as, in at least one implementation, using a WiredTiger RandomCursor, a pseudo-random number generator, and a mechanism to extract the k-th element from a bucket which can be implemented through an abstraction called a BucketUnpacker.

On implementing ARHASH the it is appreciated that two interesting challenges that may be addressed:
  Fast computation of the bucketDepth
  Handling an edge case where the buckets were mostly empty The first challenge of computing the bucketDepth at each iteration may be accomplished by exploiting the structure of the bucket format's timestamp column. In some implementations, this approach may be used as, in some implementations, the bucket format does not track additional metadata around the measurement count or other stats of that nature. Alternatively, the system could walk the timestamp BSONObj and count the number of elements to infer the bucketDepth.

Computing the bucketDepth in O(1)

Rather than walking the timestamp column, some facts may be used about this

BSONObj:
  An empty timestamp column consumes 4 bytes for the objsize header and 1 byte for the EOO BSONObj terminator.
  Each row key is a null-terminated decimal string that consumes 1 byte per digit
  The timestamp column values are ISODate BSON types which each consume 8 bytes.

Given these three facts, a recurrence relation can be written for the timestamp column size $S_i$ as a function of the number of row keys i. For simplicity and in order to eliminate log 10s from the equation, the recurrence may be written at powers of 10, $$S_0=5$$

$$S_1=S_0+110$$

$$S_i=S_{i-1}+(10^i-10^{(i-1)})*(10+i), \text{where } i>1$$

Figure 14:
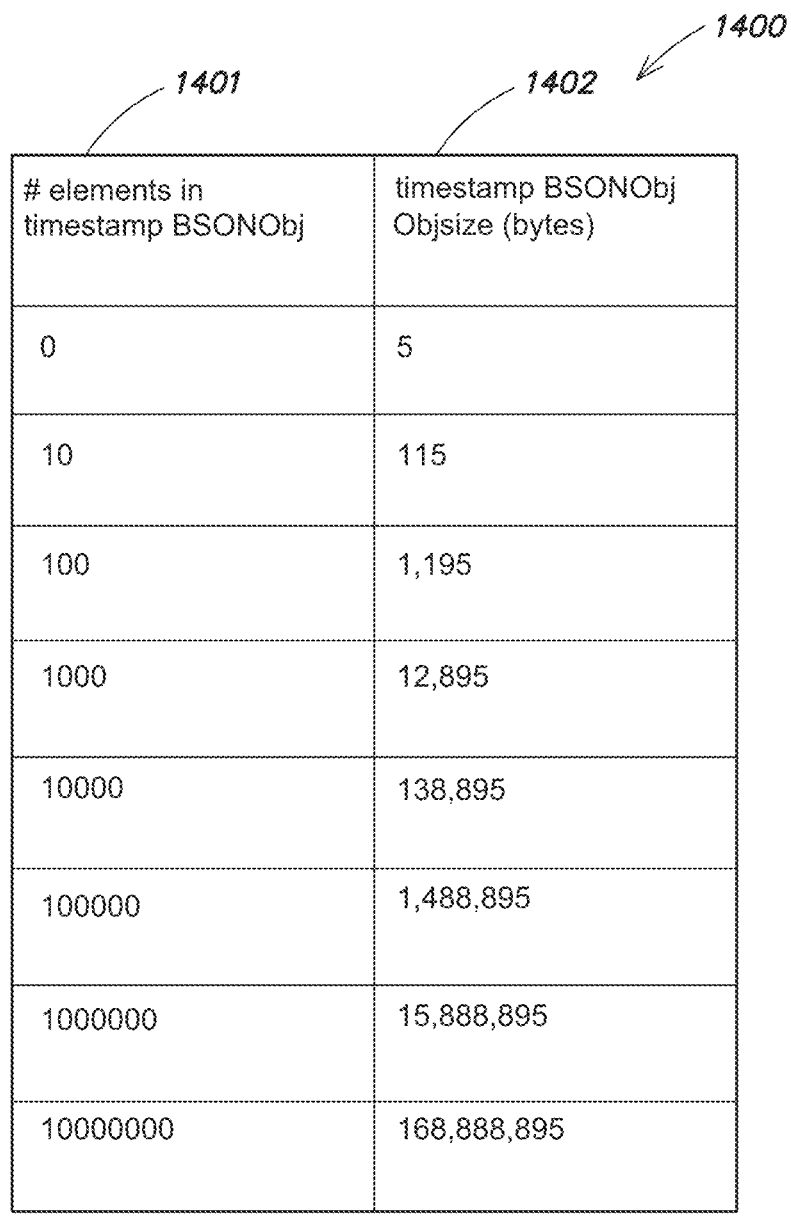
FIG. 14 shows a table that shows a size of a timestamp relating to a number of bucket elements.

The $S_0$ case is the base case where the timestamp column is empty which consumes 5 bytes, the $S_1$ case is a base case where one timestamp is inserted, and the recursive $S_i$ case describes the column size containing $10^i$ timestamps. Now there is a function from the number of measurements to the objsize of the timestamp column. This recurrence may be solved for a closed form and in terms of i, but instead the system may use the recurrence to pre-compute a lookup table bounded by the 16 MB BSON object size (no timestamp column is allowed to be greater than this limit). The lookup table stores the number of elements (the bucketDepth) in the timestamp BSONObj in the left column, and the objsize of the timestamp BSONObj in the bucket format shown by way of an example table 1400 in FIG. 14 which shows the number of elements in the timestamp (column 1401) versus the timestamp object size (column 1402).

Now to compute the bucketDepth, the system can read the objsize header from the timestamp BSONObj and find an upper and lower bound for the actual object size by searching the table. Once the objsize is bounded we use linear interpolation to infer the bucket size.

Now with all of the pieces discussed, consider the situation when the buckets are not entirely full and the ARHASH algorithm realizes a majority of misses. This was the second hurdle encountered and in this case, the ARHASH algorithm spun and never beat top-k sorting. To complicate things further, there is no way to know upfront if this case exists without inspecting buckets on the fly or by tracking statistics which seemed to be error prone.

Non-Full bucket Case

Figure 15:
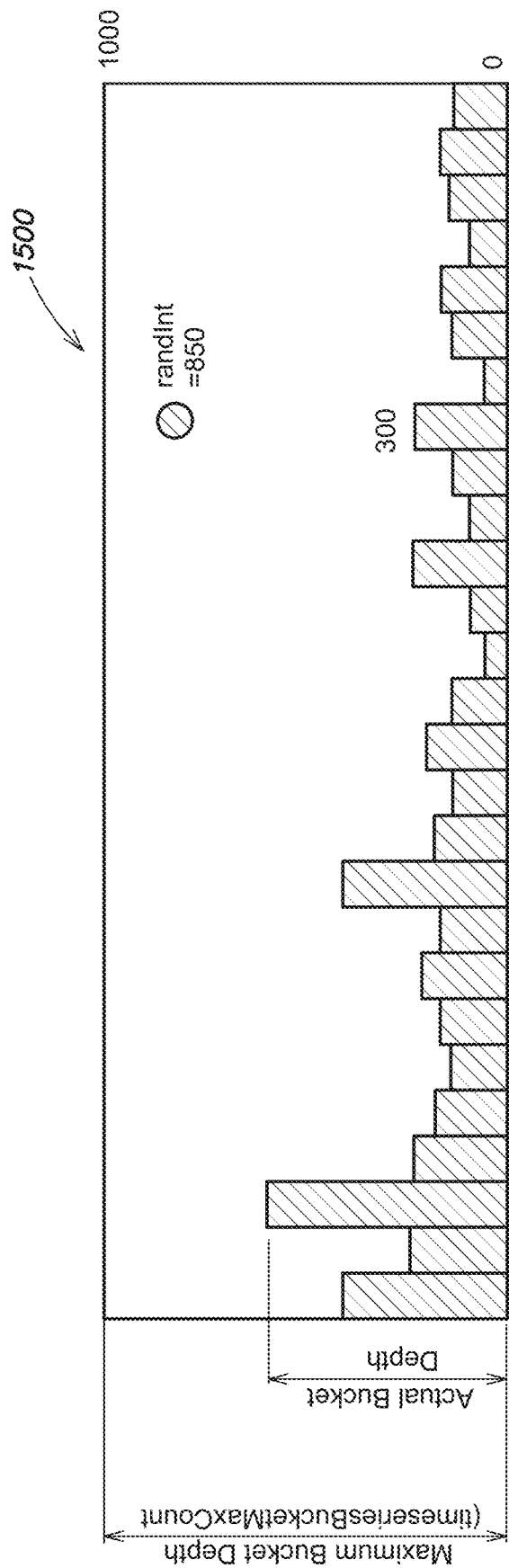
FIG. 15 shows an example implementation where buckets are non-full.
Figure 16:
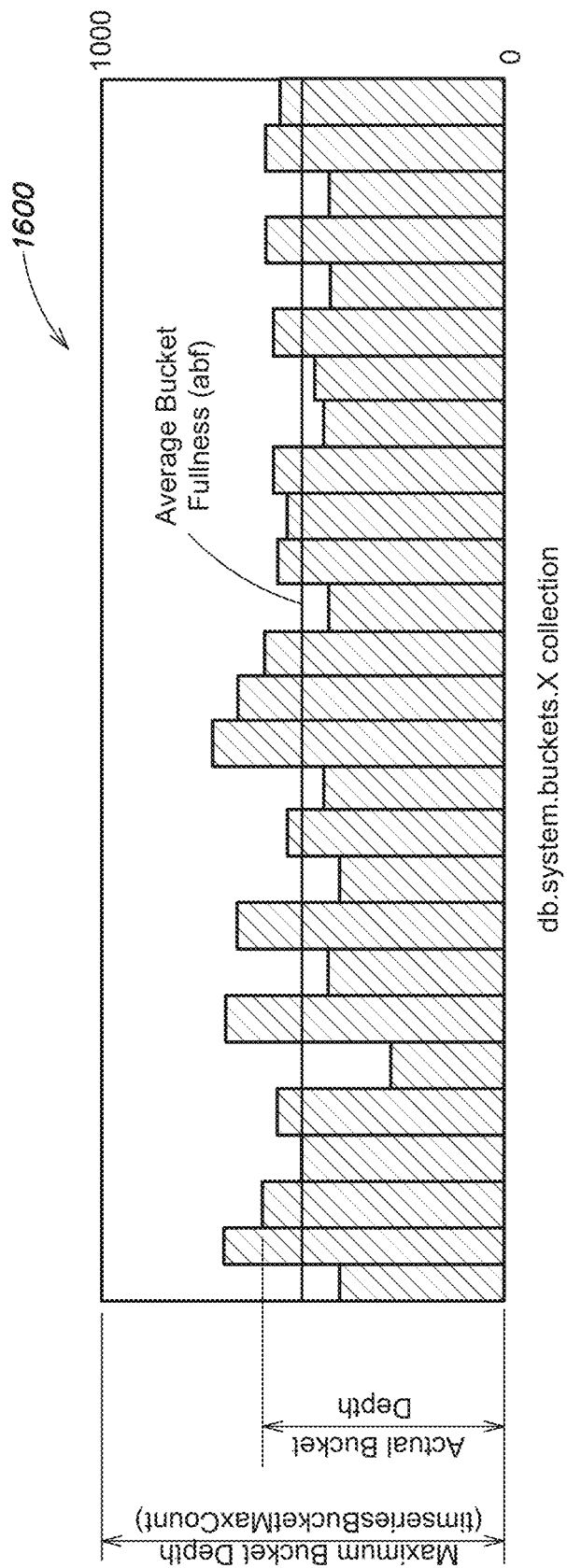
FIG. 16 shows an example implementation where buckets are at least half full.

It is appreciated that buckets could be mostly empty as some workloads can generate buckets that are nearly empty due to the fact that measurements are stored by met aField value. It is appreciated that buckets not are opened and filled one-at-a-time as one may believe. This phenomenon is illustrated in FIG. 15. In particular, FIG. 15 shows a graph 1500 that illustrates that the maximum possible bucketDepth is dictated by the server parameter timseriesMaxBucket-Count (in this case, the parameter is set to a default value of 1000). It is noted that buckets are filled to an actual bucketDepth which could be significantly less than the timeseriesBucketMaxCount parameter. If the system ran many iterations of the ARHASH algorithm, the system would be generating random integers on the half-open interval [0, 1000) and incur a majority of misses which would be the case in the above diagram if the system generated an int of 850 and compared it to a bucket with a depth of 300. Experimentation shows that the ARHASH algorithm did perform well against top-k when the buckets were at least half-full. When this is the case, the measurement distribution is along the lines of the diagram 1600 shown in FIG. 16.

Notice that a new term is defined, referred to herein as average bucket fullness (ABF). This parameter is useful for utilizing the TrialStage to determine if ARHASH would be chosen over top-k. The use of the TrialStage helped us overcome the half-full bucket case, and relied on running a runtime trial for 100 iterations of the algorithm to essentially check if there is an ABF~0.5 and use the ARHASH algorithm instead of the top-k algorithm.

TrialStage

Figure 17:
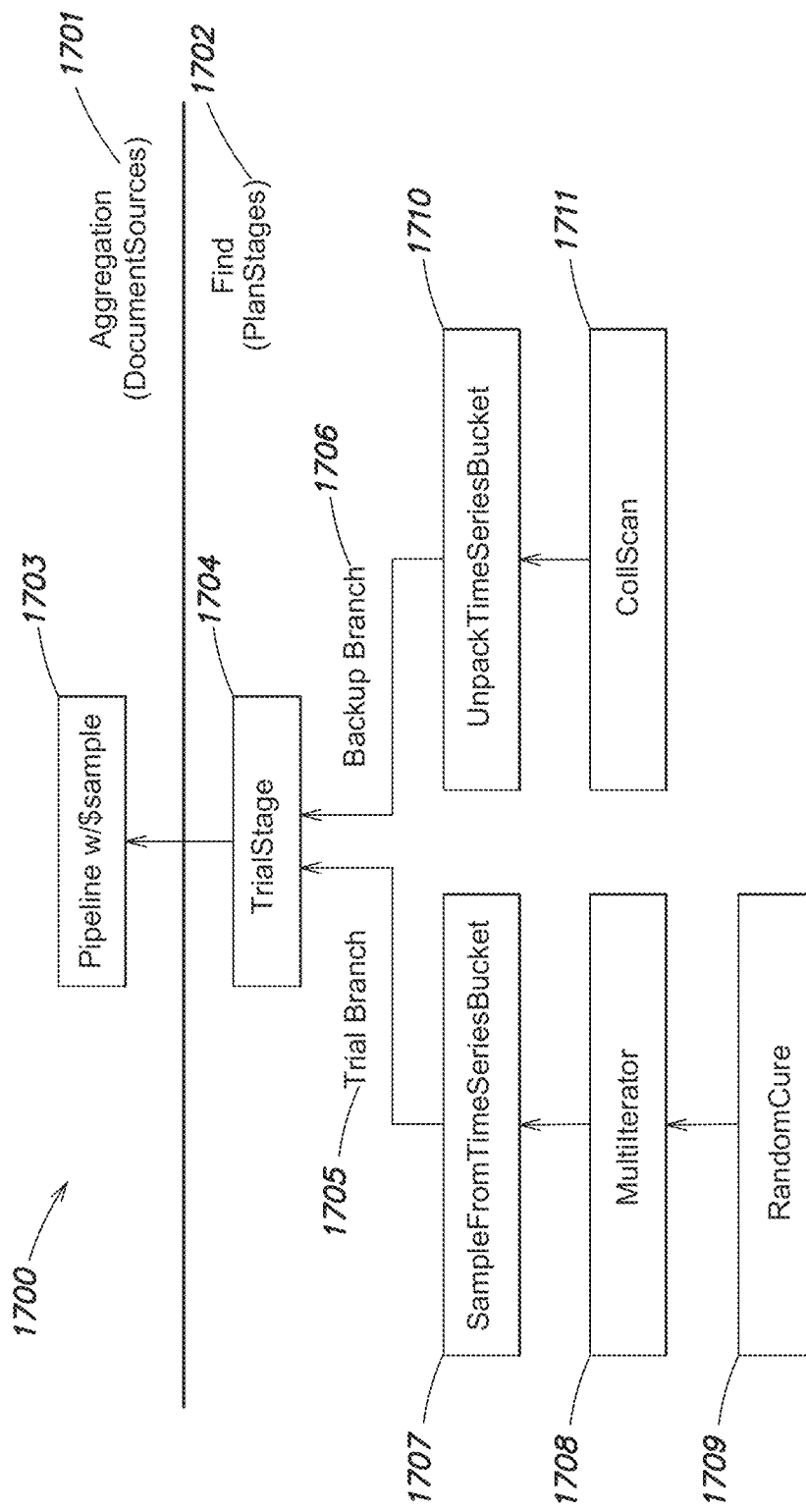
FIG. 17 shows an example pipeline that can be executed on a time series collection according to various embodiments.

Before getting into how the ABF may be used by the TrialStage, the TrialStage operation is now discussed. FIG. 17 shows a process 1700 which illustrates that when there is an aggregation operation (e.g., from an aggregation layer 1701) that includes a pipeline (element 1703) that is run against a time series collection and contains a $sample stage.

In this case, the system can pushdown a TrialStage (e.g., TrialStage 1704) into a find layer (element 1702) with two branches,
1. A trial branch (element 1705) which has aPlanStage that implements bucket unpacking and ARHASH called SampleFromTimeseriesBucket (element 1707)
2. A backup (fallback) branch (element 1706) that implements plain bucket upacking as a PlanStage called UnpackTimeseriesBucket (element 1710)

When the TrialStage is instantiated, in one implementation, it runs a trial of 100 work units and it tracks how many times the trial branch selects a measurement by counting how many ADVANCED states are reached. It also tracks the total number of work units in total to compute an ADVANCED:Work ratio. The trial branch is successful if the ADVANCED:Work ratio exceeds some threshold on [0, 1]. That threshold was chosen to be an ABF of 0.5.

A question one might have at this point is why does the ABF approximate the ADVANCED:Work ratio of the TrialStage? To answer this, the SampleFromTimeseriesBucket stage may be configured to return an ADVANCED state if a measurement is sampled (a hit), and NEED_TIME otherwise (a miss). So if the timeseriesBucketMaxCount is 1000 on average the system ADVANCE the ARHASH algorithm more than half the time, the system would be generating random ints sufficiently to sample buckets with at least 500 measurements in them, and by extension, the system would are observing an ABF of 0.5. Now the system can control the TrialStage to select the trial branch if the ADVANCED/WORK ratio is at or above 0.5, otherwise the system would fallback to top-k sampling.

Performance

ARHASH can be executed for a variety of bucket fill factors and number of measurements inserted into time series collections. Interestingly, it was found that ARHASH beat top-k when roughly sampling <1% of the measurement count of the collection and when the ABF >=0.5. Heuristics are not always perfect, but the system may attempt to use ARHASH via the TrialStage when the sample size was <1% of the collection size as something to try.

Figure 18:
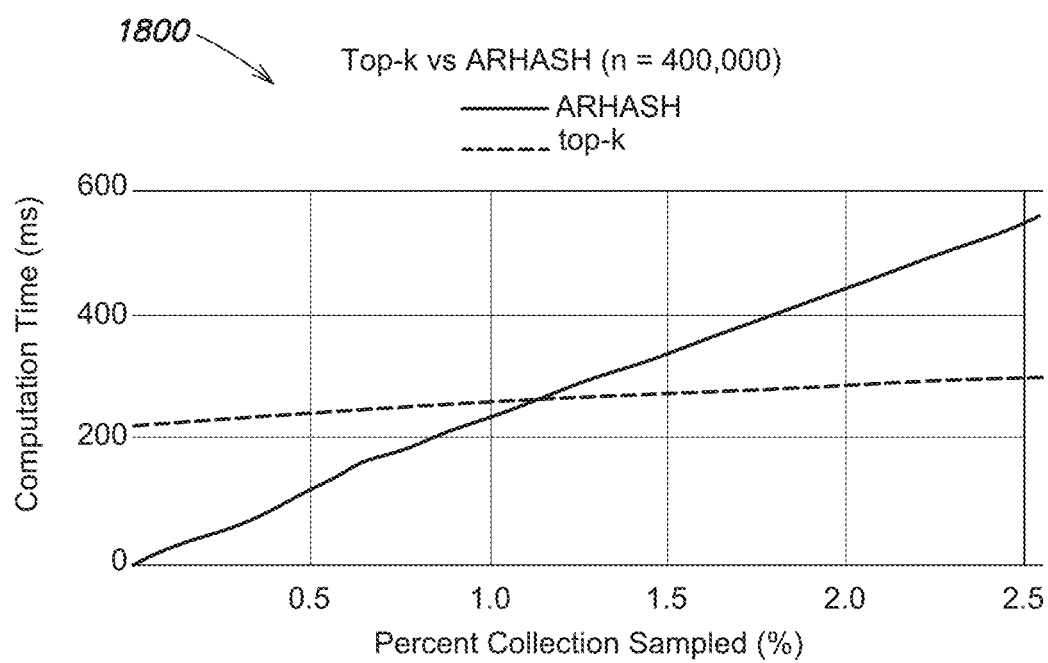
FIG. 18 shows example performance data for an ARHASH algorithm according to various embodiments.

The plot 1800 shown in FIG. 18 shows a comparison between ARHASH and top-k sampling for a time series collection with 400,000 measurements inserted. As illustrated above at about 1% of the collection sampled ARHASH beat top-k, but eventually as more and more of the entire collection is sampled, the ARHASH algorithm ends up performing worse than top-k sorting. It can be shown that if the collection size increases (e.g., up to 10,000,000 measurements) the performance gap between ARHASH and top-k becomes even more pronounced. The following shows what occurs when the system runs $s ample pipelines against a time series collection with 10,000,000 measurements and for a sample size of 500,000:

```
> db.point_data.explain( ).aggregate([{$sample: {size: 500000}}]).stages;
[
  {
    "$cursor" : {
      "queryPlanner" : {
        "namespace" :
"arhash_demo.system.buckets.point_data",
        "indexFilterSet" : false,
        "parsedQuery" : { ... },
        "winningPlan" : {
          "stage" : "COLLSCAN",
          "direction" : "forward"
        },
        "rejectedPlans" : [ ]
      }
    }
  },
  {
    "$_internalUnpackBucket" : {
      "exclude" : [ ],
      "timeField" : "time",
      "metaField" : "tags",
      "bucketMaxSpanSeconds" : 3600
    }
  },
  {
    "$sample" : {
      "size" : NumberLong(500000)
    }
  }
]
```

Notice that the query planner has selected a pipeline with a $cursor plan stage that contains only a COLLSCAN (e.g., element 1711) ollowed by an $_internalUnpackBucket stage followed by a $sample stage. Here, the system is sampling a sample size that is significantly larger than %1 of the collection so the system may avoid running the ARHASH algorithm. Suppose the system samples 1000 measurements now,

```
> coll.explain( ).aggregate([{$sample: {size: 1000}}]).queryPlanner;
{
   "namespace" : "arhash_demo.system.buckets.point_data",
   "indexFilterSet" : false,
   "optimizedPipeline" : true,
   "maxIndexedOrSolutionsReached" : false,
   "maxIndexedAndSolutionsReached" : false,
   "maxScansToExplodeReached" : false,
   "winningPlan" : {
      "stage" : "TRIAL",
      "inputstage" : {
         "stage" : "OR",
         "inputstages" : [
            {
               "stage" : "QUEUED_DATA"
            },
            {
               "stage" : "SAMPLE_FROM_TIMESERIES_BUCKET",
               "inputstage" : {
                  "stage" : "MULTI_ITERATOR"
               }
            }
         ]
      }
   },
   "rejectedPlans" : [ ]
}
```

It can be observed that the query planner chose the pushed down plan with the TrialStage, and the winning plan is TrialStage where the trial branch containing the SampleFromTimeseriesBucket stage (e.g., element 1707) that implements ARHASH was chosen. Now the system can execute two pipelines, one that inhibits the optimization before $sample so the system forces the query planner to run top-k and another that does not inhibit the optimization before the $s ample stage which will run the ARHASH algorithm via the TrialStage.

```
> let topk = function(size) {
     var t0 = Date.now( );
     db.point_data.aggregate([
         {$_internalInhibitOptimization: { }},
         {$sample: {size: size}},
         {$_internalInhibitOptimization: { }},
         {$count: "n"}]);
     var t1 = Date.now( );
     print("topk ran in: " + (t1 - t0) + " ms");
  }
> let arhash = function(size) {
     var t0 = Date.now( );
     db.point_data.aggregate([
         {$sample: {size: size}},
         {$_internalInhibitOptimization: { }},
         {$count: "n"}]);
     var t1 = Date.now( );
     print("arhash ran in: " + (t1 - t0) + " ms");
  }
> topk(1000)
topk ran in: 6777 ms
> arhash(1000)
arhash ran in: 22 ms
```

It should be appreciated that by adapting the ARHASH algorithm to sample time series collections, a faster $sample path for time series collections may result. However, it should be appreciated that other similar algorithms may be used.

Many queries can benefit from events being ordered on time, in particular, when $sort on time is present, e.g. for visualization, or window functions over the time dimensions need to be computed or data need to be grouped on time-bins (e.g., months). An operation that can unpack buckets and perform sorting would be beneficial for performing such operations. Because buckets are stored in a clustered index based on the minimum time of events stored in each bucket, scanning and unpacking results in an ordered collection. Bucket unpacking can be extended to sort the events as it is consuming them to satisfy the needs of subsequent stages. This makes unpacking a blocking operator but, in practice, it should only hold events until a bucket with a greater minimum timestamp gets opened. This approach can be extended to the cases when events need to be grouped prior to sorting and buckets are retrieved from a secondary index on corresponding metadata fields and timestamp.

Bucket Unpacking

Figure 5:
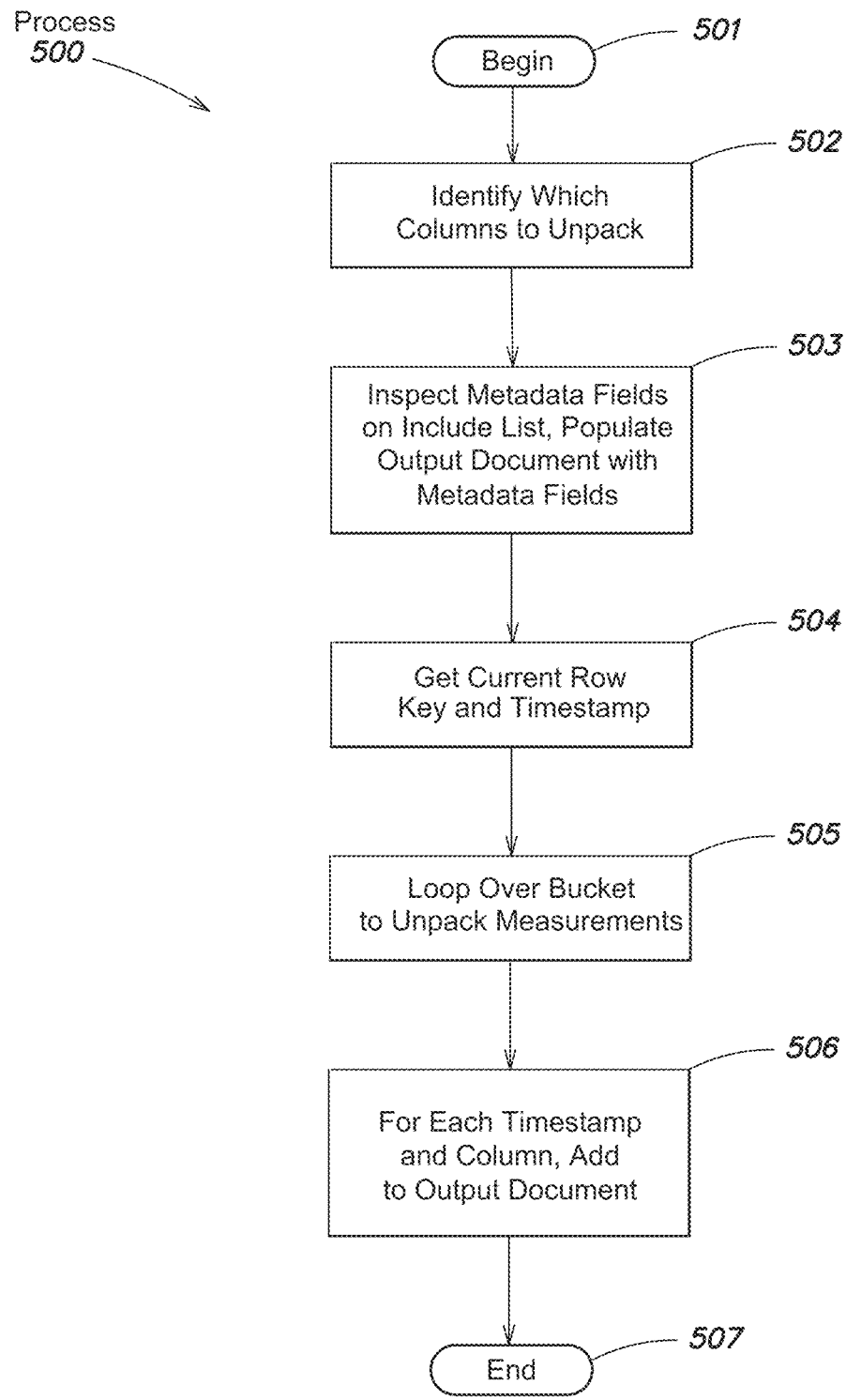
FIG. 5 shows an example unpack operation that may be used for processing bucketed timeseries data according to various embodiments.

FIG. 5 shows an example unpack operation that may be used for processing bucketed timeseries data. At block 501, process 500 begins. At block 502, the system identifies which columns to unpack. For instance, an unpack operation may be used in association with other operations such as a random sampling, or location of particular buckets to unpack. At block 503, the system inspects metadata fields on and include list and populates an output document with metadata fields. At block 504, the system gets a current row key and timestamp. At block 505, the system loops over the bucket to unpack the measurements defined within the documents. For each timestamp in column, the system adds the measurement to the output document at block 506. At block 507, process 500 ends.

In some embodiments, a component is provided (hereinafter the "BucketUnpacker") that is used to unpack the time series bucket storage format. It essentially takes a bucket from a time series collection and unpacks time series measurements one at a time. The BucketUnpacker is intended to be used in two phases:

1. An initialization phase that will analyze the owned bucket and set up the necessary BSONObjIterators needed to materialize measurements.
2. The main iteration that is driven by BucketUnpacker::getNext( ) calls to unpack the bucket one measurement at-a-time.

The initialization phase is done once per bucket in BucketUnpacker::reset( ). This phase caches the metadata value because it's repeated across all measurements in a bucket. Subsequently, a BSONObjIterator is initialized for the timestamp column for the purpose of providing the canonical ordering of row keys used to track which values are needed for the measurement being processed in the iteration. The value from this time field iterator can be used to materialize the time value if needed.

To determine which columns to unpack, BucketUnpacker::reset( ) computes the set of BSONObjIterators needed by traversing the top-level data region of the bucket, inspecting the field names, and comparing them against the provided include/exclude list. Once the initialization phase is complete, BucketUnpacker::getNext( ) can be called until exhaustion. This is a forward iterative process, the iterator does not peek, nor go backwards during the iteration because these features are not needed at the moment.

The mechanics of the iteration during BucketUnpacker::getNext( ) calls can be realized in a single-pass algorithm using constant space (auxiliary state alongside the materialized document) that accumulates the materialized document in a MutableDocument:

1. Populate a MutableDocument with the metadata fields if the metaField is either provided in the include list or it is not explicitly listed in the exclude list.
2. Get the current row key and timestamp by reading the next item from the timeField BSONObjIterator. If the time field should be present in the resulting document, place it at the front of the resulting document.
3. Loop over the bucket BSONObjIterators to unpack measurements
   a. Check to see if there is a matching row key in the current BSONObjIterator.
   b. If there is a next value the system appends it to the MutableDocument and advance the current BSONObjIterator. Otherwise, the field is missing for the current unpacked measurement and the system skips advancing this BSONObjIterator.
   c. The whole iterator is exhausted when both the timestamp BSONObjIteratorand all column iterators are exhausted.

Windowing Operations

Figure 6:
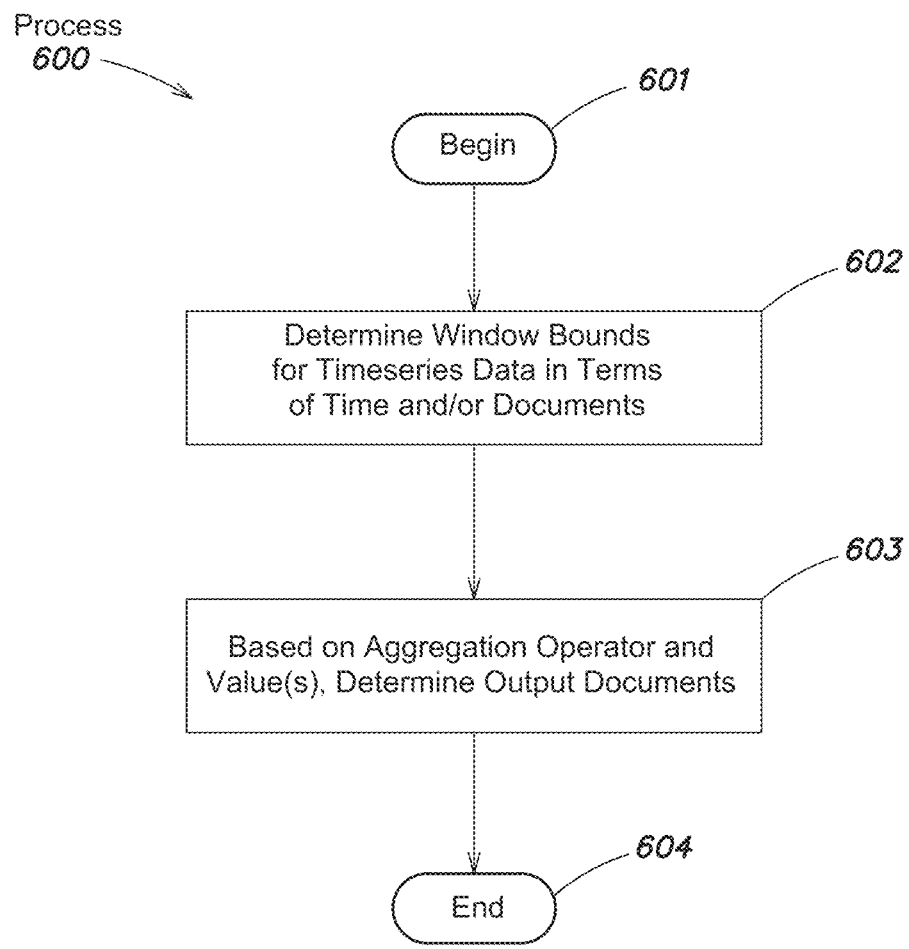
FIG. 6 shows an example windowing operation according to various embodiments.

As discussed, it may be desired, depending on the operation to be performed, to permit analysis of timeseries according to one or more window-based operations. FIG. 6 shows an example windowing operation according to various embodiments. At block 601, process 600 begins. At block 602 the system determines window bounds for timeseries data in terms of time and/or documents. As discussed, a more useful implementation of windowing operations that can be set in terms of time or documents is provided. Most databases can either set this in the form "3 rows preceding 5 rows following" or "5 minutes prior". In some implementations as defined herein, the system is configured to both and the latter with the same flexibility as the former (e.g. "5 minutes prior, 3 minutes following," etc.). At block 603, based on an aggregation operator and value(s) specified, the system determines one or more output documents. At block 604, process 600 ends.

Such functions differ from the MongoDB aggregation operators (e.g., $group, $set) in the following ways:

Unlike $group, which produces a single output document per group of input documents, $setWindowFields produces a single output document per input document.

Unlike $set/$addFields, in which each output document depends only on the corresponding input document, $setWindowFields allows each output document to depend on a whole range of input documents (defined by the window bounds, and partition key).

$setWindowFields includes new operators not available in other stages:

$rank, $denseRank, and $documentNumber assign an ordinal number to each document according to a given sort order.

$derivative computes a value's rate of change, by comparing the value and time of nearby documents.

$integral computes a value's total change, by summing the incremental changes from a range of documents.

$expMovingAvg computes an exponentially weighted moving average.

Windowing Functions

Time series calculations using windows could be classified into two main categories:

Position-based: References are in terms of ordinal position of each record within a partition. They assume data is homogeneous or provide utilities to make them so e.g. densification. They do not (generally) define units (e.g., a user asks to look back 3 periods from the current record. 3 periods could be 3 days, months or years (or just 3 rows if data is sorted on a non-date field)) if the input table is aggregated to have a record per day, month or year. SQL Analytical Functions fall into this category.

Time-based: References are in terms of intervals (e.g. 15 seconds, 3 days and operate with date columns).

According to some implementations, some use cases cover not only IoT data but also common analytics scenarios both categories may be implemented.

Defining Windows

According to some embodiments as described herein, window functions are exposed as a new aggregation stage capable of partitioning incoming data similar to $group, and apply one or more functions to defined windows within each partition. However these window functions do not change the granularity of the data like $group does.

```
{$setWindowFields: {
    partitionBy: <Expression>,
    sortBy: <sort spec>,
    output: {
        <path>: {
            <function>: {
                input: <Expression>,
                documents: [<lower bound>, <upper bound>],
                range: [<lower bound>, <upper bound>],
                unit: <string>,
            }
        }
        <path2>: ...
    }
}}
``` partitionBy—partitioning of data specified like _id in $group. Optional. Zero or more scalars could be used for partitioning. Default: single partition. As in $group, users can write an object expression to partition by a compound key.

sortBy—fields to sort by, syntax identical to a $sort spec. Optional. Default: no sort order.

output—a set of field paths computed by this stage using window functions. Required. The paths may contain dots, which will traverse nested documents and arrays as if it were part of a normal projection. Only the functions specified in Goals of the scope document are supported, arbitrary expressions are not allowed. We will consider it a no-op if no fields are provided ('fields' is the empty document).

<function>: The window function to compute over the given window, populating path in each of the output documents.

input—An expression to be evaluated for each document in a window, passing the results to the associated window function/accumulator. For functions which do not take an expression (e.g. $rank), this field must be omitted.

documents—A position-based window type whose bounds are determined by a number of documents before and after the current document. Optional, default is the entire partition.

bounds: A 2-element array indicating the lower and upper bounds for the window. Accepted values are "current"|"unbounded"| integer. If numeric, then a negative integer refers to documents preceding the current one and a positive integer refers to documents following the current one.

range—A dynamically-sized window type whose bounds are determined by a range of possible values around the value in the current document's sortBy field. Optional. Mutually inclusive.

bounds: A 2-element array indicating the lower and upper bounds for the window Accepted values are "current"|"unbounded"| numeric. If numeric, then the bound is calculated by adding it to the value of the sortBy field in the current document. If sort is on a numeric field (e.g. a Unix timestamp) only numeric value types will be considered part of the window if they fall in the desired range. If it is on a date/dateTime field, only date/dateTime types will be considered part of the window.

unit—This parameter specifies the units for the window bounds. Accepted values are "year", "month", "week", "day", "hour", "minute", "second", or "millisecond". This parameter is only allowed with range-based windows. Optional.

gapFillEvery—specifies the gap fill granularity (in periods or units if specified). Optional. Default: 0 (No gap filling). This will also likely go beyond just being a scalar and include interpolate and locf or specify fixed value to fill with, in a TBD gapfill specification.

exclude—Allows excluding the current row, repeat rows etc. Optional. Similar to frame_exclusion in SQL. Default: No exclusions Sliding Windows
Moving Average—Position Based In the following example, assume the user wants to calculate a 3-period moving average of temperature, looking forward 1 document and back 1 document (+1 current document) for each sensor.

The syntax for this behavior is as follows:

```
{$setWindowFields: {
    partitionBy: "$sensor",
    sortBy: {myDateField: 1},
    output: {
        myNewWindowAverageField: {
            $avg: {
                input: "$temperature",
                documents: [-1, 1]
            }
        }
    }
}}
```

Figure 19:
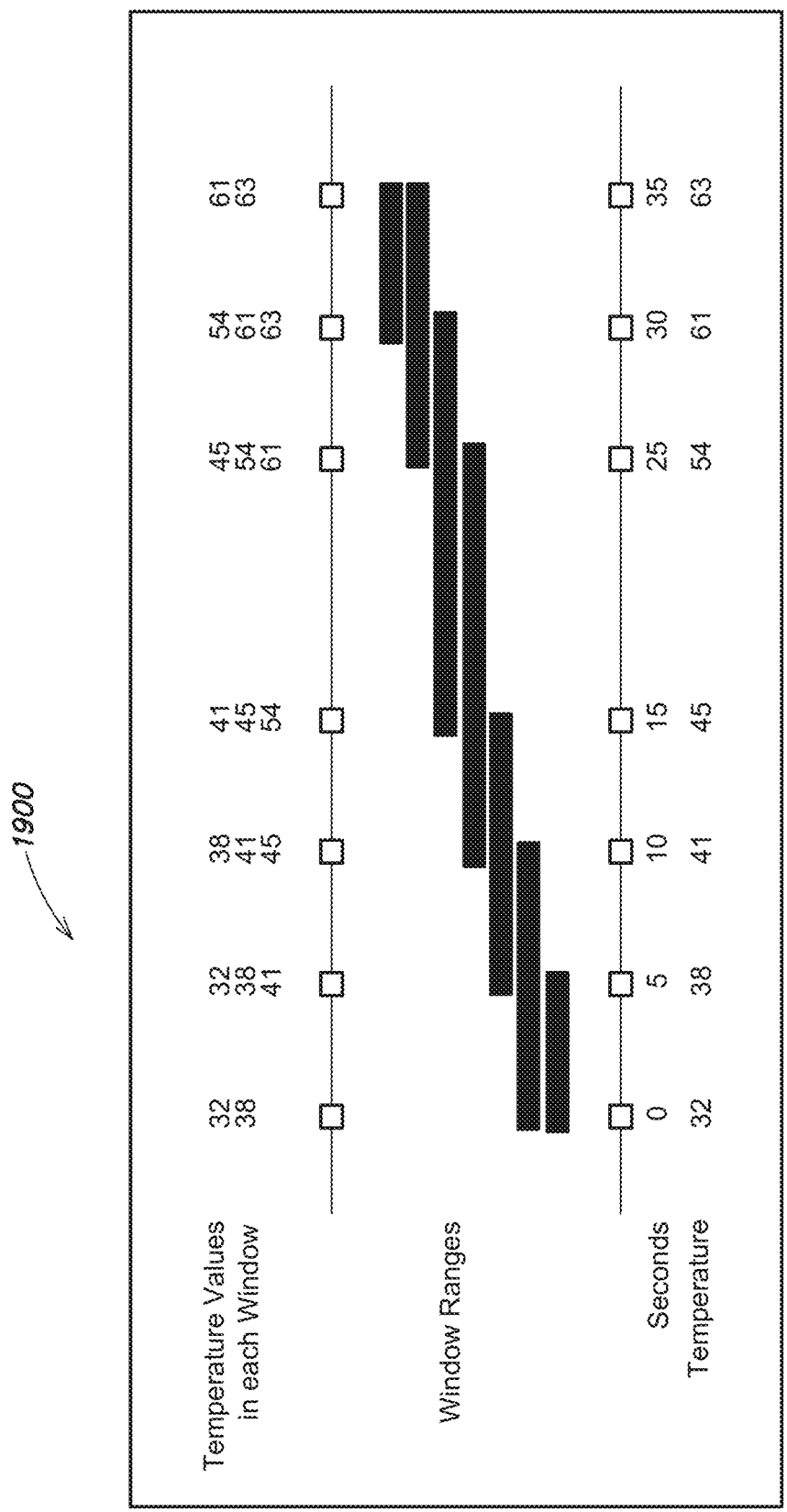
FIG. 19 shows example performance data associated with determining moving average temperature measurements.

This solution works well when data points are evenly spaced and without missing values. According to some embodiments, functionality may be provided that is similar to SQL environments, but in a document-based, no SQL architecture. FIG. 19 shows example performance data 1900 associated with determining moving average temperature measurements according to various embodiments. Note that in FIG. 19 the window gets larger due to the missing 20-second timestamp.

Moving Average—Time Based

Assume the user wants to compute a 10-second moving average of temperature looking back 10 seconds from the current timestamp for each sensor. This could be to smooth the signal or calculate the difference between the current data point and the moving average (e.g. to determine if the current point is a potential outlier).

The syntax for this behavior is as follows:

```
{$setWindowFields: {
    partitionBy: "$sensor",
    sortBy: {myTimestampField: 1},
    output: {
        myNewWindowAverageField: {
```

```
            $avg: {
                input: "$temperature",
                range: [-10, 0],
                unit: "second"
            }
        }
    }
}}
```

Unlike the previous option, this solution is less sensitive to missing data as it qualifies surrounding values by not just their position in an ordered list but their temporal distance, which is significantly different than traditional SQL-based analytical functions.

If no documents fall in the range (empty window) or the input values are of an incompatible type (e.g., $sum over strings), the returned value is function-dependent but will be consistent with $group where appropriate:

For $sum and $count, the return value will be 0

For all others, the return value will be null

If the current value for the sortBy dimension is non-numeric and non-datetime all functions return null as the window itself is undefined.

Figure 20:
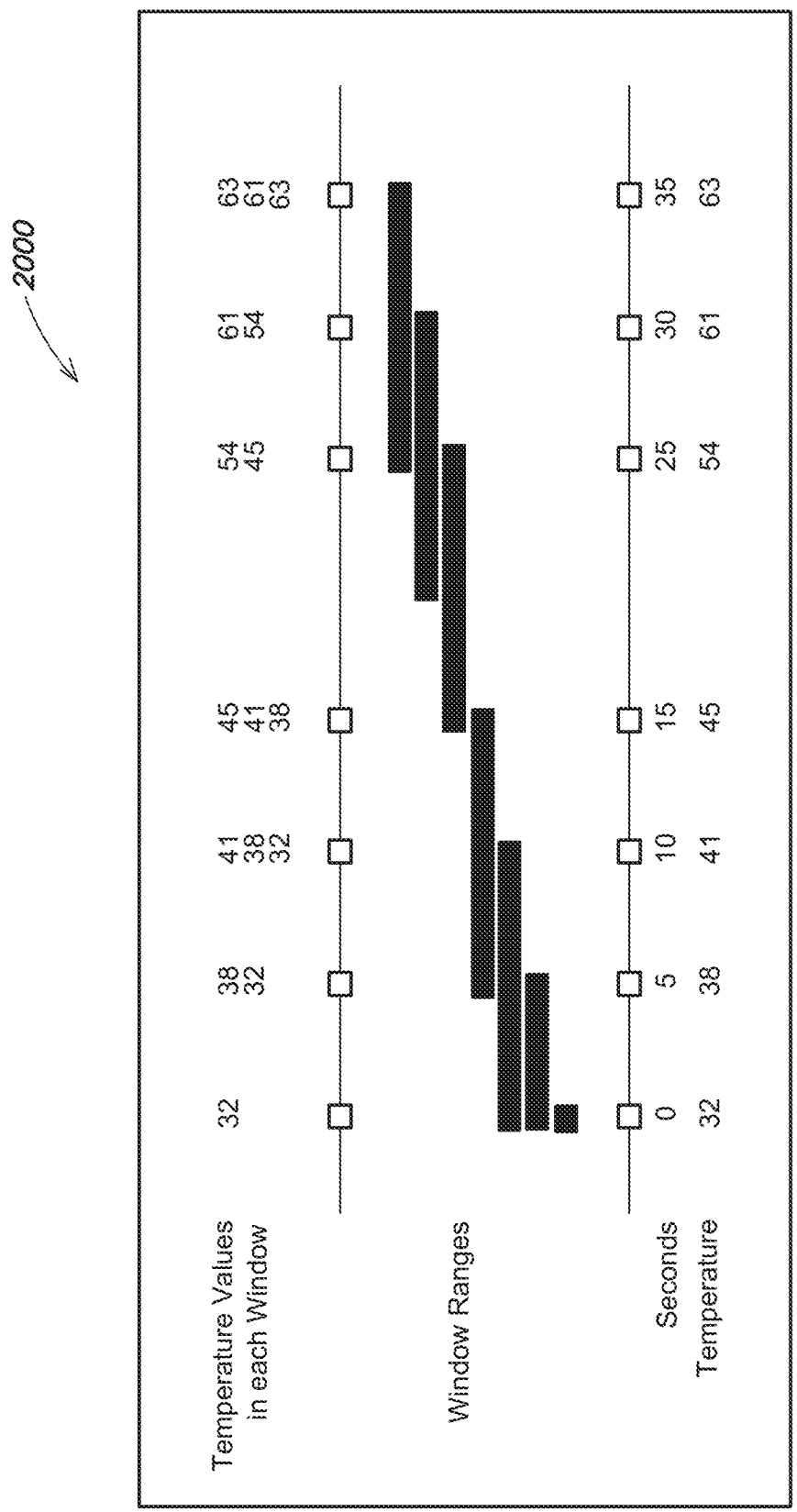
FIG. 20 shows additional example performance data associated with determining moving average temperature measurements.

FIG. 20 shows additional example performance data 2000 associated with determining moving average temperature measurements. Note that the window sizes are the same despite the missing 20-second timestamp (the first two windows are clipped as there are no prior observations).

AddToSet

In another example, if the user wanted to see the unique products browsed in the past 1 hour by each customer, the syntax would be as follows:

```
{$setWindowFields: {
    partitionBy: "$customerID",
    sortBy: {timestamp: 1},
    output: {
        viewed: {
            {$addtoSet: {input: "$productLabel",
              range: [-1, 0], unit: "hour"}}
        }
    }
}}
```

Covariance

If the user wanted to understand how movements of two series are directionally coordinated with each other, the syntax would be as follows:

```
{$setWindowFields: {
    partitionBy: "$TradingSession",
    sortBy: {myTimestampField: 1},
    output: {
        covarianceofTwoStocks: {
            {$covariance: ["$AAPL", "$WORK"]
        }
    }
}}
```

Exponential Moving Average

If the user wanted to track the price of an investment (like a stock or commodity) for volatility in the last 20 periods with more weight on recent events, the syntax would be as follows:

```
{$setWindowFields: {
    partitionBy: "$stockTicker",
    sortBy: {myTimestampField: 1},
    output: {
      EWMA: {
        {$expMovingAvg: {input: "$price",
          documents: [20, 0]}}
      }
    }
}}
```

Derivative

If the user wanted to compute the temperature change around a power meter make sure for any given 3 minute time window the temperature doesn't change too fast to indicate a fire in the facility, the syntax would be as follows:

```
{$setWindowFields: {
    partitionBy: "$locationID",
    sortBy: {myTimestampField: 1},
    output: {
      temperatureRateofChange: {
        {$derivative: {input: "$temperature",
          range: [−3, 0],unit: "minute"}}
      }
    }
}}
```

Derivative can be computed by taking the first and last points in the sorted window; and does not consider many points that might be in between.

For sortBy fields which are timestamps, unit can be specified to indicate the desired time unit for the divisor. unit is optional and should be left off for non-date sortBy fields. If the unit is present but the boundary values are not dates, $derivative will return null. It defaults to 'milliseconds' for sortBy fields which are dates. The unit will be treated as a scaling factor, meaning fractional values are allowed and preserved as the divisor, but also meaning that units "months" and "years" cannot be used since these cannot be converted to a fixed number of milliseconds.

Cumulative Windows
Running Sum

If the user wanted to compute the running sum of units manufactured for each Assembly Line the syntax would be as follows:

```
{$setWindowFields: {
    partitionBy: "$assemblyLine",
    sortBy: {myTimestampField: 1},
    output: {
      myRunningSumofUnitsProduced: {
        $sum: {
          input: "$numberofUnitsProduced",
          documents: ["unbounded", "current"]
        }
      }
    }
}}
```

Integral

If the user wanted to compute the total power production from a solar panel over the course of past hour, the syntax would be as follows:

```
{$setWindowFields: {
    partitionBy: "$solarPanelID",
    sortBy: {myTimestampField: 1},
    output: {
      energyProductionWattHour: {
        {$integral: {input: "$powerWatts",
          documents: ["unbounded", "current"],unit: "hour"}}
      }
    }
}}
```

This function computes the approximate integral of the window by using the trapezoidal rule, and it is a cumulative function e.g. if there are 3 data points, it first computes the integral for the first window (between 1-2), then between the next pair (2-3) then sums them up.

Similar to $derivative, for sortBy fields which are timestamps the unit can be specified. The semantics of unit are identical to those described above in $derivative, except here the unit applies to a multiplication instead of the divisor.

Push

If the user wanted to build a path out of pairs of latitude-longitude coordinates e.g. trajectory of a traveling vehicle, the syntax would be as follows:

```
[{$setWindowFields: {
    partitionBy: "$vehicleID",
    sortBy: {timestamp: 1},
    output: {
      coords: {
        {$push: {input: "$latitudeLongitudePairs",
          documents: ["unbounded", "current"]}}
      }
    }
}},
    {$project: {trajectory:
      {type: "LineString", coordinates: $coords}}}]
```

Fixed Windows
Percent of Total

If the user wanted to compute a percent contribution of each production facility to the region they are part of the syntax would be as follows:

```
[   {$group: {
      _id: {region: "$region", facility: "$facility"},
      facilityTotal: {$sum: "$units"}
    }},
    {$setWindowFields: {
      partitionBy: "$region",
      output: {
        regionTotal: {
          $sum: {
            input: "$facilityTotal"
          }
        }
      }
    }},
    {$project: {facilityContributionRatio:
      {$divide: ["$facilityTotal", "$regionTotal"]}}}
]
```

Rank

Rank creates a ranking of the rows based on a provided column. It starts with assigning "1" to the first row in the order and increments the following rows using different logic depending on the type of the ranking method used.

$documentNumber is the equivalent of the ROW_NUMBER( ) function in SQL and returns the unique document number based on the order of documents in the current partition. This is a monotonically increasing counter.

```
{$setWindowFields: {
   partitionBy: "$topic",
   sortBy: {title: 1},
   output: {
      newField: {$documentNumber: { }}
   }
}}
```

$rank returns the ranking of the current document within the current partition. Documents with the same value(s) for the sortBy by fields will result in the same ranking. For example, the sequence of values [25, 25, 50, 75, 75, 100] when ranked will return [1, 1, 3, 4, 4, 6]. Note that the values 2 and 5 are skipped.

```
{$setWindowFields: {
   partitionBy: "$department",
   sortBy: {salary: -1},
   output: {
      newField: {$rank: { }}
   }
}}
```

$denseRank is the equivalent of the DENSE_RANK( ) function in SQL and handles ties differently from $rank by assigning duplicates the next subsequent rank value. If we take the same sequence of values from the previous example: [25, 25, 50, 75, 75, 100], denseRank will return [1, 1, 2, 3, 3, 4]. Note that unlike $rank no values are skipped.

```
{$setWindowFields: {
   partitionBy: "$conference",
   sortBy: {score: -1},
   output: {
      newField: {$denseRank: { }}
   }
}}
```

First/Last

If the user wanted to compute the days since the first time an event had occurred (recency analysis) the syntax to retrieve the first event would be as follows:

```
{$setWindowFields: {
   partitionBy: "$customerID",
   sortBy: {transactionDate: 1},
   output: {
      firstPurchase: {
         $first: {
            input: "$transactionDate"
         }
      }
   }
}}
```

Note that a NULL value could be first or last depending on the sort order and BSON spec collation behavior. There may be a provided option to override this default sort behavior.

Shift

Assume the user wants to compute the difference between the current period and 4 periods earlier for each Weather Station to get Q1 2020-Q1 2019, Q2 2020-Q2 2019 and so on. Shift has an implied window frame of the entire partition and will error if the user explicitly specifies one (see error messages).

The syntax for to access the value of temperature from 4 periods prior is as follows:

```
{$setWindowFields: {
   partitionBy: "$weatherStation",
   sortBy: {myTimestampField: 1},
   output: {
      myFourPeriodsEarlierValueField: {
         $shift: {
            input: "$AvgTemperature",
            by: -4
         }
      }
   }
}}
```

At a partition boundary some referenced points may not exist.

Figure 21:
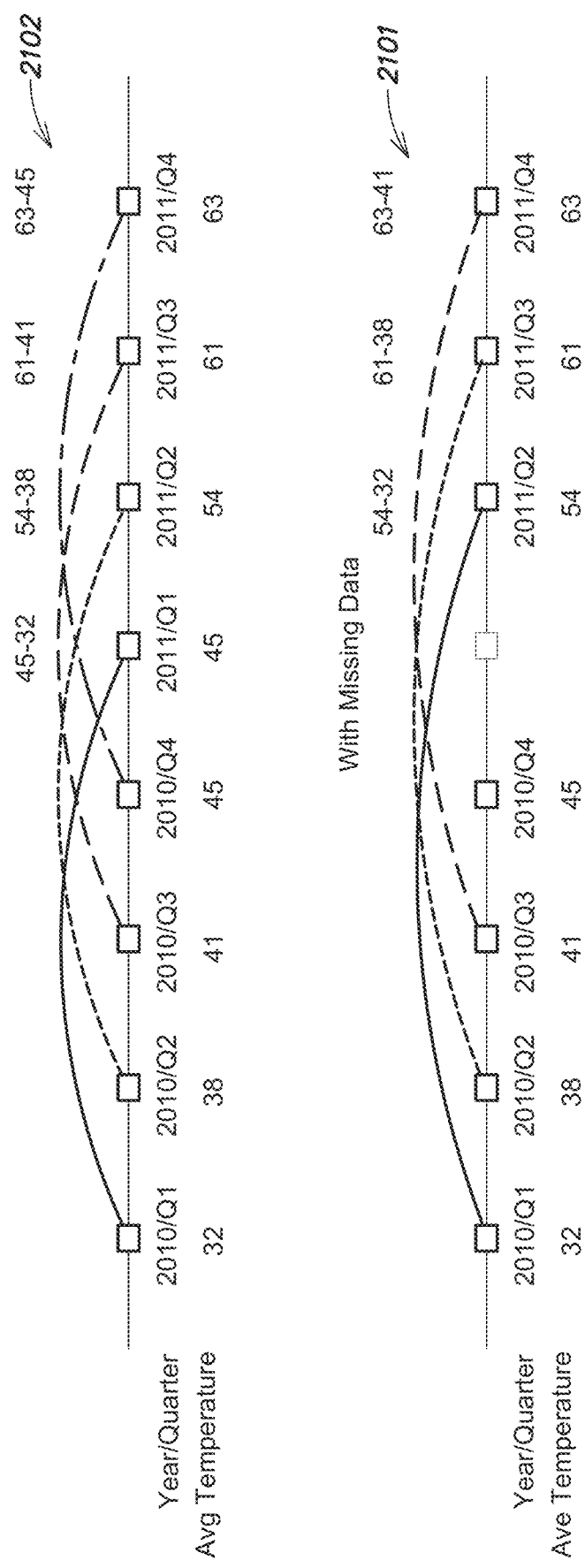
FIG. 21 shows an example where differences in temperature are calculated, and errors may occur due to missing data points.

FIG. 21 shows an example 2102 where differences in temperature are calculated, and errors may occur due to missing data points.

The syntax for to access the value of temperature from two periods prior on data partition by Year is as follows:

```
{$setWindowFields: {
   partitionBy: "$Year",
   sortBy: {myTimestampField: 1},
   output: {
      myFourPeriodsEarlierValueField: {
         $shift: {
            input: "$AvgTemperature",
            by: -2
         }
      }
   }
}}
```

Figure 22:
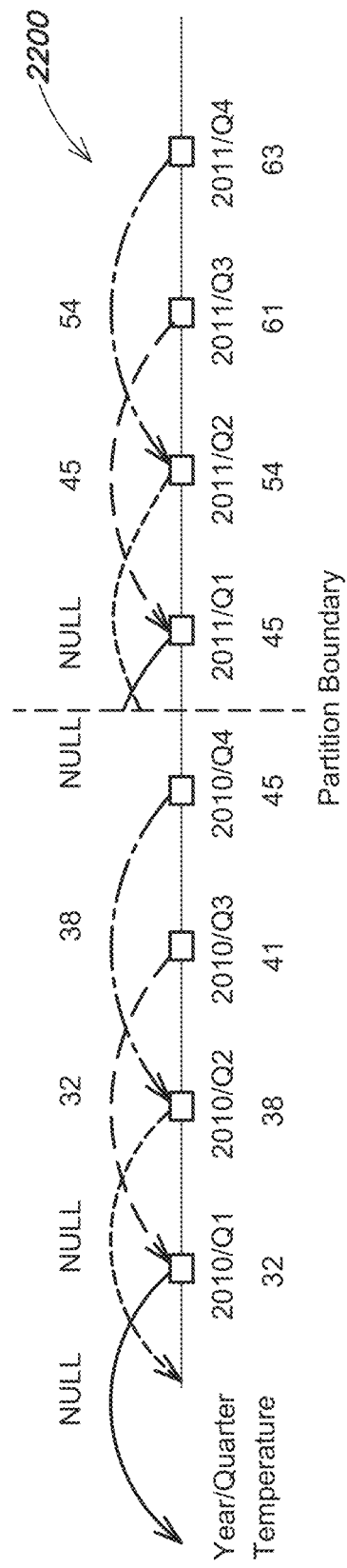
FIG. 22 shows an example where references outside of partition boundaries may cause errors.

At a partition boundary some referenced points may not exist as shown in FIG. 22. In particular, FIG. 22 shows an example where references outside of partition boundaries may cause errors. For example 2010/Q4 can look back 2 periods and find the value of 2010/Q2 but 2010/Q1 and 2010Q2 or 2011/Q1 and 2011/Q2 cannot, because there is a hit of the partition boundary and the system is not permitted to cross it.

In this case the process returns the default value of NULL. The user can override it by using the default option. This may be typically used when the beginning of a period implies a value because that is where measurement began (e.g. count, sales total etc. being 0) or in some cases if the metric is decrementing could be starting at a higher value.

by—defines how many periods or how much (in time units) to look back or forward.
   default: defines how missing values (either missing or beyond the partition boundaries) should be treated. Optional. Default is NULL.

Time-Based Window Aggregations

Figure 23:
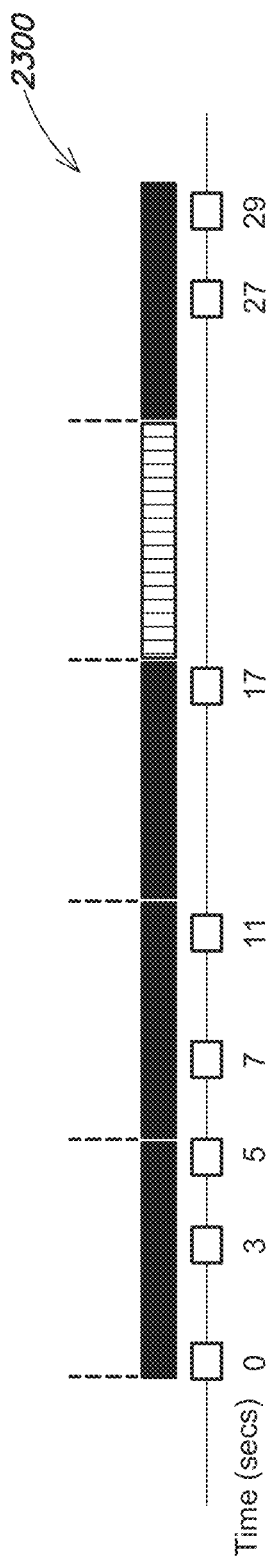
FIG. 23 shows time-based window aggregations according to various embodiments.

A 5-second moving average of temperature per sensor reported every 5 seconds (tumbling window). FIG. 23 shows time-based window aggregations 2300 according to various embodiments. In FIG. 23, the line-filled bar after 17 seconds indicate gaps in the measurements and such buckets would not exist in the output.

This example estimates bin boundaries exactly the same way dateTrunc does, locations of truncated bins are represented by dashed lines in FIG. 23.

In some embodiments, it will be possible to achieve this using the following syntax combining dateTrunc and a group:

```
{
$set: {
    ts: {$dateTrunc: {date: "$timestamp", binSize: 5, unit: "second"}
    }
  }
}
{
  $group: {
    _id: {timestamp: "$ts"},
    averageTemperature: {$avg: "$temperature"}
  }
}
```

One approach is to offer some "syntactic sugar" and handle these as by extending the existing $bucket aggregation stage.

```
$bucket: {
  groupBy: "$myDateTimeField",
  size:5,
  unit:"second",
  gapFill: true,
  output: {
    "averageTemperature": {$avg: "$temperature"}
  }
}
```

Figure 24:
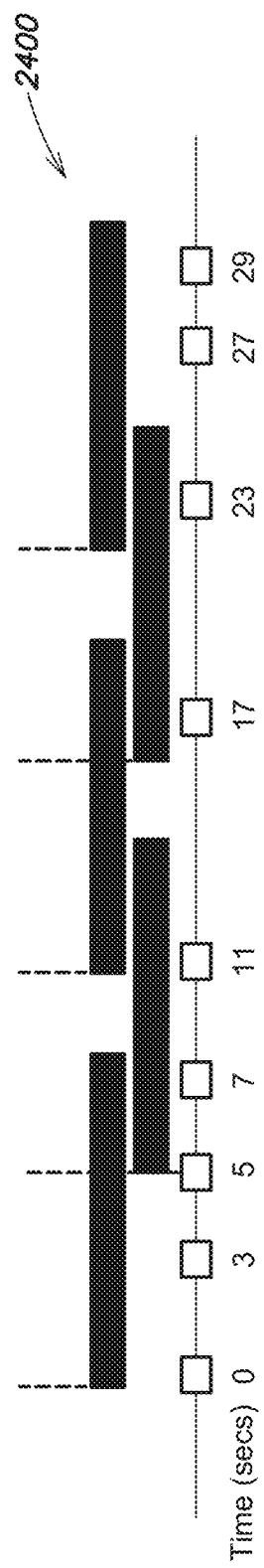
FIG. 24 shows an example of a moving average and time-based windowing according to various embodiments.

A 10-second moving average of a temperature per sensor reported every 5 seconds (hopping window). FIG. 24 shows an example timeline 2400 of a moving average and time-based windowing according to various embodiments.

In FIG. 24, dashed lines indicate where the 5-second dateBin would start but then instead of window expanding to cover just 5 seconds, it extends 10 seconds as it is the specified window size.

At minimum, it will be possible to achieve this result using the following syntax combining time based sliding window and a group:

```
{
$set: {
    ts: {$dateTrunc: {date: "$timestamp", binSize: 5, unit: "seconds"}}
  }
},
{
$setWindowFields: {
    partitionBy: "$sensor",
    sortBy: {ts: 1},
    output: {
      avgTemp: {$avg: {
        input "$temperature",
        range: [0, 10],
        unit: "seconds"
      }},
    }
  }
},
{
  $group: {
    _id: {timestamp: "$ts", sensor: "$sensor"},
    averageTemperature: {$first: "$avgTemp"}
  }
}
```

This comes with the limitation that window size has to be a factor of hop size (e.g. a 5 second hop) could have 10, 15, 20, etc. second windows and if the user provides a 13 second window, it will not raise any error and instead behave as if it were a 15 second window, since the dates between 10 and 15 seconds would all be truncated to 10.

One approach is to offer some "syntactic sugar" and error handling when hop and window sizes do not support the aforementioned constraint in which case the syntax will look as follows.

```
$timeBucket: {
  groupBy: "$myDateTimeField",
  size:10,
  stride:5,
  unit:"second",
  output: {
    "averageTemperature": {$avg: "$temperature"}
  }
}
```

Figure 25:
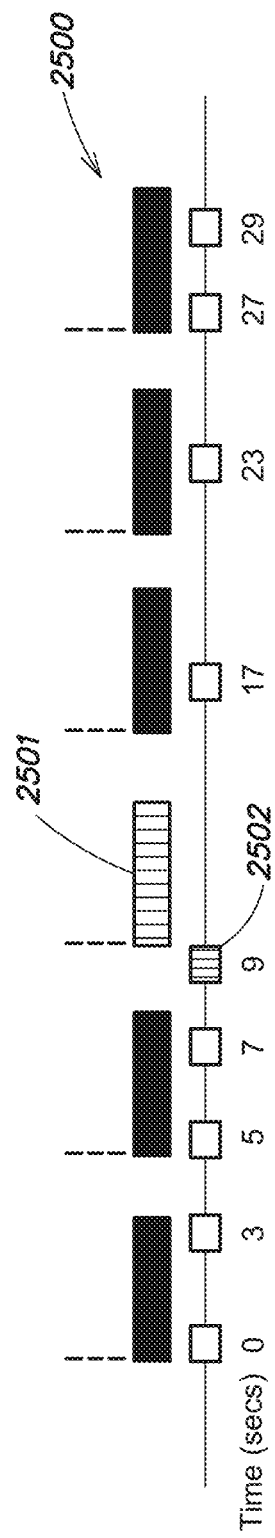
FIG. 25 shows an example showing how gaps might be handled according to various embodiments.

FIG. 25 shows an example showing how gaps might be handled according to various embodiments. In particular, FIG. 25 shows how gaps would be handled where the rectangle 2501 is an empty bucket (which would not exist in the output of the bucket function), while the square 2502 is a data point that doesn't belong in any bucket (which also wouldn't exist in the output).

At minimum, it will be possible to achieve this result using the following syntax combining time-based sliding window and a group:

```
{
$set: {
    ts: {$dateTrunc: {date: "$timestamp", binSize: 5, unit: "second"},
    diff:{$dateDiff: {startDate: "$ts",
              endDate: "$timestamp", unit: 'second'}
    },
}},
{$set: {
    temp: {$switch: {[
        { case: {$gt: ["$diff", 3 ]} }, then: null }],
        default: "$temperature"
    }}
  }
},
{
$setWindowFields: {
    partitionBy: "$sensor",
    sortBy: {ts: 1},
    output: {
      avgTemp: {$avg: {
        input: "$temp",
        window: {range: [0, 5], unit: "second"}
      }},
    }
  }
},
{
  $group: {
    _id: {timestamp: "$ts", sensor: "$sensor"},
    averageTemperature: {$first: "$avgTemp"}
  }
}
```

One goal is to offer some "syntactic sugar", with the help of which 3-second wide, 5-second hopping window could look as follows:

```
$bucket: {
  groupBy: "$myDateTimeField",
  size:3,
  stride:5,
  unit:"second",
```

```
        output: {
           "averageTemperature": {$avg: "$temperature"}
        }
     }
```

As you can tell, this piggy-backs on the existing bucket calculation e.g. with similar extension to bucket, user can bin a numeric field into bin sizes of 20 to create a histogram like output using:

```
              $bucket: {
                 groupBy: "$mySales",
                 size:20,
                 gapFill: true,
                 output: {
                    "count": { $sum: 1 }
                 }
              }
```

In this case, the bucket assignments would be the equivalent of CEILING(mySales/20)*20.

Session Windows

If the user wanted to count the number of clicks in a session that terminates if there is no activity for more than 45 seconds, the syntax is as follows.

```
{ $group :
  { _id :
    {$sessionize:{time:"$myDateTime", id:"$userid", timeout:4500}}
  },          total_clicks: {$sum: 1},
              session_start:{$min: "$myDateTime"},
              session_end:($max: "$myDateTime"}
}
```

In some embodiments, the same will be possible to achieve this using the following syntax combining shift, datediff and group as a workaround:

```
     {
     $setWindowFields: {
        partitionBy: "$userID",
        sortBy: {timestamp: 1},
        output: {
           myPriorTimestamp: {
              $shift: {
                 input: "$timestamp",
                 by: −1,
                 default: new Date("2001-01-01")
              }
           }
        }
     }
     },
     {$set: {
        diff:{$dateDiff: {startDate: "$myPriorTimestamp",
            endDate: "$timestamp", unit: 'millisecond'}}
     },
     {temp: { $cond: { if: { $gte: [ "$diff", 4500 ] },
        then: $timestamp, else: null }}
     },
     {$setWindowFields: {
        partitionBy: "$userID",
        sortBy: {timestamp: 1},
        output: {
           sessionstart: {
              $max: {
                 input: "$temp",
                 documents: ["unbounded", "current"]
              }
           }
        }
```

```
     }},
     {
        $group: {
           _id: {session: "$sessionStart", user: "$userID"},
           total_clicks: {$sum: 1},
           session_start:{$min: "$timestamp"},
           session_end:{$max: "$timestamp"}
        }
     }
```

Windowing Options

| Function Name/Description | Market/Use Case |
|---|---|
| Sliding windows (position-based and hybrid) E.g. position-based: 3 period moving average, running sum, difference from previous record, percent of total hybrid: slides by position (1 doc at a time) but range is defined in time units (e.g. 15-second moving average). | IoT/Business Analytics/Financial |
| Sliding windows (time-based) E.g. drivers over the speed limit in any given contiguous 10-second window | IoT/Fleet Management |
| Tumbling windows (time-based) E.g. hourly averages (non-overlapping windows) that return one (aggregate) output for each each time window | IoT/Business Analytics/Financial |
| Snapshot window Events that happened at the exact same timestamp Possible today using $group on timestamp | IoT/DevOps |
| Hopping windows (time-based) E.g. 15 second moving average, that hops forward every 5 seconds, returns one (aggregate) output for each 5 second hop | IoT/DevOps |
| Session windows | Web Analytics/DevOps |

Operators and Aggregation Functions

| Function Name/Description | Market/Use Case |
|---|---|
| sum (see here) | All |
| average (see here) | All |
| minimum | All |
| maximum | All |
| standard deviation | All |
| count distinct | All |
| count Allows identifying how many data points are in a time-based window e.g. in the last 15 second window our machines produced 28 items, in the current window only 1 also commonly used for counting total members of a partition. | All |
| shift (see here) Our version of SQL's lead/lag in a single function. Allows retrieving previous/next etc. value. | All |
| last (see here) Allows comparing the last value with other values in the partition. To retrieve the most recent sensor reading use $last aggregation instead. | All |
| first (see here) Allows comparing the first value with other values in the partition. | All |
| derivative (see here) | IoT/Financial |

-continued

| Function Name/Description | Market/Use Case |
|---|---|
| Used for quantifying change and sometimes trigger alerts if the change is larger than expected. | |
| integral (see here) | IoT/Financial |
| Typically used for quantifying the output or consumption of a process (e.g. a solar panel's production). | |
| covariance (see here) | IoT/Financial |
| Quantifies the directional relationship between two series. | |
| exponential moving average (see here) | Financial/IoT |
| A moving average that gives more weight to recent values than it does to older records. It is used in finance to track asset prices as well as in industrial operations for process stability control. | |
| push (see here) | All |
| Adds everything in the window to an array in the sort order specified | |
| addToSet (see here) | All |
| Adds all values in the window to an array, ignoring duplicates. Order is unspecified. | |
| rank (see here) | Business Analytics |
| A new version of SQL's ROW_NUMBER, RANK and DENSE_RANK. | |

Figure 7:
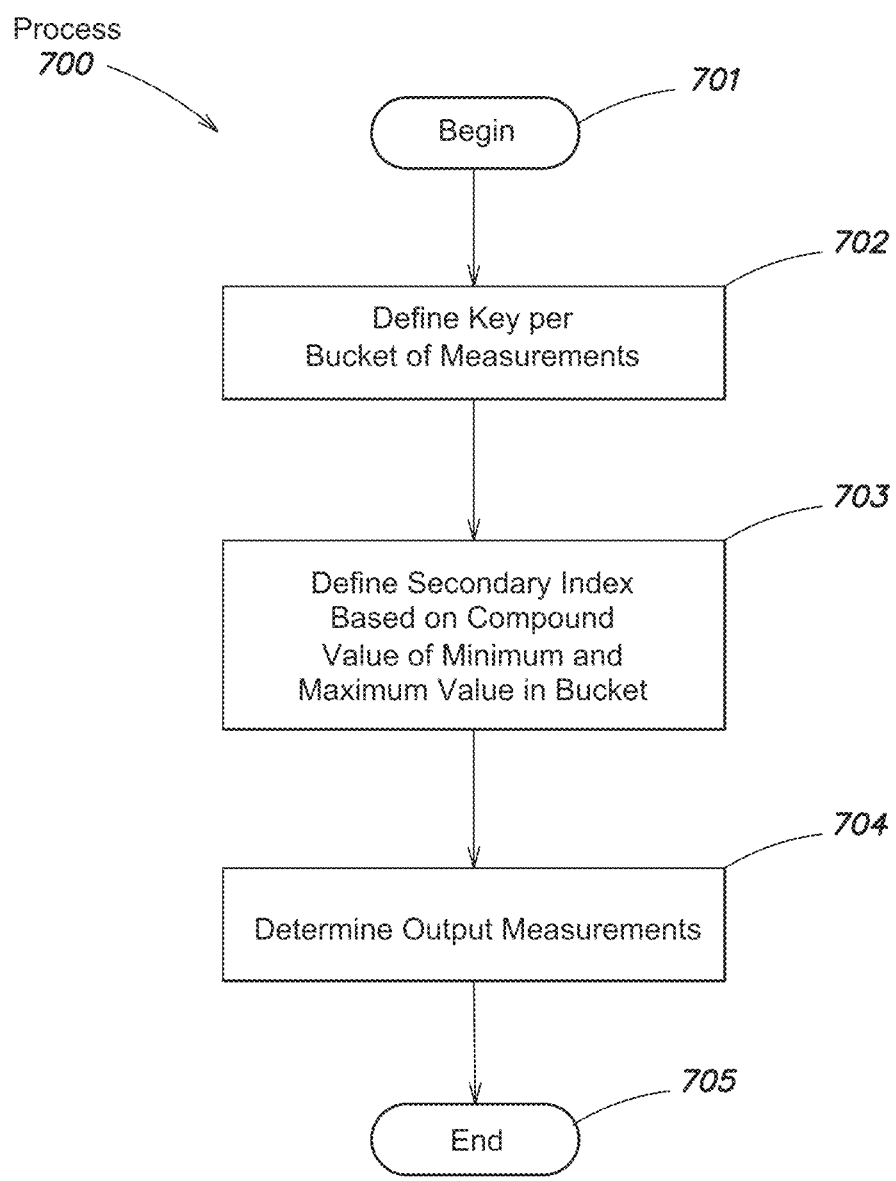
FIG. 7 shows an example process for creating a secondary index according to various embodiments.

FIG. 7 shows an example process for creating a secondary index according to various embodiments. At block 701, process 700 begins. At block 702 the system defines a key per bucket of measurements. At block 703, the system defines a secondary index based on a compound value of a minimum and maximum values within the bucket. At block 704, the system determines the output measurements based on the secondary index. At block 705, process 700 ends.

In some embodiments, secondary indexes only store one key per bucket, or group of measurements. For secondary indexes on time and other metrics, this key is a compound value of the minimum and maximum values in the bucket. This allows indexes to be orders of magnitude smaller than data, and allows optimized queries to skip vast ranges of data. The order of the minimum and maximum in the compound index key is reversed for descending indexes, allowing for efficient top-k queries.

In some additional embodiments, secondary indexes on geo-spatial metrics compute a small set of S2 cells, each a spherical quadrilateral, representing a region that covers all location values of the indexed field over the measurements included in the bucket. This allows indexing just a few cells per bucket, rather than a cell per metric.

Time-Series Support for Secondary Indexes
Detailed Design Examples
Feature Flag

As time-series collections will support secondary indexes by default, this project will use the existing featureFlag-TimeseriesCollection flag from PM-1952.

createIndexes

An example below uses a time-series collection abc created with the following options as an example:

```
{
    timeField: time,
    metaField: mm,
}
```

When creating a new index on abc, the index specification will be transformed into an index on the underlying bucket collection in the db.system.buckets.abc namespace.

Metadata Fields Only
A createIndexes command with a single metadata field:

```
{
    createIndexes: 'abc',
    indexes: [
        { key: { 'mm.tag1': 1 } }
    ]
}
``` will be equivalent to the follow operation on the underlying buckets collection:

```
{
    createIndexes: 'system.buckets.abc',
    indexes: [
        { key: { 'meta.tag1': 1 } }
    ]
}
```

By definition, the metadata field in the bucket collection is always named meta.

Metadata and Time Fields

If the index requested is a compound index with both the metadata and the time fields:

```
{
    createIndexes: 'abc',
    indexes: [
        { key: { 'mm.tag1': 1, time: 1 } }
    ]
}
```

The index specification created on the bucket collection will be:

```
{
    createIndexes: 'system.buckets.abc',
    indexes: [
        {
            key: {
                'meta.tag1': 1,
                'control.min.time': 1,
                'control.max.time': 1,
            }
        }
    ]
}
```

Because buckets in the underlying bucket collection may contain overlapping time ranges, we include both lower and upper bounds in the index to support the query optimizer's ability to order measurements. In this example, including control.min.time allows us to create bounds on the minimum time, Including control.max.time does not help provide an order, given the assumption that control.min.time will often be unique to a bucket. Instead it will allow us to confirm/reject a bucket without having to fetch it on the basis of time range.

Conversely if the time field has to be indexed in descending order, the system would transform a compound index:

```
{
    createIndexes: 'abc',
    indexes: [
        { key: { 'mm.tag1': 1, time: -1 } }
```

```
        ]
      }
    as follows:
  {
    createIndexes: 'system.buckets.abc',
    indexes: [
      {
        key: {
          'meta.tag1': 1,
          'control.max.time': -1,
          'control.min.time': -1,
        }
      }
    ]
  }
```

Densification

Any data but time-series, in particular, often misses documents because measurements were not captured. For example, two time-series for two products tracked over a certain period of time may not have events for each timestamp. That makes the data hard to compare and visualize. Also, there may be events missing for common timestamps in a given domain, say months, which gaps would skew people's perception of visualized data or make computation of window functions harder. This is separate but often followed by filling in missing values in documents without certain measurements.

Densification

It is pretty common for time series data to be uneven and have gaps. In order to perform analytics on such data and ensure correctness of results, quite often the gaps need to be filled first.

We will solve this by introducing two new aggregation stages: $densify and $fill. $densify will create new documents to eliminate the gaps in the time or numeric domain at the required granularity level. $fill will set values for the fields when value is null or missing. Filling of missing values can be done using linear interpolation, carrying over the last observation (or carrying backward next observation), or with constant. Densification and gap filling will be supported on both time series collections and regular collections as they will also benefit the ongoing real-timeanalytics effort.

The syntax used below is a placeholder to help think through the use cases and will most likely be changed as part of team review and/or during technical design. Those changes will be reflected in this document to avoid confusion among future readers.

```
[
  {
    "$densify": {
      "field": <string>,
      "partitionFields": [<string>, <string>, ...],
      "step": <int>,
      "unit": <string>,
      "range": <string> or [<lower bound>, <upper bound>]
    }
  }
]
``` field—required, supported types: date or numeric, the field to densify.
partitionFields—optional, set of fields that acts as a compound key to define each series. These fields will be carried over into the documents generated by densification step—required, constant
unit—required if 'field' is of type 'date', allowed values: "millisecond", "second", "minute", "hour", "week", "month", "quarter", "year"
range—optional, "full" or "partition" (if partition fields present), default: "full"
  "full"—the boundary for filling will be min and max of the 'field' across alldocuments entering the stage
  "partition"—the boundary will be different for each group of documentscorresponding to the partition
  [<lower bound>, <upper bound>]—the type of the bounds can be numeric ordate, and should correspond to the type of the 'field'

For example: densify date field "ts" to get to 5 minutes granularity for each series defined by fields "meta.location" and "meta.model" within a time range.

```
[
  {
    "$densify": {
      "field": "ts",
      "partitionFields": ["meta.location", "meta.model"],
      "step": 5,
      "unit": "minute",
      "Range":[ ISODate("2014-03-08T03:05:15"),
        ISODate("2014-03-08T03:10:15") ]
    }
  }
]
```

The last value that we generate for 'ts' field will be less or equal to the right bound of the range.
Created documents will look like this:

```
{
  "ts": "2021-03-08T03:05:15.000Z",
  "meta": {"location": "NE13", "model": "ACV13G"}
},
{
  "ts": "2021-03-08T03:05:15.000Z",
  "meta": {"location": "NE13", "model": "ACV14G"}
},
{
  "ts": "2021-03-08T03:010:15.000Z",
  "meta": {"location": "NE13", "model": "ACV13G"}
},
{
  "ts": "2021-03-08T03:010:15.000Z",
  "meta": {"location": "NE13", "model": "ACV14G"}
}
```

As an example, here are four different options for densification over the numeric field 'altitude' in a 'coffee' collection:

```
{
  "altitude": 600,
  "variety": "Arabica Typica","score": 68.3
},
{
  "altitude": 750,
  "variety": "Arabica Typica","score": 69.5
},
{
  "altitude": 950,
  "variety": "Arabica Typica","score": 70.5
},
{
```

```
            "altitude":
            1250,
            "variety":
            "Gesha",
            "score": 88.15
        },
        {
            "altitude":
            1700,
            "variety":
            "Gesha",
            "score": 95.5,
            "price": 1029
        }
```

Figure 26:
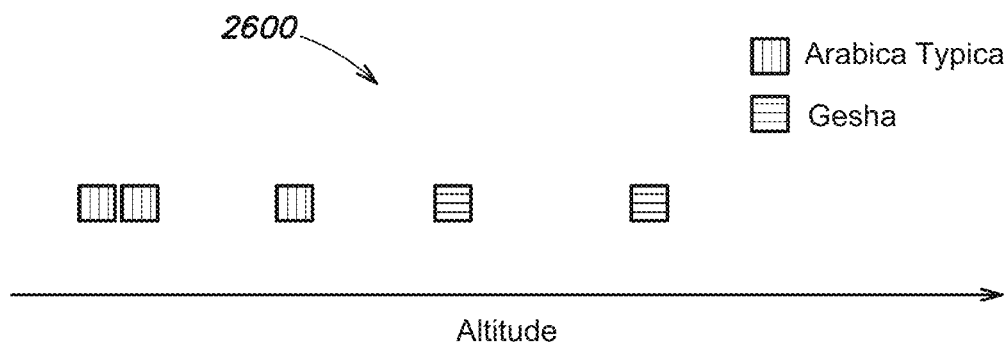
FIGS. 26, 27, 28, 29 and 30 show an example of densification as applied to fields in a data collection relating to coffee.

FIGS. 26, 27, 28, 29 and 30 show an example of densification as applied to fields in a data collection relating to coffee. FIG. 26 shows an example 2600 of different coffees where the parameter altitude may be densified.

EXAMPLE

1) Densify "altitude" to granularity of 200, so that each point on the 'altitude' will have at least one document:

```
[
    {
        "$densify": {
            "field": "altitude",
            "step": 200
        }
    }
]
```

Figure 27:
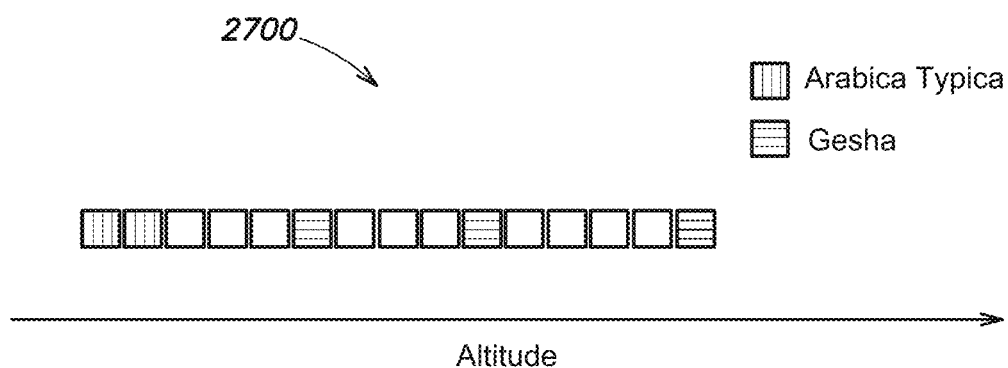

As shown by 2700 in FIG. 27, the minimum of 'altitude' is 600, maximum is 1700. Gaps in the 'altitude' will be filled in with documents like this:

```
        {
            "altitude": 600,
            "variety": "Arabica
            Typica","score": 68.3
        },
        {
            "altitude": 750,
            "variety": "Arabica
            Typica","score": 69.5
        },
        { "altitude": 800 },
        {
            "altitude": 950,
            "variety": "Arabica
            Typica","score": 70.5
        },
        { "altitude": 1000 },
        { "altitude": 1200 },
        {
            "altitude":
            1250,
            "variety":
            "Gesha",
            "score": 88.15
        },
        { "altitude": 1400 },
        { "altitude": 1600 },
        {
            "altitude":
            1700,
            "variety":
            "Gesha",
```

```
            "score": 95.5,
            "price": 1029
        }
```

2) Densify field "altitude" to granularity of 200 within fixed range of 400 to 2000

```
[
    {
        "$densify": {
            "field": "altitude",
            "step": 200,
            "range": [400, 2000]
        }
    }
]
```

Figure 28:
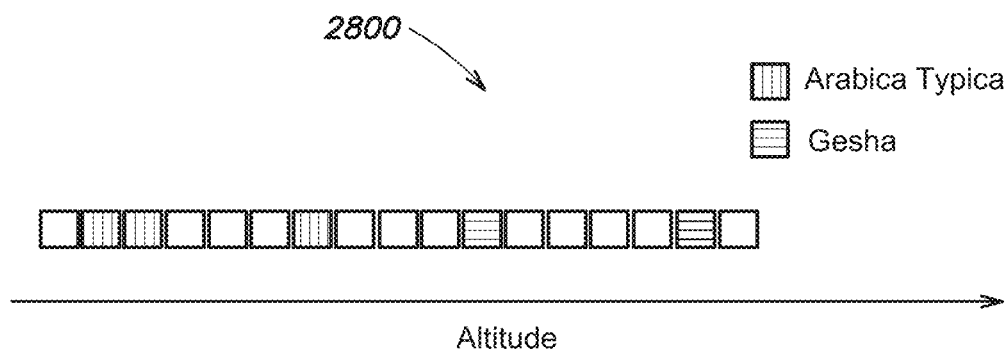

As shown by 2800 in FIG. 28, gaps in the 'altitude' will be filled in with documents similarly to the previous option:

```
        { "altitude": 400 },
        {
        "altitude": 600,
        "variety": "Arabica Typica", "score": 68.3
        },
        {
        "altitude": 750,
        "variety": "Arabica Typica", "score": 69.5
        },
        { "altitude": 800 },
        {
            "altitude": 950,
            "variety": "Arabica
            Typica","score": 70.5
        },
        { "altitude": 1000 },
            { "altitude": 1200 },
            {
                "altitude":
                1250,
                "variety":
                "Gesha",
                "score": 88.15
            },
            { "altitude": 1400 },
            { "altitude": 1600 },
            {
                "altitude":
                1700,
                "variety":
                "Gesha",
                "score": 95.5,
                "price": 1029
            },
            { "altitude": 1800 },
        { "altitude": 2000 }
```

3) Densify field "altitude" to get to granularity of 200 for each variety, so that each point on the 'altitude' will have a document for each 'variety':

```
[
    {
        "$densify": {
            "field": "altitude",
            "partitionFields": ["variety"],
            "step": 200,
            "range": "full"
        }
    }
]
```

Figure 29:
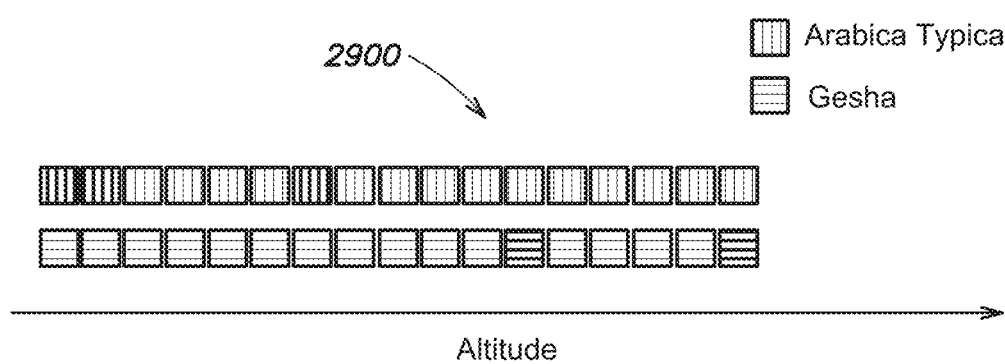

As shown by 2900 in FIG. 29, gaps may be filled in with documents like this:

```
{
    "altitude":
    600,
    "variety":
    "Gesha"
},
{
    "altitude": 800,
    "variety": "Arabica Typica"
},
{
    "altitude":
    800,
    "variety":
    "Gesha"
},
{
    "altitude": 1000,
    "variety": "Arabica
    Typica"
},
{
    "altitude":
    1000,
    "variety":
    "Gesha"
}
...
{
    "altitude": 1600,
    "variety": "Arabica
    Typica"
},
{
    "altitude":
    1600,
    "variety":
    "Gesha"
}
```

4) Densify numeric field "altitude" to get to granularity of 200 within each "variety", so that only gaps within each 'variety' will be densified:

```
[
    {
        "$densify": {
            "field": "altitude";
            "partitionFields": ["variety"],
            "step": 200;
            "range": "partition"
        }
    }
]
```

Figure 30:
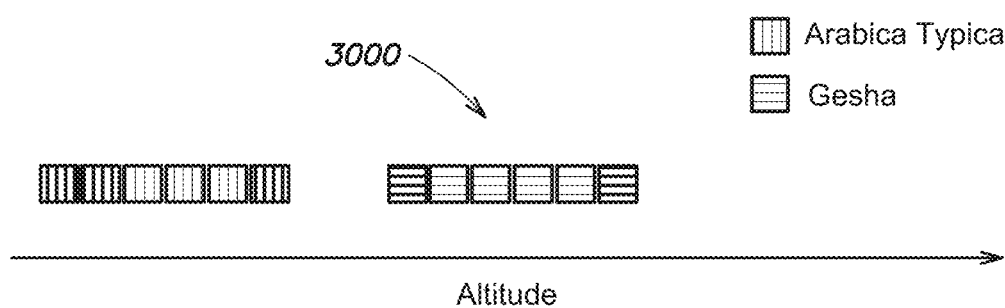

As shown by 3000 in FIG. 30, for partition of "*Arabica Typica*" range of 'altitude' is 600-900, for partition "Gesha" range is 1250-1700. The documents will be created like this:

```
{
    "altitude": 800,
    "variety": "Arabica Typica"
},
{
    "altitude":
    1450,
    "variety":
    "Gesha"
},
{
    "altitude": 1650,
```

"variety": "Gesha"
}

Gap Filling

In some embodiments, gap filling may be performed on some time series collections. In one implementation, a new stage called $fill sets values for null or missing fields. It can fill values using linear interpolation, last observation carried forward ("locf"), or expression that evaluates to a constant.

Note: interpolation and locf can be achieved with window functions, and filling with constant can be done with $ifNull. $fill stage is a syntactic sugar.

Stage $fill can fill in multiple fields at once using different methods.

```
"$fill": {
    "sortBy": <sort spec>,
    "partitionBy": <expression>,
    "output": [
        {"field": <string>, "method": <string> },
        {"field": <string>, "value": <expression> },
        ...
    ]
}
``` sortBy—syntax is the same as $sort, optional. Required for output.method "linear" or "locf"

partitionBy—optional, default is a single partition. Specification is the same as _id in $group (same as partitionBy in window functions)

output—required, array of objects for each field to fill in. For a single field, it can be a single object.

field—a field to be filled with value

'method' or 'value':

method—"linear" or "locf"

"linear"—values will be filled using linear interpolation based on the last observed value, the next observed value within a partition, and number of documents between these values. If there are no preceding or following values, field will be set to null "locf"—values will be filled with the last observed value within apartition. If the last value is missing, the field will be set to null.

value—an expression

For example:

```
{ a: 1, b: 40, x: 1}, { a: 2, x: 1 }, { a: 3, b: null, x: 1}, { a: 4, x: 1},
{ a: 5, b: 20, x: 2}, { a: 6, x: 2}, { a: 7, b: 40, x: 2}
"$fill": { "sortBy": { a:1 } , "output": {"field": "b", "method": "linear" } }
->>
{ a: 1, b: 40, x: 1}, { a: 2, b: 35, x: 1 }, { a: 3, b: 30, x: 1}, { a: 4, b: 25, x: 1},
{ a: 5, b: 20, x: 2}, { a: 6, b: 30, x: 2}, { a: 7, b: 40, x: 2}
"$fill":
{ "sortBy": { a:1 } , "partitionBy": "$x" , "output": {"field": "b", "method": "locf" } }
->>
{ a: 1, b: 40, x: 1}, { a: 2, b: 40, x: 1 }, { a: 3, b: 40, x: 1}, { a: 4, b:40, x: 1},
{ a: 5, b: 20, x: 2}, { a: 6, b:20, x: 2}, { a: 7, b: 40, x: 2}
{
    "$densify": {
        "field": <string>,
        "partitionFields": [<string>, <string>,...],
```

```
            "domain": {
                "step": <int>,
                "unit": <string>,
                "range": <string> or [<lower bound>, <upper bound>],
            }
        }
    }
or
{
    "$densify": {
        "field": <string>,
        "partitionFields": [<string>, <string>,...],
        "domain": {
            "collection": <string>,
            "pipeline": [ ]
        }
    }
}
or
{
    "$densify": {
        "field": <string>,
        "partitionFields": [<string>, <string>,...],
        "domain": [<value1>, <value2>, <value3>, ...]
    }
}
``` field—required, supported types: date or numeric, the field to densify.

partitionFields—optional, set of fields that acts as a compound key to define each series. These fields will be carried over into the documents generated by densification domain—optional. If not specified, densification will ensure that there is a point for each combination of 'field' and 'partitionField' based on the values present in the source collection. 'domain' can be an array of values that represent the complete domain for the 'field'. Or 'domain' can be document with the following options:

step—constant unit—required if step is specified and 'field' is of type 'date', allowed values: "millisecond", "second", "minute", "hour", "week", "month", "quarter", "year"

range—optional, "full" or "partition" (if partition fields present), default: "full"

"full"—the boundary for filling will be min and max of the 'field' across alldocuments entering the stage "partition"—the boundary will be different for each group of documentscorresponding to the partition

[<lower bound>, <upper bound>]—allowed if step is specified, the type of the bounds can be numeric or date, and should correspond to the type of the 'field' collection—optional, collection that contains a complete set of values for the 'field'. Cannot be used with 'step', 'unit' or 'range'.

pipeline—optional, allowed if 'collection' is specified, pipeline to be executed on the 'collection'

Filling NULL values via hindcasting.

This would be possible when we introduce forecasting as a window function for time series.

DENSIFICATION EXAMPLES

Below are a number of example use cases where densification may be used. Such use cases refer to the various examples provided below.

IoT/Sensor Data

Fill NULL values with the average of the two nearest points (via linear interpolation). (Example 1)

A customer has 3 metrics (wind speed, precipitation and temperature). For timestamps A and B precipitation and temperature exists but wind speed attribute is missing. For timestamps C and D wind speed exists but precipitation is missing. Userwants to get a view that has timestamps A,B,C,D with all three attributes. (Example 2)

Generate future data points on-the-fly to return the values of a time series forecast (if/when time series supports forecasting capabilities).

Financial Services

Join/Lookup prices of two different assets with non-matching timestamps (like a full outer join) to plot as a 15 minute time series chart with no gaps where no data means carrying the last non-NULL value forward. (Example 3)

Business Analytics

Fill NULL values with the last non-null value (e.g. inventory). (Example 1)

Fill NULL values with a fixed value (e.g. no measurement means 0 sales). (Example 1)

How many times did Coca Cola promotions overlap with Pepsi promotions in the last year? (Example 4)

Create a proper histogram (gaps are zero filled, not skipped) with a bin size of 10. (Example 5)

Get the Top 5 worst selling products for each season. Note that 0 sales is the worst and if no sales in a given time frame, there will be no record of that product in that time frame e.g. no record for Beach Towel sales in December while a record for Beach Towel exists in the summer. (Example 6)

Compare each product to every other product pairwise (cartesian join) e.g. to compute a correlation or covariance matrix. (Example 7)

Logistics/Fleet Management/Hospitality/Health Care

How many cars have we had in the parking lot waiting to be rented daily for the past 60 days (using check out-check in dates for each vehicle)? (Example 8)

How many cars did we have in the parking lot last year on average for each XBZ Rental car facility (using check out-check in dates for each vehicle)? (Example 9)

Given latitude-longitude of source and destination for multiple flights, find all the aircraft that flew over a certain polygon assuming a linear or great circle trajectory.

Example 1 (Densify and Fill Values Using Different Methods)

Report hourly average temperature, total motion and maximum of stock items for each room. If data is missing, fill in the average temperature using interpolation, total motion as 0, and for maximum stock of items—carry over the last observed value.

```
{
    "ts": { "$date": "2021-03-08T03:01:15.000Z" },
    "roomId": 123,
    "temp": 60,
    "items": 40,
    "motion": 12
}
[
```

```
{
    "$group": {
        "_id": {
            "time": {
                "$dateTrunc": { "date": "$ts", "unit": "hour" }
            },
            "roomId": "$roomId"
        },
        "avg_temp": { "$avg": "$temp" },
        "total_motion": { "$sum": "$motion" },
        "max_stock": { "$max": "$items" }
    }
},
{
    "$project": {
        "_id": 0,
        "time": "$_id.time",
        "roomId": "$_id.roomId",
        "avg_temp": 1,
        "total_motion": 1,
        "max_stock": 1
    }
}
```

```
},
{
    "$densify": {
        "field": "time",
        "partitionFields": "roomId",
        "unit": "hour",
        "step": 1
    }
},
{
    "$fill": {
        "sortBy": { "time": 1 },
        "partition": "$roomId",
        "output": [
            { "field": "avg_temp", "method": "linear" },
            { "field": "max_stock", "method": "locf" },
            { "field": "total_motion", "value": 0 }
        ]
    }
}
]
```

| Before $densify | After $densify |
|---|---|
| { time: "2021-03-08T01:00:00.000Z" , roomId: 1, avg_temp: 30, total_motion: 1, max_stock: 32 }, | { time: "2021-03-08T01:00:00.000Z" , roomId: 1, avg_temp: 30, total_motion: 1, max_stock: 32 }, |
| { time: "2021-03-08T02:00:00.000Z", roomId: 1, avg_temp: 34, total_motion: 5, max_stock: 36 }, | { time: "2021-03-08T02:00:00.000Z", roomId: 1, avg_temp: 34, total_motion: 5, max_stock: 36 }, |
| { time: "2021-03-08T03:00:00.000Z", roomId: 1, avg_temp: 27, total_motion: 9, max_stock: 29 }, | { time: "2021-03-08T03:00:00.000Z", roomId: 1, avg_temp: 27, total_motion: 9, max_stock: 29 }, |
| | { time: "2021-03-08T04:00:00.000Z", roomId: 1 }, |
| { time: "2021-03-08T05:00:00.000Z", roomId: 1, avg_temp: null, total_motion: null, max_stock: 33 }, | { time: "2021-03-08T05:00:00.000Z", roomId: 1, avg_temp: null, total_motion: null, max_stock: 33 }, |
| | { time: "2021-03-08T06:00:00.000Z", roomId: 1 }, |
| { time: "2021-03-08T07:00:00.000Z", roomId: 1, avg_temp: 31, total_motion: null, max_stock: null } | { time: "2021-03-08T07:00:00.000Z", roomId: 1, avg_temp: 31, total_motion: null, max_stock: null } |

| Before $fill | After $fill |
|---|---|
| { time: "2021-03-08T01:00:00.000Z" , roomId: 1, avg_temp: 30, total_motion: 1, max_stock: 32 }, | { time: "2021-03-08T01:00:00.000Z" , roomId: 1, avg_temp: 30, total_motion: 1, max_stock: 32 }, |
| { time: "2021-03-08T02:00:00.000Z", roomId: 1, avg_temp: 34, total_motion: 5, max_stock: 36 }, | { time: "2021-03-08T02:00:00.000Z", roomId: 1, avg_temp: 34, total_motion: 5, max_stock: 36 }, |
| { time: "2021-03-08T03:00:00.000Z", roomId: 1, avg_temp: 27, total_motion: 9, max_stock: 29 }, | { time: "2021-03-08T03:00:00.000Z", roomId: 1, avg_temp: 27, total_motion: 9, max_stock: 29 }, |
| { time: "2021-03-08T04:00:00.000Z", roomId: 1 }, | { time: "2021-03-08T04:00:00.000Z", roomId: 1, |

| Before $fill | After $fill |
|---|---|
| { time: "2021-03-08T05:00:00.000Z", roomId: 1, avg_temp: null, total_motion: null, max_stock: 33 }, { time: "2021-03-08T06:00:00.000Z", roomId: 1 }, { time: "2021-03-08T07:00:00.000Z", roomId: 1, avg_temp: 31, total_motion: null, max_stock: null } | avg_temp: 28, total_motion: 0, max_stock: 29 }, { time: "2021-03-08T05:00:00.000Z", roomId: 1, avg_temp: 29, total_motion: 0, max_stock: 33 }, { time: "2021-03-08T06:00:00.000Z", roomId: 1, avg_temp: 30, total_motion: 0, max_stock: 33 }, { time: "2021-03-08T07:00:00.000Z", roomId: 1, avg_temp: 31, total_motion: 0, max_stock: 33 } |

Figure 31:
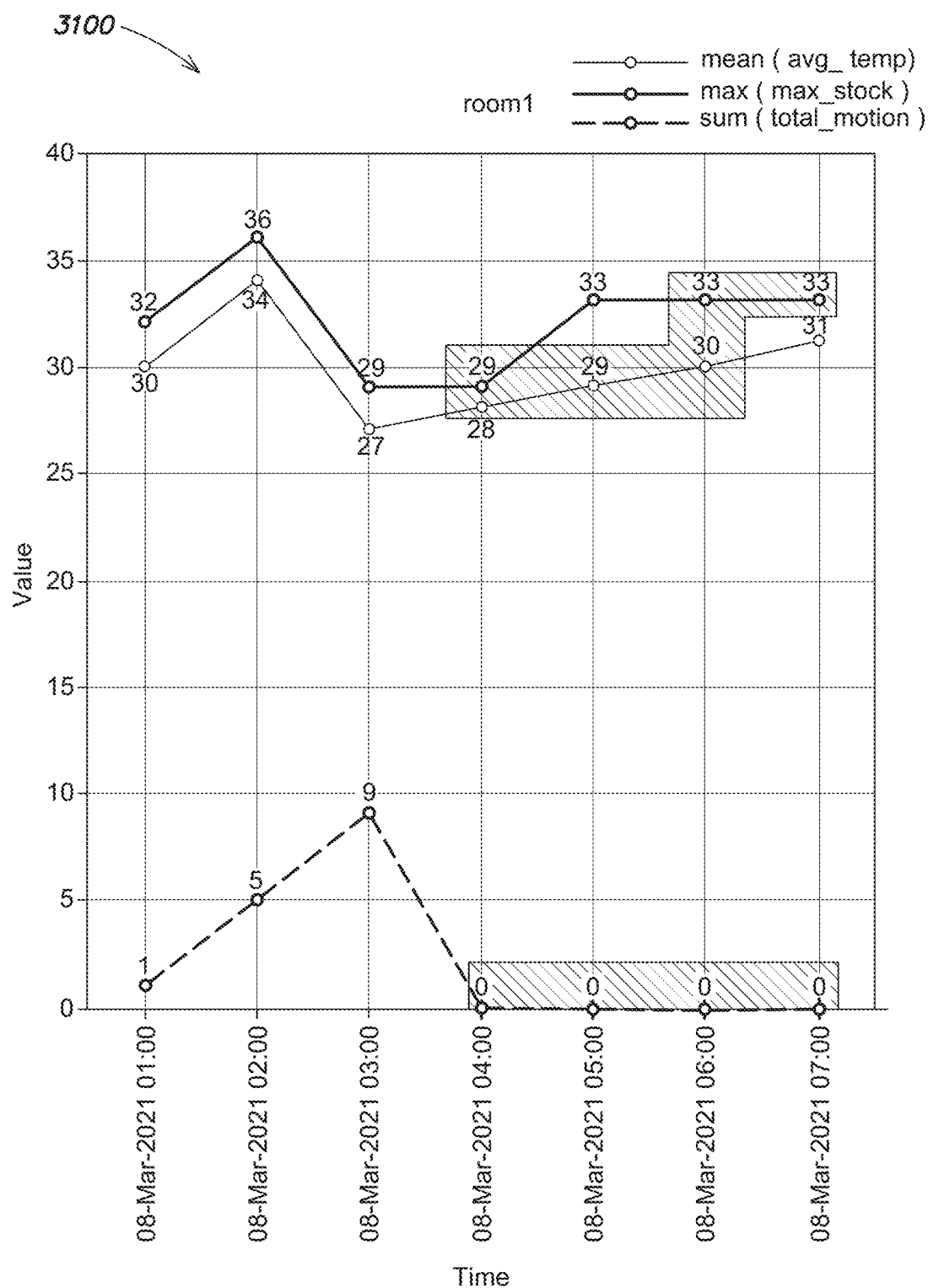
FIG. 31 shows densification and filling of values as applied to a room data collection.

FIG. 31 shows densification and filling of values in chart 3100 as applied to the room data collection described above.

Example 2 (Gap Fill without Densification)

A customer has 3 metrics (motion, temperature, and number of items stored in the room). Some timestamps have some data points missing. They want to get a view of each timestamp with all metrics filled in. Densification of timestamps is not required.

If data for motion is missing, it should be filled in with 0, temperature should be interpolated, and number of items should be carried forward from the last known value.

```
[{
  "$fill": {
    "sortBy": { "ts": 1 },
    "partition": "$roomId",
    "output": [
      { "field": "temp", "method": "linear" },
      { "field": "items", "method": "locf" },
      { "field": "motion", "value": 0 }
    ]
  }
}]
```

| Collection before filling | Collection after filling |
|---|---|
| { "ts": { "$date": "2021-03-08T03:01:00.000Z" }, "roomId": 123, "temp": 60, "items": 40 } | { "ts": { "$date": "2021-03-08T03:01:00.000Z" }, "roomId": 123, "motion": 0, "temp": 60, "items": 40 } |
| { "ts": { "$date": "2021-03-08T03:06:00.000Z" }, "roomId": 123, "motion": 2, "items": 41 } | { "ts": { "$date": "2021-03-08T03:06:00.000Z" }, "roomId": 123, "motion": 2, "temp": 63, "items": 41 } |
| { "ts": { "$date": "2021-03-08T03:10:00.000Z" }, "roomId": 123, "motion": 10, "items": null | { "ts": { "$date": "2021-03-08T03:10:00.000Z" }, "roomId": 123, "motion": 10, "temp": 66, |
| } "items": 41 } |
| { "ts": { "$date": "2021-03-08T03:21:00.000Z" }, "roomId": 123, "items": 39 } | { "ts": { "$date": "2021-03-08T03:21:00.000Z" }, "roomId": 123, "motion": 0, "temp": 69, "items": 39 } |
| { "ts": { "$date": "2021-03-08T03:30:00.000Z" }, "roomId": 123, "motion": 5, "temp": 72 } | { "ts": { "$date": "2021-03-08T03:30:00.000Z" }, "roomId": 123, "motion": 5, "temp": 72 "items": 39 } |

Figure 32:
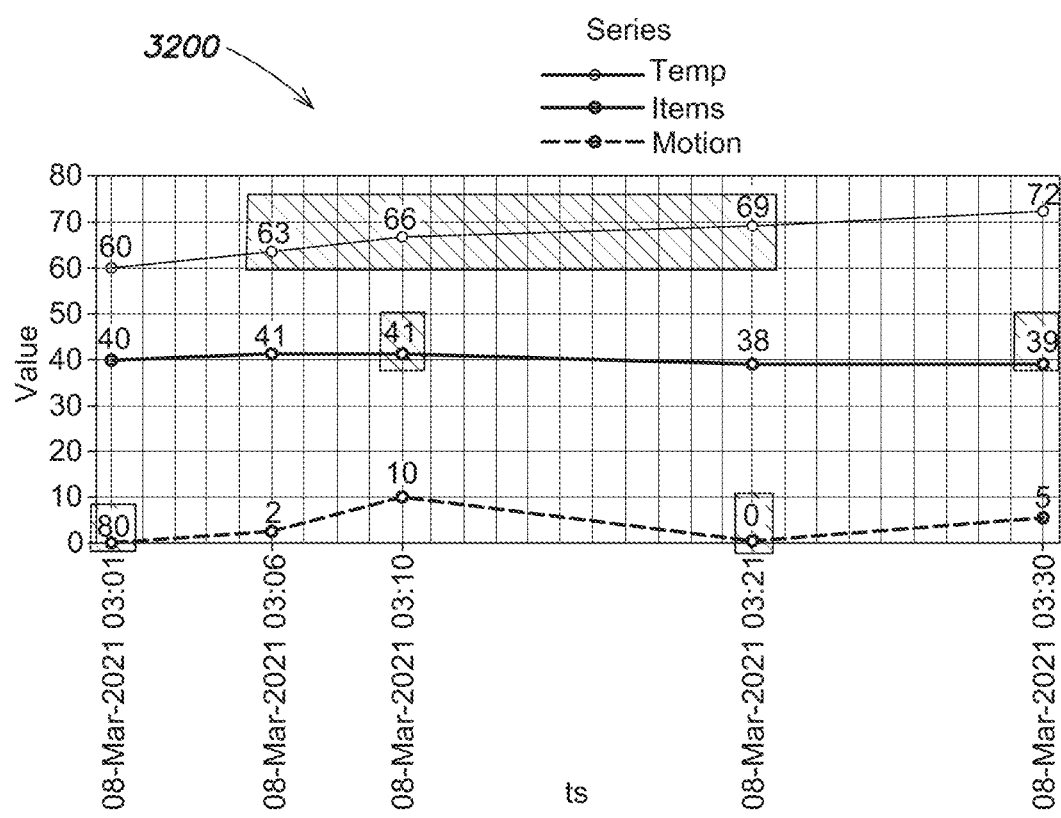
FIG. 32 shows storage of a room data collection where gaps are filled without densification.

Here interpolation was based on the number of documents. What is ignored here is the fact that the points for temperature are not distributed evenly over 'ts': 03:01, 03:06, 03:10, 03:21, 03:30. FIG. 32 shows a chart 3200 associated with storage of the room data collection where gaps are filled without densification.

Figure 33:
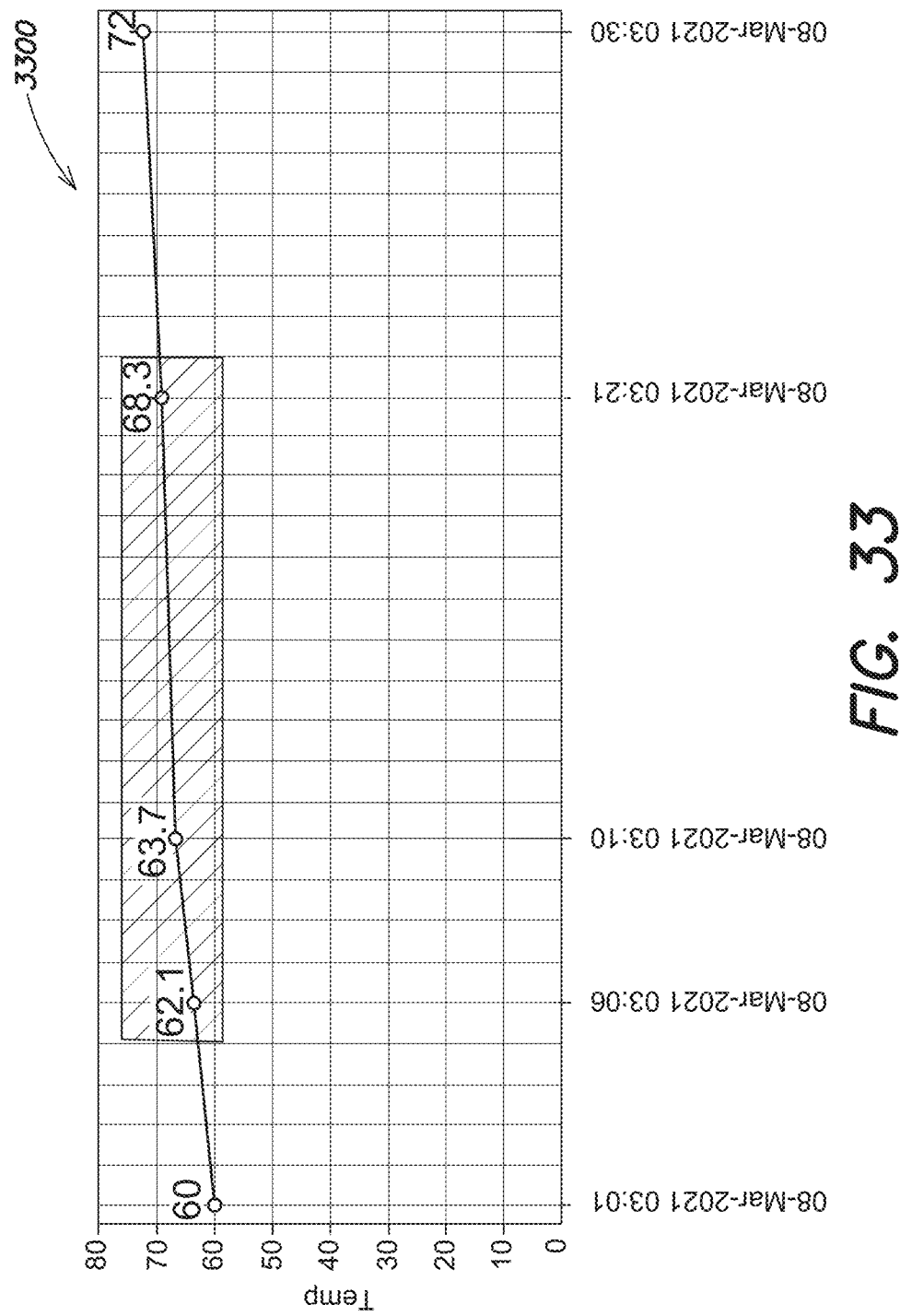
FIG. 33 shows interpolation as a function of distance between documents.

Ideally interpolation will take into consideration the distance between documents along the 'ts' time field. For instance, FIG. 33 shows a chart 3300 showing interpolation as a function of distance between documents.

Example 3 (Price of Two Assets)

Join prices of two different assets with non-matching timestamps to plot as a 15 minute time series chart with no gaps where no data means carrying the last non-NULL value forward.

Collection "price_tracker"

if there are two collections, we can start with $unionWith stage to combine them together db.price_tracker_AB.aggregate([{$unionWith: {coll: 'price_tracker_XY'}}])

```
db.price_tracker_AB.aggregate( [ { $unionWith: { coll: 'price_tracker_XY' } } ] )
{
    date: 2020-01-01T03:40:00.000Z,
    assetId:
```

```
              'AB1', price:
              20
         }
    {
              date: 2020-01-01T03:50:00.000Z,
              assetId:
              'AB1', price:
              23
         }
    {
              date: 2020-01-01T03:55:00.000Z,
              assetId:
              'XY4',price:
              22
         }
    {
              date: 2020-01-01T03:57:00.000Z,
              assetId:
              'XY4',price:
              30
         }
    {
              date: 2020-01-01T04:21:00.000Z,
              assetId: 'XY4',
              price: 27
         }
    }
[
    {
         "$set": {
              "date": {
                   "$dateTrunc": {
                        "date": "$ts",
                        "binSize": "15",
                        "unit": "minute"
                   }
              }
         }
    },
    {
         "$group": {
              "_id": { "date": "$date", "assetId": "$assetId" },
              "price": { "$avg": "$price" }
         }
    },
    {
         "$densify": {
              "field": "_id.date",
              "partitionFields": "_id.assetId",
              "step": 15,
              "unit": "minute"
         }
    },
    {
         "$fill": {
              "sortBy": { "_id.date": 1 },
              "partition": "$_id.assetId",
              "output": { "field": "price", "method": "locf" }
         }
    },
    {
         "$project": {
              "date": "_id.date",
              "assetId": "$_id.assetId",
              "price": "$price"
         }
    }
]
    {
              date: 2020-01-01T03:30:00.000Z,
              assetId:
              'AB1',
              price: 20
         }
    {
              date: 2020-01-01T03:30:00.000Z,
              assetId:
              'XY4',
              price: null
```

```
         }
    {
              date: 2020-01-01T03:45:00.000Z,
              assetId:
              'AB1',
              price: 23
         }
    {
              date: 2020-01-01T03:45:00.000Z,
              assetId:
              'XY4',
              price: 26
         }
    {
              date: 2020-01-01T04:00:00.000Z,
              assetId: 'AB1',
              price: 23
         }
    {
              date: 2020-01-01T04:00:00.000Z,
              assetId: 'XY4',
              price: 26
         }
    {
              date: 2020-01-01T04:15:00.000Z,
              assetId: 'AB1',
              price: 23
         }
    {
              date: 2020-01-01T04:15:00.000Z,
              assetId:
              'XY4',
              price: 27
         }
```

Figure 34:
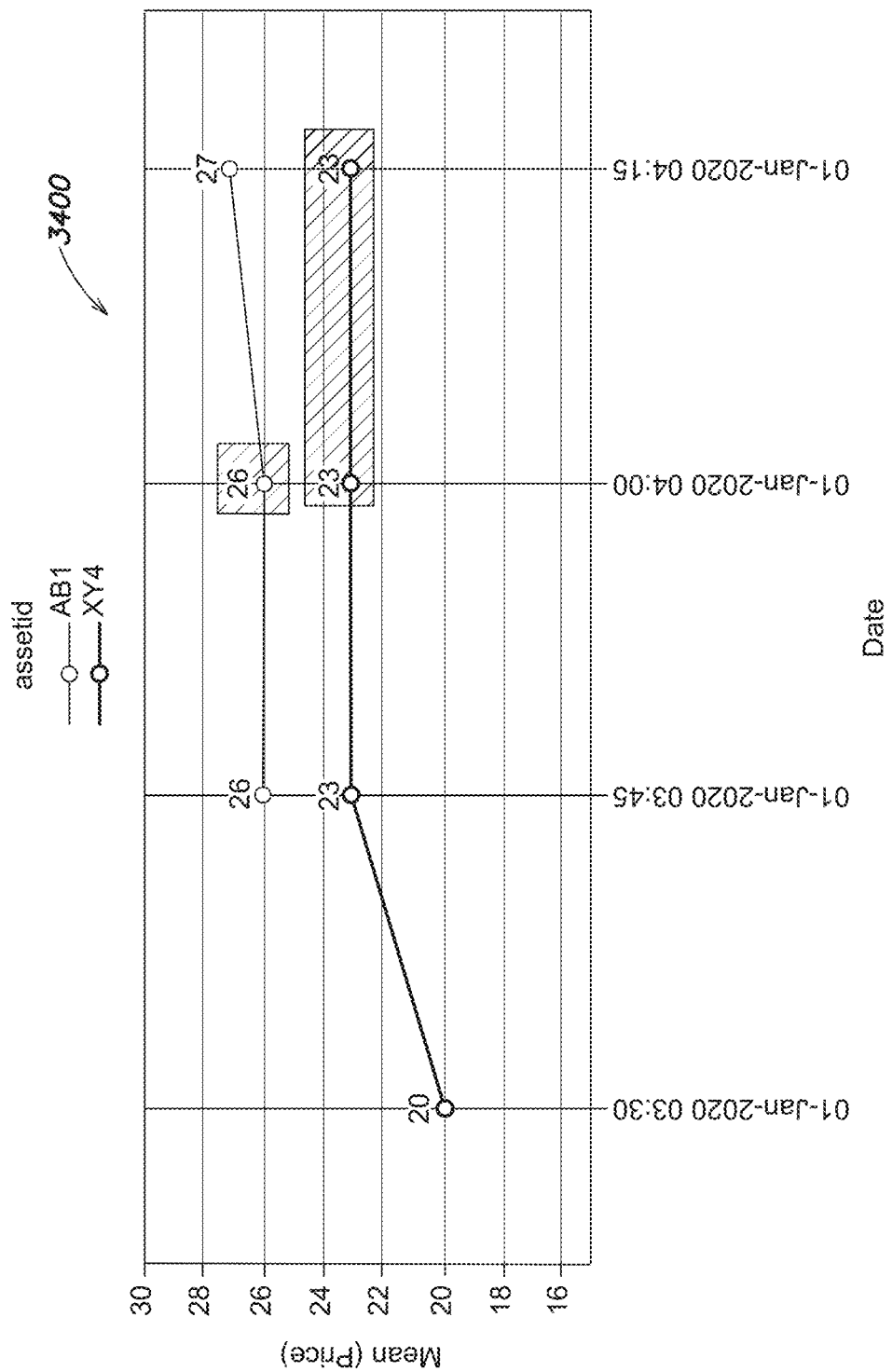
FIG. 34 shows an example of joining two different timeseries data points by carrying a non-null value forward as applied to a price data collection.

FIG. 34 shows a chart 3400 associated with the example of joining two different timeseries data points by carrying a non-null value forward as applied to a price data collection.

Example 4 (Promotions)

It may be desired to determine how many times did Coca Cola promotions overlap with Pepsi promotions in the last year. To determine this:

```
'promos_coke'
{
    "startDate": { "$date": "2020-04-10T03:42:00.000Z" },
    "endDate": { "$date": "2020-04-
13T03:42:00.000Z" },"promoId": "EASTRBNN"
}, ...
'promos_pepsi'
{
    "startDate": { "$date": "2020-04-12T00:00:00.000Z" },
    "endDate": { "$date": "2020-04-15T03:42:00.000Z" },
    "promoId": "Easter"
}, ...
```

To find overlapping promotions we can use $lookup

```
[
    {
         "$lookup": {
              "from": "promos_pepsi",
              "let": { "coke_start": "$startDate", "coke_end":
              "$endDate" },
              "pipeline": [
                   {
                        "$match": {
                             "$expr": {
                                  "$and": [
                                       { "$gte": [ "$endDate",
                                       "$$coke_start" ] },
```

```
                    { "$lte": [ "$startDate", "$$coke_end"
                    ] }
                  ]
                }
              }
            }
          ],
          "as": "pepsi"
        }
      },
      {
        "$match": {
          "$expr": { "$gt": [ { "$size": "$pepsi" }, 0 ] }
        }
      }
    ]
    {
      "startDate": "2020-04-
      10T03:42:00.000Z","endDate": "2020-
      04-13T03:42:00.000Z",
      "brand": "Coca
      Cola", "promoId":
      "EASTRBNN",
      "pepsi": [
        {
          "startDate": "2020-04-
          12T00:00:00.000Z","endDate": "2020-
          04-15T00:00:00.000Z",
          "brand":
          "Pepsi",
          "promoId":
          "EasterB"
        }
      ]
    },
    ...,
    {
      "startDate": "2020-04-
      15T00:00:00.000Z","endDate": "2020-
      04-20T03:42:00.000Z",
      "brand": "Coca Cola",
      "promoId": "Post
      Easter","pepsi": [
        {
          "startDate": "2020-04-
          12T00:00:00.000Z","endDate": "2020-
          04-15T00:00:00.000Z",
          "brand":
          "Pepsi",
          "promoId":
          "EasterB"
        }
      ]
    }
```

If we want to get the timeline to plot on the graph, we can use densification.

Step1: Use $unionWith to combine two collection into one 'promotions' collection:

```
    {
      "startDate": { "$date": "2020-04-10T03:42:00.000Z" },
      "endDate": { "$date": "2020-04-13T03:42:00.000Z" },
      "brand": "Coca
      Cola","promoId":
      "EASTRBNN"
    },
    {
      "startDate": { "$date": "2020-04-12T00:00:00.000Z" },
      "endDate": { "$date": "2020-04-15T03:42:00.000Z" },
      "brand":
      "Pepsi",
      "promoId":
      "Easter"
    } ...
```

Step2: Transform into time series structure, limit to records for year 2020.

```
[
  {
    "$match": {
      "$and": [
        { "startDate": { "$gte": "ISODate"('2020-01-01') } },
        { "startDate": { "$lte": "ISODate"('2020-12-31') } }
      ]
    }
  },
  {
    "$set": { "ts": ["$startDate", "$endDate"] }
  },
  {
    "$unwind": { "path": "$ts" }
  },
  {
    "$project": { "startDate": 0, "endDate": 0
    }
  }
]
```

Now there are two documents for each promotion: one for start date, one for end date.

```
{
  "ts": "2020-04-10T03:42:00.000Z",
  "brand": "Coca
  Cola","promoId":
  "EASTRBNN"
},
{
  "ts": "2020-04-13T03: 42: 00.000Z",
  "brand": "Coca
  Cola","promoId":
  "EASTRBNN"
},
{
  "ts": "2020-04-12T00:00:00.000Z",
  "brand":
  "Pepsi",
  "promoId":
  "Easter"
},
{
  "ts": "2020-04-15T03: 42: 00.000Z
  "brand":
  "Pepsi",
  "promoId":
  "Easter"
}
```

Figure 35:
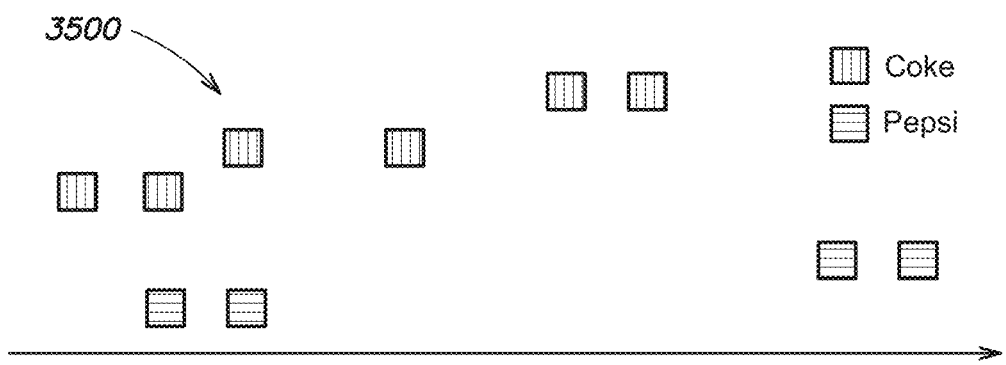
FIGS. 35, 36 and 37 shows densification as applied to a promotions data collection.
Figure 36:
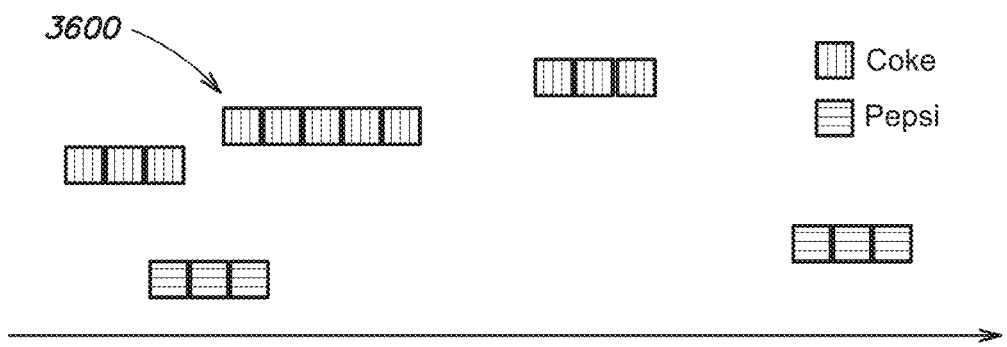
Figure 37:
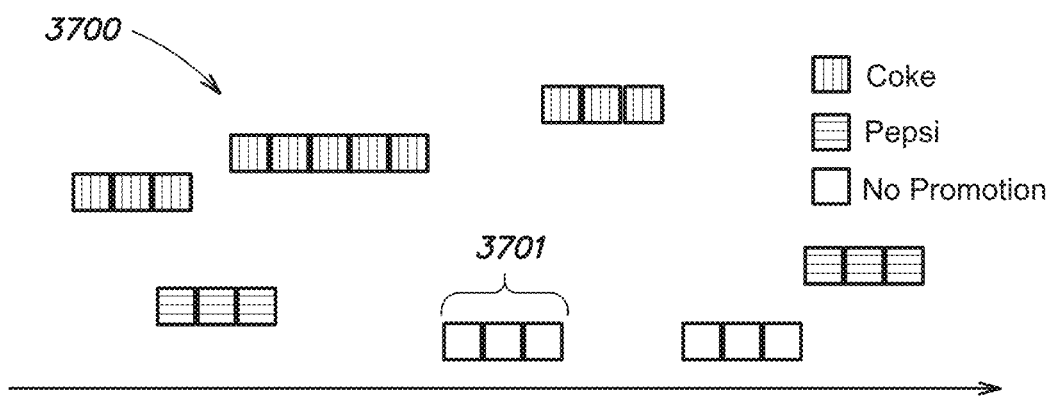

FIGS. 35, 36 and 37 shows densification as applied to the promotions data collection. In particular, FIG. 35 shows a chart 3500 the documents created as a function of time.

Step3: densify timeline for each promotion separately: partition by 'brand' and 'promoId', and fill in within the range of each partition.

```
[
  {
    "$set": {
      "date": {
```

```
        "$dateTrunc": { "date": "$ts", "unit": "day" }
      }
    }
  },
  {
    "$densify": {
      "field": "date",
      "partitionFields": [ "brand", "promoId"],
      "unit": "day",
      "step": 1,
      "range": "partition"
    }
  }
}]
```

FIG. 36 shows a chart 3600 that densifies each promotion separately by brand and fills in the range of each partition.

```
{
    "ts": "2020-04-10T00:00:00.000Z",
    "brand": "Coca
    Cola","promoId":
    "EASTRBNN"
},
{
    "ts": "2020-04-11T00:00:00.000Z",
    "brand": "Coca Cola",
    "promoId": "EASTRBNN"
},
{
    "ts": "2020-04-12T00:00:00.000Z",
    "brand": "Coca Cola",
    "promoId": "EASTRBNN"
},
{
    "ts": "2020-04-13T00:00:00.000Z",
    "brand": "Coca
    Cola","promoId":
    "EASTRBNN"
},
{
    "ts": "2020-04-12T00:00:00.000Z",
    "brand":
    "Pepsi",
    "promoId":
    "Easter"
},
{
    "ts": "2020-04-13T00:00:00.000Z",
    "brand": "Pepsi",
    "promoId": "Easter"
},
{
    "ts": "2020-04-14T00:00:00.000Z",
    "brand": "Pepsi",
    "promoId": "Easter"
},
{
    "ts": "2020-04-15T00:00:00.000Z"
    "brand":
    "Pepsi",
    "promoId":
    "Easter"
}
```

Step4: apply $densify again to fill gaps in the full timeline with documents like this:

```
{
    "ts": "2020-04-17T00:00:00.000Z
}
[
    ...
    {
        "$densify": {
```

```
            "field": "date",
            "unit": "day",
            "step": 1
        }
    }
}]
```

FIG. 37 shows a chart 3700 that applies densify again and fills gaps in the timeline. Notably, range 3701 shows where there is no promotion for either brand.

Figure 38:
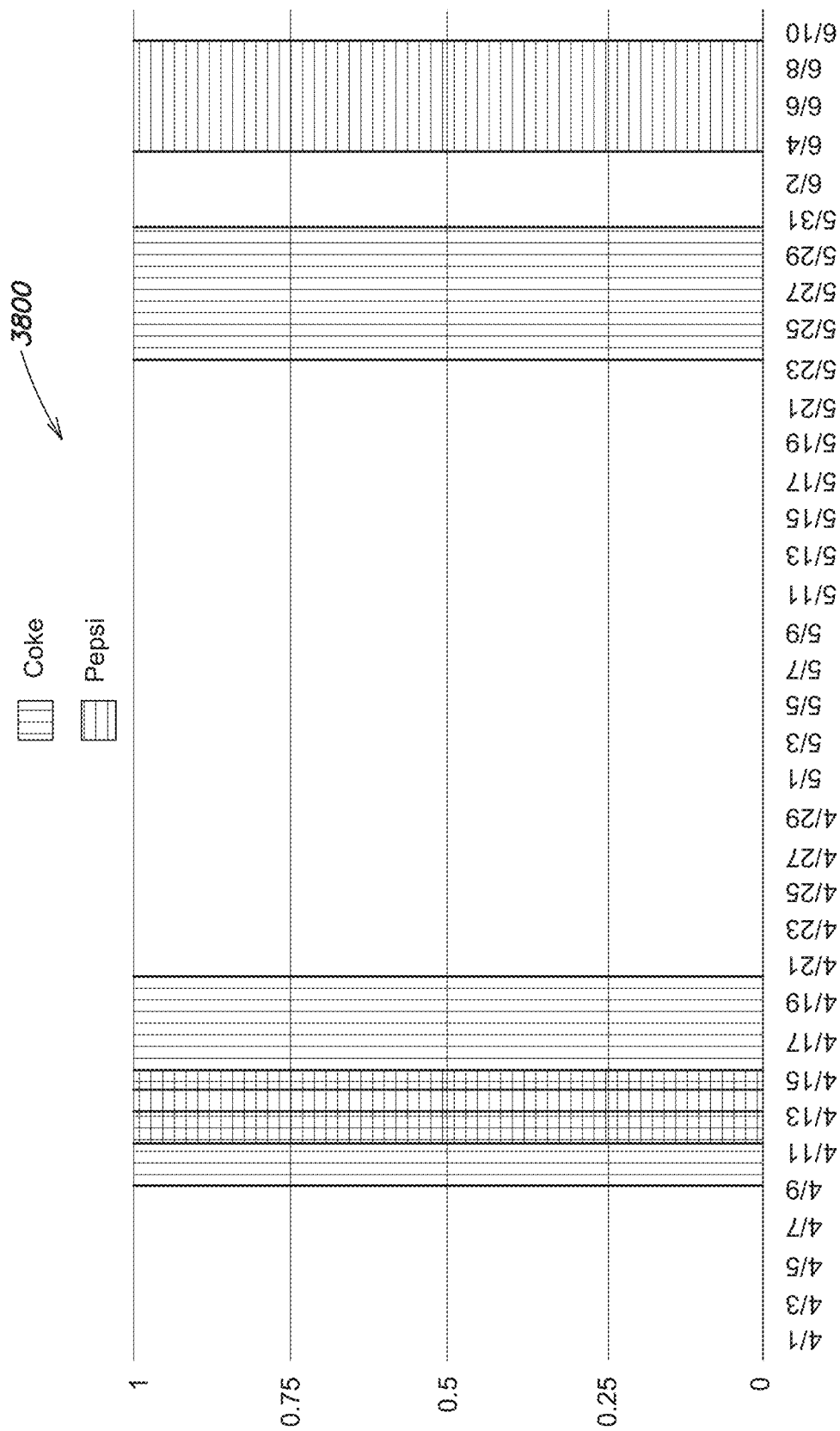
FIG. 38 shows a visualization of promotions along a timeline.

Visualize Promotions Overlap on the Timeline:

FIG. 38 shows a visualization 3800 of the example promotions along a timeline. With additional aggregation stages, the system can determine a list of dates when promotions of different brands overlapped.

```
[{
    "$group": {
        "_id": { "date": "$date", "brand": "$brand" }
    }
},
{
    "$group": {
        "_id": { "date": "$_id.date" },
        "count": { "$sum": 1 }
    }
},
{
    "$match": { "count": { "$gte": 2 } }
},
{
    "$project": { "date": "$_id.date" }
}]
```

Example 5 (Histogram)

It is desired that the system create a proper histogram (gaps are zero filled, not skipped) with a bin size of 100: number of Airbnb listings over $1000/night shown in buckets by price.

```
[
    {
        "$match": {
            "price": {
                "$gte": 1000
            }
        }
    },
    {
        "$set": {
            "priceBin": {
                "$multiply": [
                    { "$trunc": { "$divide": [ "$price", 100 ]
                    } },100
                ]
            }
        }
    },
    {
        "$group": {
            "_id": "$priceBin",
            "count": { "$sum": 1 }
        }
    },
    {
        "$densify": {
            "field":
            "_id.priceBin",
            "step": 100
        }
    }
```

```
        },
        {
            "$fill": {
                "sortBy": {
                    "_id.priceBin": 1
                },
                "output": { "field": "price", "value": 0 }
            }
        },
        {
            "$project": {
                "_id": 0,
                "priceBin":
                "$_id.priceBin","count":
                1
            }
        }
]
```

Figure 39:
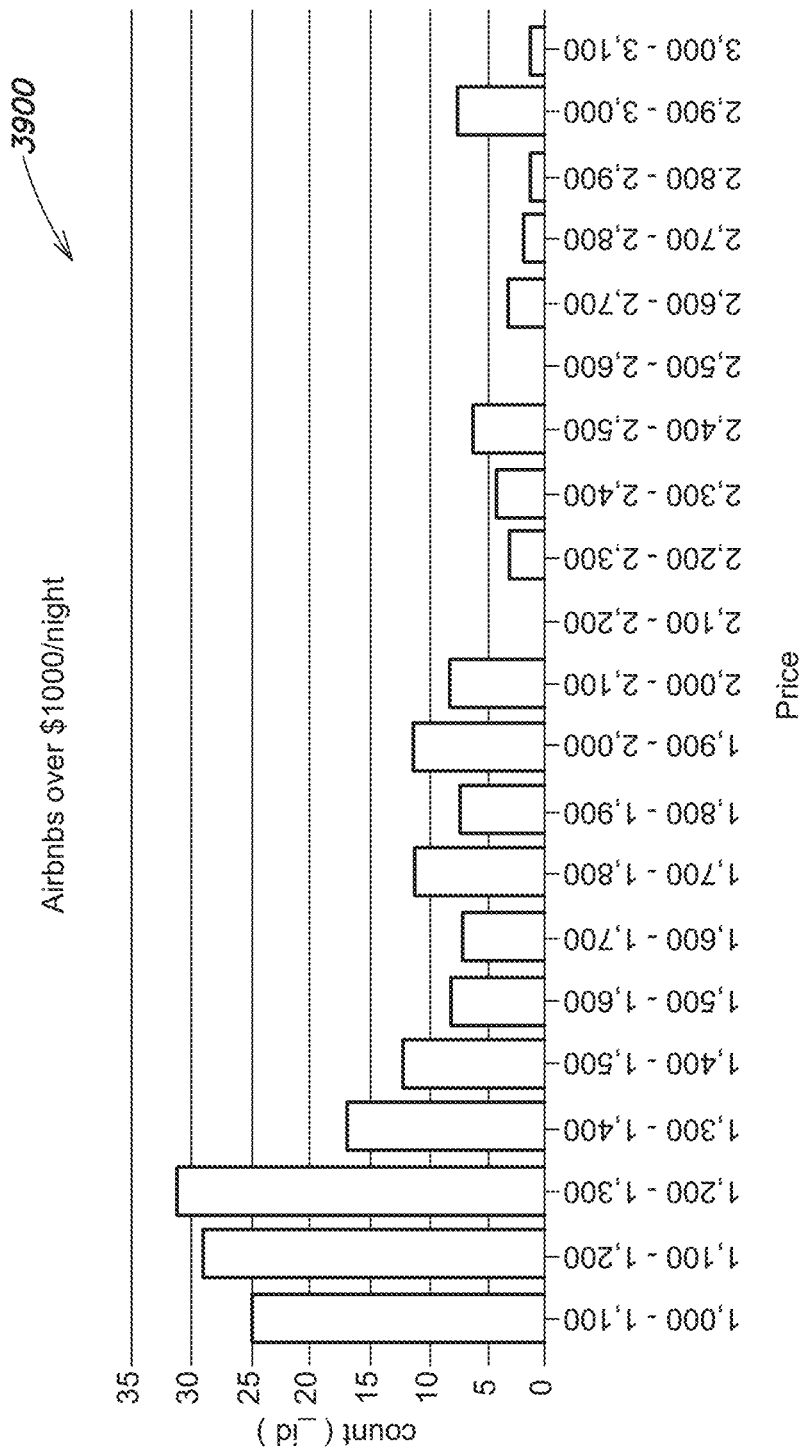
FIG. 39 shows creation of a histogram using filling techniques according to various embodiments.

FIG. 39 shows creation of a histogram 3900 using filling techniques according to various embodiments.

Example 6 (Product Sales)

In another example, it is desired to obtain the Top 5 worst selling products for each month. 0 sales is the worst and if there are no sales in a given time frame, there will be no record of that product in that time frame.

Note: We are using $topN here though it doesn't exist yet.
Two Collections:

```
                    'sales'
                    {
                    "saleDate": "2020-01-08T03 :42:00.000Z", "sku" :
                    100003744,
                    "product_name": "shovel","price": 17.14,
                    "q": 2
                    }
                    'products'
                    {
                    "sku": 1000000749,
                    "name": "beach towel","regularPrice": 15.95
                    }
db.sales.aggregate([
    {
        "$unionWith": {
            "coll": "products",
            "pipeline": [
                {
                    "$project": {
                        "product_name": "$name"
                    }
                }
            ]
        }
    },
    {
        "$group": {
            "_id": {
                "quarterStart
                ": {
                    "$dateTrunc": {
                        "date":
                        "$saleDate",
                        "unit": "quarter"
                    }
                }
            },
            "product": "$product_name"
            },
            "itemsSold": {
                "$sum": "$q"
            }
        }
    },
    {
```

```
        "$project": {
            "_id": 0,
            "quarterStart":
                "$_id.quarterStart", "product":
                "$_id.product", "itemsSold": 1
        }
    },
    {
        "$match": {
            "quarterStart": {"$ne": null}
        }
    },
    {
        "$densify": {
            "field": "quarterStart",
            "partitionFields":
            "product","unit":
            "quarter",
            "step": 1
        }
    },
    {
        "$fill": {
            "output": { "field": "itemsSold", "value": 0 }
        }
    },
    /* filling by 0 can alternatively be done with $ifNull
    {
        "$set": {
            "itemsSold": {
                "$ifNull": [ "$itemsSold", 0 ]
            }
        }
    },
    */
    {
        "$group": {
            "_id": "JquarterStart",
            "products": {
                "$topN": {
                    "output": {
                        "productName": "$product",
                        "itemsSold": "$itemsSold"
                    },
                    "sortBy": { "itemsSold": 1 },
                    "n": 5
                }
            }
        }
    }},
    {
        _id:0,
        quarterStart: "$_id",
        products: 1,
    }
])
```

After Densification and Gap Filling:

```
{ quarterStart: 2020-01-01T00:00:00.000Z, itemsSold: 0, product:
'beach towel' },
{ quarterStart: 2020-01-01T00:00:00.000Z, itemsSold: 0, product:
'kids bike' },
{ quarterStart: 2020-01-01T00:00:00.000Z, itemsSold: 0, product: 'rain
boots' },
{ quarterStart: 2020-01-01T00:00:00.000Z, itemsSold: 17, product:
'umbrella },
{ quarterStart: 2020-01-01T00:00:00.000Z, itemsSold: 20, product:
'shovel' },
{ quarterStart: 2020-03-01T00:00:00.000Z, itemsSold: 0, product:
'beach towel' },
{ quarterStart: 2020-03-01T00:00:00.000Z, itemsSold: 0, product:
'shovel' },
{ quarterStart: 2020-03-01T00:00:00.000Z, itemsSold: 0, product: 'skii
mask' },
{ quarterStart: 2020-03-01T00:00:00.000Z, itemsSold: 13, product:
'sunscreen' },
```

```
{ quarterStart: 2020-03-01T00:00:00.000Z, itemsSold: 29, product: 'kids bike' },
    { quarterStart: 2020-07-01T00:00:00.000Z, itemsSold: 0, product: 'shovel' },
    { quarterStart: 2020-07-01T00:00:00.000Z, itemsSold: 0, product: 'skii mask' },
    { quarterStart: 2020-07-01T00:00:00.000Z, itemsSold: 0, product: 'sunscreen' },
    { quarterStart: 2020-07-01T00:00:00.000Z, itemsSold: 0, product: 'umbrella' },
{ quarterStart: 2020-07-01T00:00:00.000Z, itemsSold: 10, product: 'kids bike' },
    { quarterStart: 2020-10-01T00:00:00.000Z, itemsSold: 0, product: 'beach towel'
    { quarterStart: 2020-10-01T00:00:00.000Z, itemsSold: 0, product: 'kids bike' }, },
    { quarterStart: 2020-10-01T00:00:00.000Z, itemsSold: 0, product: 'rain boots' },
    { quarterStart: 2020-10-01T00:00:00.000Z, itemsSold: 0, product: 'shovel' },
    { quarterStart: 2020-10-01T00:00:00.000Z, itemsSold: 0, product: 'skii mask' }
```

Final Result of the Pipeline

```
{
    products
    :
    [ { productName: 'beach towel', itemsSold: 0 },
      { productName: 'kids bike', itemsSold: 0 },
      { productName: 'rain boots', itemsSold: 0 },
      { productName: 'umbrella', itemsSold: 17 },
      { productName: 'shovel', itemsSold: 20 }
    ],quarterStart: 2020-01-01T00:00:00.000Z
},
{ products:
    [ { productName: 'beach towel', itemsSold: 0 },
      { productName: 'shovel', itemsSold: 0 },
      { productName: 'skii mask', itemsSold: 0 },
      { productName: 'sunscreen', itemsSold: 13 },
      { productName: 'kids bike', itemsSold: 29 } ],
    quarterStart: 2020-03-01T00:00:00.000Z
},
{ products:
    [ { productName: 'shovel', itemsSold: 0 },
      { productName: 'skii mask', itemsSold: 0 },
      { productName: 'sunscreen', itemsSold: 0 },
      { productName: 'umbrella', itemsSold: 0 },
      { productName: 'kids bike', itemsSold: 10 } ],
    quarterStart: 2020-07-01T00:00:00.000Z
},
{ products:
    [ { productName: 'beach towel', itemsSold: 0 },
      { productName: 'kids bike', itemsSold: 0 },
      { productName: 'rain boots', itemsSold: 0 },
      { productName: 'shovel', itemsSold: 0 },
      { productName: 'skii mask', itemsSold: 0 } ],
    quarterStart: 2020-10-01T00:00:00.000Z
}
```

$densify stage can include reference to a collection that will provide a full domain for densification.

```
{
    "$densify": {
      "field": "<string>",
      "partitionFields": ["<string>", "<string>"],
      "domain": {
        "collection": "<string>",
        "pipeline": [ ]
      }
    }
}
```

The same scenario can be implemented with two densification stages: first to generate missing dates, and second to create records for products that are not present in the sales collection:

```
db.sales.aggregate([
    {
      "$group": {
        "_id": {
          "quarterStart
          ": {
            "$dateTrunc": {
              "date":
              "$saleDate",
              "unit": "quarter"
            }
          },
          "product": "$product_name"
        },
        "itemsSold": {
          "$sum": "$q"
        }
      }
    },
    {
      "$project": {
        "_id": 0,
        "quarterStart":
        "$_id.quarterStart","product":
        "$_id.product", "itemsSold": 1
      }
    },
    {
      "$densify": {
        "field": "quarterStart",
        "partitionFields":
        "product","unit":
        "quarter",
        "step": 1
      }
    },
    {
      "$densify": {
        "field":
        "product",
        "partitionFields": ["quarterStart", "itemsSold"],
        "domain": {
          "collection": "products",
          "pipeline": [
            {
              "$project": {
                "product":
                "$name"
              }
            }
          ]
        }
      }
    },
    {
      "$fill": {
        "output": { "field": "itemsSold", "value": 0 }
      }
    },
    {
      "$group": {
        "_id": "$quarterStart",
        "product": {
          "$topN": {
            "output": {
              "productName": "$product",
              "itemsSold": "$itemsSold"
            },
            "sortBy": { "itemsSold": 1 },
            "n": 5
          }
        }
    }
```

```
            }
        }
    ])
```

Example 7 (Cartesian Product)

Compare each product to every other product pairwise (cartesian join) e.g. to compute a correlation or covariance matrix.

```
{"product":"laptop", "parameters":[12, 34, 54, 12]},
{"product":"webcam", "parameters":[6, 28, 60, 15]},
{"product":"chair", "parameters":[5, 12, 50, 12]}
->>
{
    "products": [
        { "name": "laptop", "parameters":[12, 34, 54, 12] },
        { "name": "webcam", "parameters":[6, 28, 60, 15] }
    ]
},
{
    "products": [
        { "name": "laptop", "parameters":[12, 34, 54, 12]},
        { "name": "chair", "parameters":[5, 12, 50, 12] }
    ]
},
{
    "products": [
        { "name": "webcam", "parameters":[6, 28, 60, 15] },
        { "name": "chair", "parameters": [5, 12, 50, 12] }
    ]
}
```

This can be achieved with current functionality of aggregation without densification.

```
Option1:
db.products.aggregate([
db.products.aggregate([[
    {
        "$group": {
            "_id": null,
            "products": {
                "$push": { "name": "$product", "parameters": "$parameters" }
            }
        }
    },
    {
        "$project": {
            "products": {
                "$reduce": {
                    "input": {
                        "$range": [ 0, { "$size": "$products" } ]
                    },
                    "initialvalue": [ ],
                    "in": {
                        "$concatArrays": [
                            "$$value",
                            {
```
```
                                "$range": [
                                    { "$add": [ 1, "$$i" ] },
                                    { "$size": "$products" }
                                ]
                            },
                            "in": [
                                { "$arrayElemAt": [ "$products", "$$i" ] },
                                { "$arrayElemAt": [ "$products", "$$this"
                                ] }
                            ]
                        }
                    }
                }
            }
        }
    },
    {
        "$unwind": { "path": "$products" }
    },
    {
        "$project": { "_id": 0 }
    }
])
```

$densify stage could support this functionality by producing all combinations of 'field' and 'partition' when 'step' and 'unit' are not specified.

```
db.products.aggregate([
    {
        "$set": {
            "product": {
                "name": "$product",
                "parameters": "$parameters"
            }
        }
    },
    {
        "$densify": {
            "field": "product",
            "partition": "product"
        }
    },
    {
        "$match": {
            "$expr": {
                "$ne": [
                    { "$first": "$product" },
                    { "$last": "$product" }
                ]
            }
        }
    }
])
>>
{
    "product": [
        { "name": "laptop", "parameters":[12, 34, 54, 12] },
        { "name": "webcam", "parameters":[6, 28, 60, 15] }
    ]
},
{
    "product": [
        { "name": "laptop", "parameters":[12, 34, 54, 12]},
        { "name": "chair", "parameters":[5, 12, 50, 12] }
    ]
},
```
```
"$project": { "_id": 0, "product": 0, "parameters": 0, "p2": 0 }
    }
])
Option2:
        "$let": {
            "vars": { "i": "$$this" },
            "in": {
                "$map": {
                    "input": {
```

```
{
    "product": [
        { "name": "webcam", "parameters":[6, 28, 60, 15] },
        { "name": "chair", "parameters": [5, 12, 50, 12] }
    ]
}
```

Example 8 (Daily Cars in Lot)

How many cars have we had in the parking lot waiting to be rented daily for the past 60 days (using check out-check in dates for each vehicle, and assuming there were 20 cars in the lot initially)?
Sample Document

```
{
    "ts": {"$date":"2021-03-09T15:10:00.000Z"},
    "checkin":1,
    "vehicleId":
    123,
    "locationId":
    "NE12"
}
```

We will bin the data into daily granularity. Compute sum of check-ins and sum of checkouts. Gapfill datebins. Compute (total cars managed+running sum of check-ins—running sum of check-outs) to find # cars sitting in the parking lot over time.

```
}
[
    {
        "$match": {
            "locationId": "NE12",
            "ts": { "$gte": ISODate("2021-01-23") }
        },
        {
        "$group": {
            "_id": {
                "date": {
                    "$dateTrunc
                    ": {
                        "date": "$ts",
                        "unit": "day"
                    }
                }
            },
            "checkins": { "$sum": "$checkin" },
            "checkouts": { "$sum": "$checkout" }
        }
    },
    {
        "$densify": {
            "field":
            "_id.date",
            "unit":
            "day",
            "step": 1
        }
    },
    {
        "$fill": {
            "sortBy": { "_id.date": 1
            },"output": [
                { "field": "checkins", "value": 0 },
                { "field": "checkout", "value": 0 }
            ]
        }
    },
    {
```

```
        "$setWindowFields": {
            "sortBy": { "_id.date":
            1 },"output": {
                "runningCheckins":
                { "$sum":
                "$checkins",
                "window": {
                    "documents": ["unbounded", "current"]
                }
                },
                "runningCheckouts":
                { "$sum":
                "$checkouts",
                "window": {
                    "documents": ["unbounded", "current"]
                }
                }
            }
        }
    },
    {
        "$set": {
            "carsInLot": {
                "$add": [
                    20,
                    {
                        "$subtract": ["$runningCheckins",
                        "$runningCheckouts"]
                    }
                ]
            }
        }
    }
]
{
    "_id": { "date": {"$date":"2021-03-10T00:00:00.000Z"}
    },
    "checkins": 3,
    "checkouts": 6,
    "runningCheckins": 3,
    "runningcheckouts": 6,
    "carsInLot": 17
},
{
    "_id": { "date": {"$date":"2021-03-11T00:00:00.000Z"} },
    "checkins": 0,
    "checkouts": 0,
    "runningCheckins": 3,
    "runningCheckouts": 6,
    "carsInLot": 17
},
{
    "_id": {
        "date": {"$date":"2021-03-12T00:00:00.000Z"}
    },
    "checkins": 1,
    "checkouts": 0,
    "runningCheckins": 4,
    "runningCheckouts": 6,
    "carsInLot": 18
},
{
    "_id": { "date": {"$date":"2021-03-13T00:00:00.000Z"} },
    "checkins": 0,
    "checkouts": 0,
    "runningCheckins": 4,
    "runningCheckouts": 6,
    "carsInLot": 18
},
{
    "_id": { "date": {"$date":"2021-03-14T00:00:00.000Z"}
    },
    "checkins": 4,
    "checkouts": 5,
    "runningCheckins": 8,
    "runningCheckouts": 11,
    "carsInLot": 17
},
{
```

```
        "_id": { "date": {"$date":"2021-03-15T00:00:00.000Z"}
    },
    "checkins": 2,
    "checkouts": 7,
    "runningCheckins": 10,
    "runningCheckouts": 18,
    "carsInLot": 12
    }
]
```

Example 9 (Average Cars in Lot)

How many cars did we have in the parking lot last year on average (each day) for each XBZ Rental car facility (using check out-check in dates for each vehicle)?

```
{
    "ts": { "$date": "2020-03-09T19:10:20.000Z" },
    "checkout": 1,
    "locationDetails
    ": {
        "locationId":
        "NE15",
        "capacity": 40
    }
}
```

We will reuse the calculation for number cars in a lot from the previous example, and then add calculation of average grouped by location.

```
[
    {
        "$match": {
            "ts": {
                "$gte": ISODate("2020-01-01"),
                "$lte": ISODate("2020-12-31")
            }
        }
    },
    {
        "$group": {
            "_id": {
                "date": {
                    "$dateTrunc": {
                        "date": "$ts",
                        "unit": "day"
                    }
                },
                "location": "$locationDetails.locationId"
            },
            "checkins": { "$sum": "$checkin" },
            "checkouts": { "$sum": "$checkout" },
            "capacity": { "$max": "$locationDetails.capacity" }
        }
    },
    {
        "$densify": {
            "field": "_id.date",
            "partitionFields": [ "_id.location",
            "capacity" ],"unit": "day",
            "step": 1
        }
    },
    {
        //it will be less typing with
        $ifNull"$fill": {
            "sortBy": {
                "_id.date": 1
            },
            "partitionBy":
            "$_id.location","output": [
                {
                    "field":
                    "checkins",
                    "value": 0
                },
                {
                    "field":
                    "checkout",
                    "value": 0
                }
            ]
        }
    },
    {
        "$setWindowFields": {
            "sortBy": { "_id.date":
            1 },"output": {
                "runningCheckins": {
                    "$sum":
                    "$checkins",
                    "window": { "documents": [ "unbounded", "current" ] }
                },
                "runningCheckouts": {
                    "$sum":
                    "$checkouts",
                    "window": { "documents": [ "unbounded", "current" ] }
                }
            }
        }
    },
    {
        "$set": {
            "carsInLotDaily
            ": {"$add":
            [
                "$capacity",
                { "$subtract": [ "$runningCheckins", "$runningCheckouts" ]
                }
            ]
            }
        }
    },
    {
        "$group": {
            "_id": "$_id.location",
            "avgCarsInLot": { "$avg": "$carsInLotDaily" }
        }
    }
]
```

Example 10 (Stepless Densification)

Sub Use Case1:
For each day that has at least one sale, show how many products of each size were sold (assuming a product of every size has at least one sale entry in the range that is being analyzed)
Sample document in collection 'sales':

```
{
    "ts": { "$date": "2021-01-01T05:00:00.000Z" },
    "p_id": "XHG58SH",
    "quantity":
    25,"size":
    "med"
},
{
    "ts": { "$date": "2021-01-02T05:00:00.000Z" },
    "p_id": "QH348SH",
    "quantity":
    10,"size":
    "small"
}
```

With no 'step' and 'unit', and with range: "full" densification will produce all combinations of 'field' and 'partitionFields'

```
{
    "$densify": {
        "field": "<string>".,
        "partitionFields": [ "<string>", "<string>"]
    }
}
```

Pipeline:

```
[
    {
        "$group": {
            "_id": {
                "day": {
                    "$dateTrunc": { "date": "$ts", "unit": "day" }
                },
                "size": "$p3_size"
            },
            "items_sold": {
                "$sum": "$quantity"
            }
        }
    },
    {
        "$replaceWith": {
            "day": "$_id.day",
            "size": "$_id.size",
            "items_sold": "$items_sold"
        }
    },
    {
        "$densify": {
            "field": "day",
            "partitionFields": ["size"]
        }
    }
]
Result
{
    "day": { "$date": "2021-01-01T00:00:00.000Z" },
    "items_sold": 25,
    "size": "med"
},
{
    "day": { "$date": "2021-01-01T00:00:00.000Z" },
    "size": "small"
},
{
    "day": { "$date": "2021-01-02T00:00:00.000Z" },
    "items_sold": 10,
    "size": "small"
},
{
    "day": { "$date": "2021-01-02T00:00:00.000Z" },
    "size": "med"
}
```

This can be achieved using $lookup with a pipeline like this:

```
[
    {
        "$group": {
            "_id": {
                "day": {
                    "$dateTrunc": { "date": "$ts", "unit": "day" }
                },
                "size": "$p3_size"
            },
            "items_sold": {
                "$sum": "$sale_total_amount"
            }
        }
    },
    {
        "$replaceWith": {
            "day": "$_id.day",
            "size": "$_id.size",
            "items_sold": "$items_sold"
        }
    },
    {
        "$group": {
            "_id": { "size": "$size" }
        }
    },
    {
        "$replaceRoot": {
            "newRoot": "$_id"
        }
    },
    {
        "$lookup": {
            "from": "dens",
            "pipeline": [
                {
                    "$group": {
                        "_id": {
                            "day": {
                                "$dateTrunc": { "date": "$ts", "unit": "day" }
                            },
                            "size": "$p3_size"
                        },
                        "items_sold": {
                            "$sum": "$sale_total_amount"
                        }
                    }
                },
                {
                    "$replaceWith": {
                        "day": "$_id.day",
                        "size": "$_id.size",
                        "items_sold": "$items_sold"
                    }
                },
                { "$group": { "_id": "$day" } }
            ],
            "as" : "day"
        }
    },
    {
        "$unwind": {
            "path": "$day"
        }
    },
    {
        "$replaceWith"
            : { "size": "$size",
                "day": "$day._id"
            }
    },
    {
        "$lookup": {
            "from": "dens",
            "let": {
                "size": "$size",
                "day": "$day"
            },
            "pipeline": [
                {
                    "$group": {
                        "_id": {
```

```
            "day": {
                "$dateTrunc": { "date": "$ts", "unit":
                    "day" }
            },
            "size": "$p3_size"
        },
        "items_sold": {
            "$sum": "$sale_total_amount"
        }
    }
},
{
    "$replaceWith":
        { "day":
            "$_id.day",
            "size": "$_id.size",
            "items_sold":
            "$items_sold"
        }
},
{
    "$match": {
        "$expr": {
            "$and": [
                { "$eq": ["$$day", "$day"] },
                { "$eq": ["$$size", "$size"] }
            ]
        }
    }
    ],
    "as": "generated"
    }
},
{
    "$unwind": {
        "path": "$generated",
        "preserveNullAndEmptyArrays": true
    }
},
{
    "$set": {
        "generated.day": "$day",
        "generated.size": "$size"
    }
},
{
    "$replaceRoot": {
        "newRoot": "$generated"
    }
}
]
```

Sub Use Case 2:

For each day that has at least one sale, show how many products of each size were sold. Assuming a full list of sizes can be found in the product catalog collection.

$densify stage can include reference to a collection that will provide a full domain for densification.

```
{
    "$densify": {
        "field": "<string>",
        "partitionFields": ["<string>", "<string>"],
        "domain": {
            "step": <number>, // optional
            "unit": "<string>", // optional
            "range": "full", // optional
            "collection": "<string>",
            "pipeline": [ ],
        }
    }
}
[
{
    "$group": {
```

```
        "_id": {
            "day": {
                "$dateTrunc": { "date": "$ts", "unit": "day" }
            },
            "size": "$p3_size"
        },
        "items_sold": {
            "$sum": "$quantity"
        }
    }
},
{
    "$replaceWith": {
        "day": "$_id.day",
        "size": "$_id.size",
        "items_sold": "$items_sold"
    }
},
{
    "$densify": {
        "field": "size",
        "partitionFields": ["day"],
        "domain": {
            "collection": "catalog",
            "pipeline": [
                {
                    "$group": {
                        "_id": "$product_size"
                    }
                },
                {
                    "$set": {
                        "size": "$_id.product_size"
                    }
                }
            ]
        }
    }
}
]
```

Sub Use Case 3:

For each day that has at least one sale, show how many products of each size were sold. Assuming a full list of sizes is generally known and is small enough to be passed in the query.

Option 1:

```
[...,
{
    "$densify": {
        "field": "size",
        "partitionFields": ["day"],
        "domain": ["small", "med", "large", "x-large"]
    }
}]
```

Option2:

```
[...,
{
    "$densify": {
        "field": "size",
        "partitionFields": ["day"],
        "domain": [
            { "size": "small" },
            { "size": "med" },
            { "size": "large" },
            { "size": "x-large" }
        ]
    }
}]
```

Densification for Numerical/Date Domains

The guiding idea for this approach is for any document we pull from the previous stage, we will generate all documents in its partition between the last seen value in its partition and its value.

New stage: $_internalDensify

In some implementations, this stage will only be generated from $densify and will not be externally accessible. The code block is only to convey the structure of the stage.
{$_internalDensify: {field: <fieldName>, min: <value>, max: <value>, partitionFields: [<field>, . . . ], step: <value>, unit: <unit>, range: <rangeSpec>}

When built, $_internalDensify will be populated with all of the information needed to generate the new documents. This stage will assume that it is preceded by a '$sort' stage, and therefore the input is sorted on '{field: 1}', or on {partitionFieldA: 1, partitionFieldB: 1, . . . , field: 1}. On construction the stage will build the in memory table as a ValueMap holding Values. In some implementations, the table will start empty.

The stage will track the highest value seen for each partition in the in memory table. Upon receiving a new value in an unseen partition, the system stores the found document (in its entirety) in the Document Generator as the max value. On future getNext calls the stage will populate the missing values (between the minimum densification value and the first seen value in the partition). When the document generator is done generating documents, it will output its final value (the value pulled from the previous stage) and then on subsequent values have the "done" flag set. This has the advantage of preserving the sort order (for a given partition) for the user going into the next stage.

Similarly when a new document is seen for an already known partition, the stage will note the range of values between the previously seen value for the partition and the value in the current document. Before outputting the current document, all values between will be outputted on subsequent getNext calls before pulling new documents from the previous stage.

In the non-full case, the system will check every document to see if it is starting a new partition. If so, the system can remove all information from the in-memory table about the preceding partition (after filling to the max value in the explicit range case). Once EOF is reached (and finish filling in the explicit range case), the system is done generating documents.

In the full case once the system has processed all the input, the stage will loop over the stored partition values and output all documents between the existing values in the table and the maximum value in the range (over multiple getNext calls).

Figure 40A:
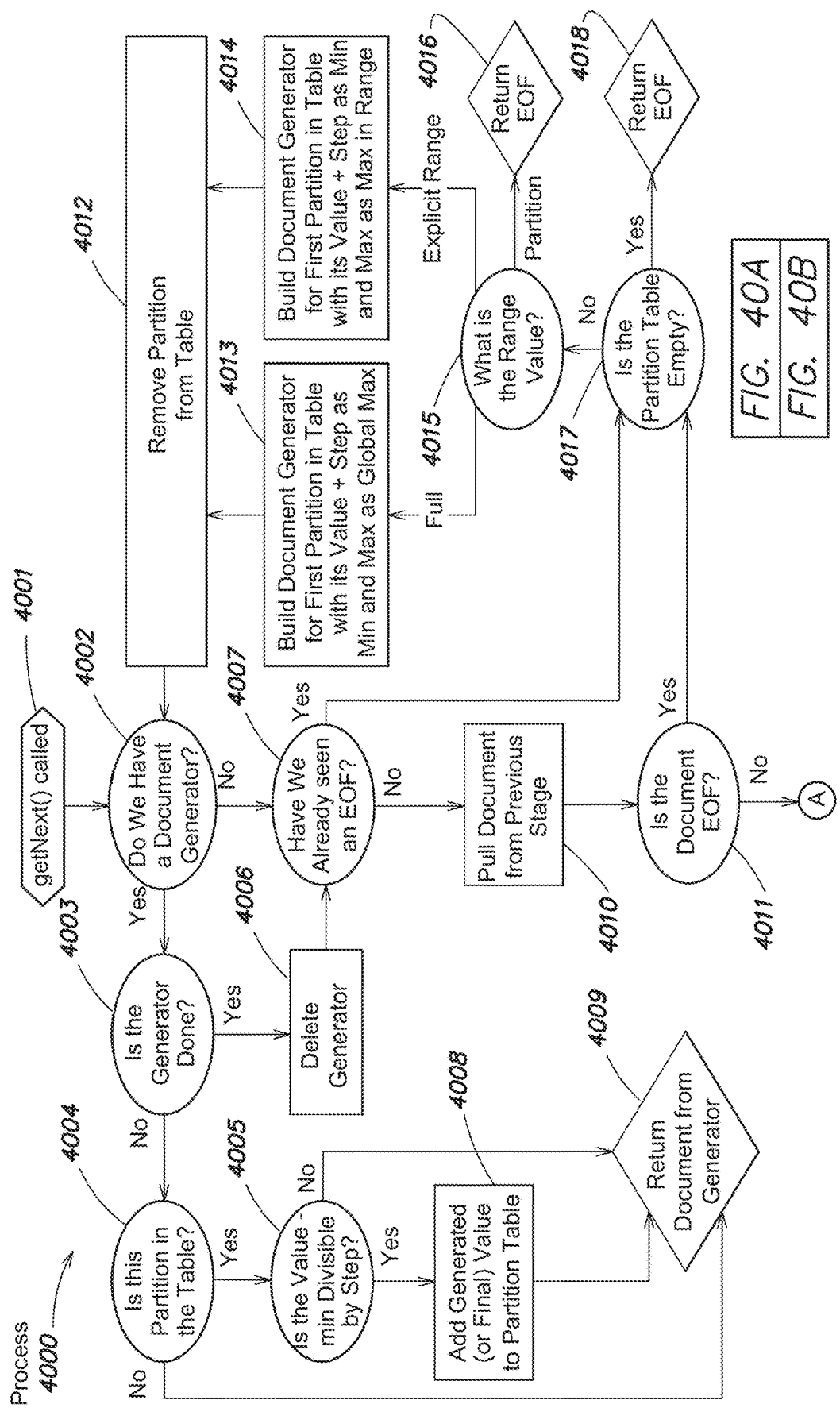

In FIG. 40A-40B, there is shown a detailed densification process 4000 according to various embodiments as described above. At block 40001, getNext( ) is called. At block 4002, it is determined whether there is a document generator (e.g., as described in more detail below where most of the work is performed). If so, it is determined at block 4003 whether the generator is done. If done, the generator is deleted at block 4006. If there is no document generator, it is determined whether there has been seen an end of file (EOF) at block 4007. If so, it is determined whether the partition table is empty (e.g., at block 4017) and if so, and EOF is returned at block 4018.

If the generator is not done at block 4003, it is determined whether the partition is in the table at block 4004, if not, the document is returned from the generator at block 4009. If the partition is in the table at 4004, it is determined whether the value min is divisible the step. If so, the generated (or final) value is added to the partition table at block 4008, and the document is returned by the generator.

If at block 4015, the range value is a full value, the document generator is built for the first partition in the table with its value+step as its minimum and the max as the global maximum (at block 4013). If at block 4015, the range is an explicit range, then the document generator is built for the first partition in the table with its value+step as its minimum and the max as the maximum value within the range (at block 4014). At block 4012, the partition is removed from the table.

If at block 4007 there was not seen an EOF, the system pulls the document from the previous stage. If the document is at EOF, then the process proceeds to block 4017 as discussed above. If not, the process proceeds to block 4020 where it determined whether the document partition is already in the table. If so, the process determined what the rage value is at block 4022. If the range value is export range, it is determined whether the current value is inside, below, or above the range at block 4021. Depending on the result, a generator is created as identified at blocks 4029, 4030. If below, the current document is stored in the generator as the last output value at block 4031, and the first document is returned from the generator at block 4032.

If at block 4020, the document partition is not in the table, the system determines the range value a block 4023. If the range value is full, the system builds a new generator with a max as this value and the global minimum at block 4024. If the range value is partition, the current document is stored in the generator as the last output value. If the range value is an explicit range, it is determined whether the current value is inside, below or above the range at block 4025. Depending on the result, a generator is created as identified in blocks 4026 and 4027. If below, the current document is stored in the generator as the last output value at block 4031, and the first document is returned from the generator at block 4032.

Document Generator

As discussed above with reference to FIGS. 40A-40B, most of the work for the stage is done by document generators, and the stage will be responsible for managing their creation and destruction. When a generator is created, it will be built to construct either dates (with a min date, a max date, a step size, and a unit) or integers (with a min value, a max value, and a step size). In either case it will also be given the field (name) that is being densified, a set of key/value pairs to add to each document (the partition values), and a final document to output (the document seen by the stage that prompted the creation of this generator). When the generator is asked for the next document, it will check if it is ready to return its final value (min>=max). If it is not, it will return whatever is currently at its minimum value, then increment its minimum value by the step size. If it is it will return the final value and set the done flag.

Sorting Guarantees

In the {range: "full"} case we will offer no guarantees on the output order of the documents. In the other range options, the system according to some implementations will guarantee the sort order on {partitionFieldA, partitionFieldB, densifyField}.

Desugaring

In most cases, the system can be configured to desugar to the same pipeline:

```
[
{$sort: {fieldToDensify: 1}},
{$_internalDensify: {field: fieldToDensify, step: 1, unit: <unit>, partitionFields:["p1", "p2"], range: <rangeSpec>}
]
```

In all examples "unit" is not shown. Without "unit" the value is assumed to be numeric (and will error if a date is encountered). If "unit" is specified, we assume fields are dates and will error if a numeric is encountered.

| Original $densify | Generated pipeline |
|---|---|
| `{ $densify: { field: "fieldToDensify", range: {step: 1, bounds: "full"} } }` | `[ {$sort: {fieldToDensify: 1}}, {$_internalDensify: {field: fieldName, step: 1, range:"full"} ]` |
| `{ $densify: { field: "fieldToDensify", partitionByFields: ["p1", "p2"],range: {step: 1, bounds: "full"} } }` | `[ {$sort: {fieldToDensify: 1}}, {$_internalDensify: {field: fieldName, step: 1, partitionFields: ["p1", "p2"], range: "full"} ]` |
| `{ $densify: { field: "fieldToDensify", partitionByFields: ["p1", "p2"], range: {step: 1, bounds: [-10,10]} } }` | `[ {$sort: {p1:1, p2:1, fieldToDensify: 1}}, {$_internalDensify: {field: fieldName, step: 1, partitionFields: ["p1", "p2"], range: [-10,10]} ]` |
| `{ $densify: { field: "fieldToDensify", partitionByFields: ["p1", "p2"], range: {step: 1, bounds: "partition"} } }` | `[ {$sort: {p1:1, p2:1, fieldToDensify: 1}}, {$_internalDensify: {field: fieldName, step: 1, partitionFields: ["p1", "p2"], range: "partition"} ]` |
| `{ $densify: { field: "fieldToDensify", partitionByFields: ["p1", "p2"], } }` | The example above is the stepless case |
| `{ $densify: { field: "fieldToDensify", partitionByFields: ["p1", "p2"],domain: ["val1", "val2", "val3"] }}` | `[ {$sort: {fieldToDensify: 1}}, {$_internalDensify: {field: fieldName, partitionFields:["p1", "p2"], domain: ["val1", "val2", "val3"]} ]` |

This is the categorical (literal) case. In this case _internalDensify will still build up the in memory map of values seen in each partition, but instead of incrementing by a step value it will iterate over the domain array and create documents in each partition.
Note: Whether this is reasonable to do depends on the length of the domain array.

```
{
  $densify: {
    field:
    "fieldToDensify",
    partitionByFields:
    ["p1", "p2"],
    domain: {collection: "foreignColl",
```

| Original $densify | Generated pipeline |
|---|---|
| pipeline:[<pipeline>]}<br>  }<br>} | |
| This is the categorical (calculated) case | |

Benefits
  Low memory usage
    In most cases. If there are a large number of small partitions, we are densifying over a small range, or the partition values have high cardinality this may be unnecessarily large. We don't believe any of these are common use cases.
  No need for extra communication between stages
Sharding
  Generally, the system will not be configured to push any computation to the shards, as all computation will depend on seeing the range of values in the field that is being densified, possibly in each partition. Even if the shard key is the exact set of fields in the "partitionFields" array, the system would still need to see all the documents across the collection in the "full" range case.
  If the shard key is exactly or a subset of the partitionFields array, and range is not "full", then the system could send the desugared _internalDensify stages to the shards. Each shard would be able to generate the documents for the partitions it is holding and send back the full result set. This would result in much more traffic between the shards and the merging shard (in some cases), but would allow for generation in parallel.
  In a situation where all of the data for a given partition is on one shard, the logic that has to be done on that shard is the same as the logic in the general case. In some implementations, any special code is not required in the sharded case apart from moving the sort and the _internalDensify stage into the "shards part" of the pipeline.
Design Alternatives
Option A: Generate/Lookup
  The general idea behind this approach is to use $lookup cross product to generate the entire domain of documents. Each side of the cross product will be generated either by a $group or a new stage that willgenerate documents in a range.

New stage: $_internalGenerateBounds
  This stage will only be generated from $densify and will not be externally accessible. The code block is only to convey the structure of the stage.
  {$_internalGenerateBounds: {field: <fieldName>, unit: <unit>, step: <stepSize>}
  There may be two versions of this stage, or possibly two separate stages (GenerateBoundsFromDocs, GenerateBoundsFromArgs).
  GenerateBoundsFromArgs: When built it will take in a field name (the field to densify) and the step size, and the range to generate. It will then generate all the documents in that range, with only the densification field present. The expectation is that it will be put into a $lookup for a cross product with all of the unique partitions. This stage could be replaced by a $literal stage or the $search project. In this case the system could implement a $range operator that returned documents in order over a range.
  GenerateBoundsFromDocs: This version will always be preceded by a $group that calculates a "min" field and a "max" field, stored in two different UUID (generated) field names. For each partition (if present), it will create the documents between the min and max from the preceding group. Depending on if the partition fields are present in the group, this may or may not need a cross-join to finish generating the domain. See examples below.
  Either way we will expect the stage to generate documents of the form {fieldToDensify: <value>, p1: <value>, p2: <value> . . . }
$lookup enhancement: Full join
  In order to support any case with a "step" value, the system would need to implement a full join. Users may want a "step" without sufficient granularity such that the step values will have a corresponding value from the source collection (and vice-versa).

| Original $densify | Generated pipeline |
|---|---|
| {<br>$densify: {<br>field:<br>"fieldToDensify<br>",step: 1<br>}<br>} | [<br><precedingPipeline>,<br>// Generate domain, unique values in the range<br>{$group: {_id: null, min: {$min: "$fieldToDensify"},max: {$max: "$fieldToDensify"}}<br>{$_internalGenerateBounds: {step: 1, field: "fieldToDensify", min: "$min", max: "$max"}}<br>// Full join with existing collection.<br>{<br>  $lookup:<br>    {<br>      from: <sourceColl>,<br>      let: {fieldToDensify: fieldToDensify}pipeline: [<br>        <preceding pipeline/cache>,<br>        {$match: {{$eq: ["$$fieldToDensify", "$fieldToDensify"]}}],<br>      as: UUIDGEN_AS, |

-continued

| Original $densify | Generated pipeline |
|---|---|
| | }<br>},<br>// Promote joined fields to root.<br>{$addFields: {UUIDGEN_AS.fieldToDensify: "$fieldToDensify"}},<br>{$replaceRoot: {newRoot: "$UUIDGEN_AS"}}<br>] |
| {<br>  $densify: {<br>    field:<br>    "fieldToDen<br>    sify",step: 1<br>    range: [−10,10]<br>  }<br>} | <precedingPipeline>,<br>// Generate domain, unique values in the range<br>{$_internalGenerateBounds: {step: 1, field: "fieldToDensify", min: −10, max: 10}},<br>// Full join with existing collection. Keep documentsfrom original collection<br>{<br>  $lookup:<br>    {<br>      from: <sourceColl>,<br>      pipeline: [<br>        <preceding pipeline/cache>,<br>        {$match: {{$eq: ["$$fieldToDensify", "$fieldName"]}],<br>      as: <UUIDGen fieldName>,<br>    }<br>},<br>// Promote joined fields to root.<br>{$addFields: {UUIDGEN_AS.fieldToDensify: "$fieldToDensify"}},<br>{$replaceRoot: {newRoot: "$UUIDGEN_AS"}}<br>] |
| In the examples above with no partitions the system would only need one $lookup, as the system can generate the domain without a cross product. These cases assume that $lookup supports full joins. | |
| {<br>  $densify: {<br>    field:<br>    "fieldToDensify",<br>    partitionFields: ["p1", "p2"],step: 1<br>  }<br>} | [<br><precedingPipeline>,<br>// Generate left domain, unique partitions<br>{$group: {_id: {p1: "$p1", p2: "$p2"}}},<br>{$replaceRoot: {newRoot: "$_id"}},<br>// Generate right domain: unique values in range.<br>// Then cross product join<br>{<br>  $lookup:<br>    {<br>      from:<br>      <sourceColl>,<br>      pipeline: [<br><preceding pipeline/cache>,<br>{$group: {_id: null, min: {$min: $"fieldToDensify"},max: {$max: "$fieldToDensify"}},<br>{$_internalGenerateBounds: {step: 1,field: "fieldToDensify", min: "$min", max: "$max"}},<br>    ],<br>    as: fieldToDensify,<br>  }<br>},<br>{$unwind: "$fieldToDensify"},<br>// promote the created densify values to top level<br>{$project: {fieldToDensify: "$fieldToDensify.fieldToDensify"}}<br>// Documents at this point are<br>// {fieldToDensify: <value>, p1: <value>, p2: <value>}<br>// for all combinations of values<br>// join with existing collection.<br>{<br>  $lookup:<br>    {<br>      from: <sourceColl>, |

-continued

| Original $densify | Generated pipeline |
|---|---|
| | `let: {p1: "$p1", p2: "$p2", fieldToDensify: "$fieldToDensify"},`<br>`    pipeline: [`<br>`        <preceding pipeline/cache>,`<br>`        {$match: {$and: [{$eq: ["$$fieldToDensify", "$fieldToDensify"]},{$eq: ["$$p1", "$p1"]}, {$eq: ["$$p2", "$p2"]}`<br>`        ],`<br>`        as: UUIDGEN_AS,`<br>`    }`<br>`},`<br>`// Promote joined fields to root.`<br>`{$addFields: {UUIDGEN_AS.fieldToDensify: "$fieldToDensify", UUIDGEN_AS.p1: "$p1", UUIDGEN_AS.p2: "$p2"}},`<br>`{$replaceRoot: {newRoot: "$UUIDGEN_AS"}}`<br>`]` |
| colspan="2" | The example above introduces partitioning. In order to generate the full domain of [fieldToDensify, <partitionSpec>] sets, the system may implement an additional lookup and perform a cross product. This case assumes that $lookup supports full joins.<br>Note that this example only has two fields in the partition specification. This can be expanded to an arbitrary number of partitions by adding the fields wherever the existing partitions appear. |
| `{`<br>`  $densify: {`<br>`    field:`<br>`    "fieldToDensify",`<br>`    partitionFields: ["p1",`<br>`    "p2"],step: 1,`<br>`    range: [10, 10]`<br>`  }`<br>`}` | `[`<br>`    <precedingPipeline>,`<br>`    // Generate left domain, unique partitions`<br>`    in therange`<br>`    {$group: {_id: {p1: "$p1", p2: "$p2"}}}`<br>`    {$replaceRoot: {newRoot: "$_id"}}`<br>`    // Generate right domain: unique values in the`<br>`    range.Then join`<br>`    {`<br>`      $lookup:`<br>`        {`<br>`          from: <sourceColl>,`<br>`          pipeline: [`<br>`            {$_internalGenerateBounds: {step:`<br>`            1 ,field:"fieldToDensify", min: −10, max: 10}},`<br>`            ],`<br>`            As: fieldToDensify,`<br>`        }`<br>`    },`<br>`    {$unwind: "$fieldToDensify"},`<br>`    // promote the created densify values to top`<br>`    level`<br>`    {$project: {fieldToDensify: "$fieldToDensify.fieldToDensify"}}`<br>`    // full join with existing collection. Keep`<br>`    documentsfrom original collection`<br>`    {`<br>`      $lookup:`<br>`        {`<br>`          from: <sourceColl>,`<br>`          let: {p1: "$p1", p2: "$p2", fieldToDensify: "$fieldToDensify"},`<br>`          pipeline: [`<br>`            <preceding pipeline/cache>,`<br>`            {$match: {$and: [{$eq: ["$$fieldToDensify", "$fieldToDensify"]},{$eq: ["$$p1", "$p1"]}, {$eq: ["$$p2", "$p2"]}`<br>`            ],`<br>`            as: <UUIDGen fieldName>,`<br>`          }`<br>`      },`<br>`      // Promote joined fields to root.`<br>`      {$addFields: {UUIDGEN_AS.fieldToDensify: "$fieldToDensify", UUIDGEN_AS.p1: "$p1", UUIDGEN_AS.p2: "$p2"}},` |

| Original $densify | Generated pipeline |
|---|---|
| | {$replaceRoot: {newRoot: "$UUIDGEN_AS"}} ] |

For a literal range the system removes the initial group as the input has no bearing on the domain. This case assumes that $lookup supports full joins.

| | |
|---|---|
| {<br>  $densify: {<br>    field:<br>    "fieldToDensify",<br>    partitionFields: ["p1",<br>    "p2"],step: 1,<br>    range: "partition"<br>  }<br>} | [<br><precedingPipeline>,<br>// Generate left domain, unique values in the range<br>{$group: {_id: {p1: "$p1 ", p2: "$p2"},<br>UUIDGEN_MIN:<br>{$min: "fieldToDensify"}, UUIDGEN_MAX:<br>{$max:"fieldToDensify"}}<br>// InternalGenerateBounds passes through andpromotes _id fields, generates full domain<br>{$_internalGenerateBounds: {step: 1,field: "fieldToDensify", min: "$UUIDGEN1_MIN", max:"$UUIDGEN1_MAX"}},<br>// Full join with existing collection.<br>{<br>  $lookup:<br>    {<br>      from:<br>      <sourceC<br>      oll>,<br>      pipeline: [<br>        <preceding pipeline/cache>,<br>        {$match: {{$eq:<br>["$$fieldToDensify",<br>"$fieldName"]}}],<br>        as: <UUIDGen fieldName>,<br>    }<br>},<br>// Promote joined fields to root.<br>{$addFields: {UUIDGEN_AS.fieldToDensify: "$fieldToDensify", UUIDGEN_AS.p1: "$p1", UUIDGEN_AS.p2: "$p2"}},<br>{$replaceRoot: {newRoot: "$UUIDGEN_AS"}}<br>] |

This case assumes that $lookup supports full joins.

| | |
|---|---|
| {<br>  $densify: {<br>    field: "fieldToDensify",<br>    partitionFields: ["p1",<br>    "p2"],<br>  }<br>} | [<br><precedingPipeline>,<br>// Get unique partitions<br>{$group: {_id: {p1: "$p1", p2: "$p2"}}},<br>{$replaceRoot: {newRoot: "$_id"}}<br>// Cross product of unique fieldToDensify values andunique partitions<br>{$lookup: {<br>  from:<br>  <sourceC<br>  oll>,<br>  pipeline: [<br><preceding pipeline/cach<br>e>,<br>        // Get unique fieldToDensify values<br>        {$group: {_id: fieldToDensify}},<br>  ],<br>  as: "fieldToDensify"<br>}},<br>{$unwind: "$fieldToDensify"}<br>// promote the created densify values to top level<br>{$set: {fieldToDensify: "$fieldToDensify._id"<br>}}<br>// Full join with the original documents<br>{<br>  $lookup:<br>    {<br>      from: <sourceColl>,<br>      let: {p1: "$p1", p2: "$p2", fieldToDensify: |

| Original $densify | Generated pipeline |
|---|---|
| | "$fieldToDensify"},<br>pipeline: [<br>    <preceding pipeline/cache>,<br>    {$match: {$expr: { $and: [{$eq: ["$$fieldToDensify", "$fieldToDensify"]},{$eq: ["$$p1","$p1"]}, {$eq: ["$$p2", "$p2"]}]}<br>    }],<br>    as: UUIDGEN_AS,<br>    }<br>},<br>{$unwind: {path : '$UUIDGEN_AS', preserveNullAndEmptyArrays: true}},<br>// Promote joined fields to root<br>{$addFields: {UUIDGEN_AS.fieldToDensify: "$fieldToDensify", UUIDGEN_AS.p1: "$p1", UUIDGEN_AS.p2: "$p2"}},<br>{$replaceRoot: {newRoot: "$UUIDGEN_AS"}}<br>] |
| \multicolumn{2}{c}{The example above is the stepless case "range: full" doesn't apply when "step" is omitted} | |

The example above is the stepless case "range: full" doesn't apply when "step" is omitted

| Original $densify | Generated pipeline |
|---|---|
| {<br>  $densify: {<br>    field: "fieldToDensify",<br>    partitionFields: ["p1", "p2"],<br>    domain: ["val1", "val2", "val3"]<br>  }<br>} | [<br>// Unwind domain array<br>{$generateFromArray: ["val1", "val2", "val3"]}<br>// Lookup cross product with unique partitions<br>{$lookup: {<br>  from: <sourceColl><br>  pipeline: [<br>    <preceding pipeline/cache>,<br>    {$group: {_id: {p1: "$p1", p2: "$p2"}}},<br>    {$replaceRoot: {newRoot: "$_id"}}<br>  ],<br>  as: "partitions"<br>}}<br>// Unwind lookup result, promote fields<br>{$unwind: "$partitions"},<br>{$addFields: {partitions.fieldToDensify: "$fieldToDensify"}},<br>{$replaceRoot: {newRoot: "partitions"}},<br>// Full join with collection<br>{<br>  $lookup:<br>    {<br>      from: <sourceColl>,<br>      let: {p1: "$p1 ", p2: "$p2", fieldToDensify: "$fieldToDensify"},<br>      pipeline: [<br>        <preceding pipeline/cache>,<br>        {$match: {$expr: {$and: [{$eq: ["$$fieldToDensify", "$fieldToDensify"]},{$eq: ["$$p1", "$p1"]}, {$eq: ["$$p2", "$p2"]}]}<br>        }],<br>        as: UUIDGEN_AS,<br>        }<br>},<br>// Promote joined fields to root<br>{$addFields: {UUIDGEN_AS.fieldToDensify: "$fieldToDensify", UUIDGEN_AS.p1: "$p1", UUIDGEN_AS.p2: "$p2"}},<br>{$replaceRoot: {newRoot: "$UUIDGEN_AS"}}<br>] |

This is the categorical (literal) case. The example above assumes that all values of "densifyField" in the source collection appear in the given domain range. With the current $lookup any values that appear in the collection but not the given domain will not be in the output without a full join.

| Original $densify | Generated pipeline |
|---|---|
| {<br>  $densify: {<br>field: "fieldToDensify", partitionFields: ["p1", "p2"],<br>    domain: {collection: "foreignColl", pipeline: [<pipeline>]} | [<br>// Get unique partitions<br>{$group: {_id: {p1: "$p1", p2: "$p2"}}},<br>{$replaceRoot: {newRoot: "$_id"}}<br>// Lookup cross product on foreign collection to get unique densify field values |

| Original $densify | Generated pipeline |
|---|---|
| `}`<br>`}` | `{$lookup: {`<br>`    from:`<br>`        "foreign`<br>`        Coll"`<br>`    pipeline:`<br>`    [`<br>`        <domain.pipeline>,`<br>`        {$group: {_id:`<br>`{fieldToDensify:`<br>`"$fieldToDensify"}}},`<br>`        {$replaceRoot: {newRoot: "$_id"}}`<br>`    ],`<br>`    as: "domain"`<br>`}}`<br>`// Unwind lookup result, promote fields`<br>`{$unwind: "$domain"},`<br>`{$addFields: {domain.p1: "$p1", domain.p2:`<br>`"$p2"}},`<br>`{$replaceRoot: {newRoot: "$domain"}},`<br>`// Outer join on existing documents`<br>`{`<br>`    $lookup:`<br>`    {`<br>`        from: <sourceColl>,`<br>`        let: {p1: "$p1", p2: "$p2", fieldToDensify:`<br>`"$fieldToDensify"},`<br>`        pipeline: [`<br>`            <preceding pipeline/cache>,`<br>`            {$match: {$expr: {$and: [{$eq:`<br>`["$$fieldToDensify", "$fieldToDensify"]},{$eq:`<br>`["$$p1","$p1"]}, {$eq: ["$$p2", "$p2"]} ]}}}`<br>`        ],`<br>`        as: UUIDGEN_AS,`<br>`    }`<br>`},`<br>`{$unwind: {path : '$UUIDGEN_AS',`<br>`preserveNullAndEmptyArrays: true}},`<br>`// Promote joined fields to root`<br>`{$addFields: {UUIDGEN_AS.fieldToDensify:`<br>`"$fieldToDensify", UUIDGEN_AS.p1: "$p1",`<br>`UUIDGEN_AS.p2: "$p2"}},`<br>`{$replaceRoot: {newRoot:`<br>`"$UUIDGEN_AS"}}`<br>`]` |
| This is the categorical (calculated) case. Same pipeline as the previous example, except the system lookup/group from the foreign collection to generate the domain. At least for now assumes "foreignColl" is unsharded.<br>The example above assumes that all values of "densifyField" in the source collection appear in the foreign collection's domain range. With the current $lookup any values that appear in the collection but not the foreign domain will not be in the output without a full join.<br>If the assumption is false, the system could begin the pipeline with a unionWith/group instead to calculate the unique densifyValues, then do a lookup on the source collections for a cross product on partitions, then proceed in the same way. The cost of this is the system will read the source collection an extra time, but may be safer if we're concerned about the domain. | |

Benefits
  Avoid sorting
    In the case where most of the values are present this is probably faster. In a sparse dataset this may not matter
  May support non-time series use cases
Hash Join Vs Loop Join
  One of the cons of this approach is that $lookup is slow, but one join implementation is a nested loop join. It is possible that if a hash join was used, performance could be improved.
Option B: Peek/Sort
New stage: $_internalMinMax
  This stage will only be generated from $densify and, in some implementations, will not be externally accessible. The code block is only to convey the structure of the stage.

$_internalMinMax: {field: <fieldName>}
When built it will take in a field name (the field to densify) and a pointer to some shared state with $_internalDensify. It will find the min and max values of the field, and populate those values in the shared state. It will pass on the documents as it gets them, making no changes to those documents.
New stage: $_internalDensify
  This stage will only be generated from $densify and will not be externally accessible. The code block is only to convey the structure of the stage.
{$_internalDensify: {field: <fieldName>, min: <value>, unit: <unit>max: <value>, partitionFields: [<field>, . . . ], step: <value>, range: <rangeSpec>}
When built internalDensify will be populated with all of the information needed to generate the new documents. This will be done either on construction, or by an $_internalMinMax stage that precedes it in the pipeline (depending on the 'range' argument of the original $densify). This stage will also assume that it is preceded by a '$sort' stage, and therefore the input is sorted on '{partitionFieldA: 1, <other partition fields>, field: 1}'.

The stage will use the existing PartitionIterator to iterate over the documents in each partition. For each document it will create the missing values between itself and the previous document (or the minimum value for the first document) before outputting the current document without any changes.

As part of this work the partition iterator will be modified to accept multiple partition expressions. We could also add a cacheless mode for the partition iterator, but it wouldn't be that much of an optimization as we expect to need to cache at most the current plus the previous document (implementation dependent)

Desugaring

Desugaring will depend on the existence of partitionFields and the range value specified. Note that none of the below examples include a "unit" field, but "unit" will appear alongside field whenever it is a date type.

| Original $densify | Generated pipeline |
|---|---|
| {<br>  $densify: {<br>    field: "fieldToDensify",<br>    step: 1<br>  }<br>} | [<br>  {$sort: {fieldToDensify: 1}},<br>  {$_internalDensify: {field: fieldName,<br>    step: 1, range:<br>    "full"}<br>] |
| {<br>  $densify: {<br>    field:<br>    "fieldToDensify",<br>    step: 1,<br>    range: "full"<br>  }<br>} | [<br>  {$sort: {fieldToDensify: 1}},<br>  {$_internalDensify: {field: fieldName,<br>    step: 1, range:"full"}<br>] |
| In the examples above there are no partitions, so $_internalDensify will start filling from the first value after the sort until the last value. ||
| {<br>  $densify: {<br>    field: "fieldToDensify",<br>    partitionFields: ["p1",<br>    "p2"],step: 1<br>  }<br>} | [<br>  {$_internalMinMax: { }},<br>  {$sort: {p1:1, p2:1, fieldToDensify: 1}},<br>  {$_internalDensify: {field: fieldName,<br>    step: 1,partitionFields: ["p1", "p2"],<br>    range: "full"}<br>] |
| When the partitionFields are added, we need the $_internalMinMax to figure out the initial value ||
| {<br>  $densify: {<br>    field: "fieldToDensify",<br>    partitionFields: ["p1",<br>    "p2"],step: 1,<br>    range: [−10, 10]<br>  }<br>} | [<br>  {$sort: {p1:1, p2:1, fieldToDensify: 1}},<br>  {$_internalDensify: {field: fieldName,<br>    step: 1,partitionFields: ["p1", "p2"],<br>    range:[−10,10]}<br>] |
| {<br>  $densify: {<br>    field: "fieldToDensify",<br>    partitionFields: ["p1",<br>    "p2"],step: 1,<br>    range: "partition"<br>  }<br>} | [<br>  {$sort: {p1:1, p2:1, fieldToDensify: 1}},<br>  {$_internalDensify: {field: fieldName,<br>    step: 1,partitionFields: ["p1", "p2"],<br>    range: "partition"}<br>] |
| In the examples above we have partition fields but range is specified as non-full. When the range argument is with respect to a given partition, the values can be inferred and $_internalMinMax is not needed. ||
| {<br>$densify: {<br>    field: "fieldToDensify",<br>    partitionFields: ["p1", "p2"],<br>}<br>} ||
| {<br>  $densify: {<br>    field: "fieldToDensify",<br>    partitionFields: ["p1", "p2"],<br>    domain: ["val1", "val2", "val3"]<br>  }<br>} ||

| Original $densify | Generated pipeline |
|---|---|
| This is the categorical (literal) case | |
| ```
{
  $densify: {
    field: "fieldToDensify",
    partitionFields: ["p1", "p2"],
    domain: {collection: "foreignColl", pipeline:
[<pipeline>]}
  }
}
``` | |
| This is the categorical (calculated) case | |

Benefits
  Sort will be fast on sparse data sets
  Reuses a lot of code
Additional Timeseries Implementations
Detailed Design—Time Series Collection Example Implementations
  The following describes several implementation options that can be used with various embodiments described herein. Such options and implementations may be used alone or in combination with any other options.
Terms
  Measurement: a set of related key-value pairs at a specific time.
  Time-series: a sequence of measurements over a period of time.
  Meta-data: the key-value pairs of a time-series that rarely change over time and serve to identify the time-series as a whole.
  Time-series collection: a MongoDB collection type representing a writable non-materialized view that allows storing and querying a number of time-series, each with different meta-data.
  Bucket: a group of measurements with the same meta-data over a limited period of time.
  Bucket collection: a system collection used for storing the buckets underlying a time-series collection. Replication, sharding and indexing are all done at the level of buckets in the bucket collection.
Design Principles
  No hard limits or restrictions on data that can be stored, as long as each input document (measurement) has a time. Flexible schema: it should be OK for each document to have different keys. Values can be documents and arrays. Nested documents are OK. The meta-data schema is flexible too.
  Buckets contain a variable window of time (up to some largish limit, say an hour), so users will get appropriate bucketing regardless of the frequency of their measurements. We expect dozens to on the order of a thousand measurements per bucket. Buckets may overlap in time.
  Only per-bucket data is ever indexed, so the number of storage engine operations will be O(buckets) rather than O(measurements).
  Deletion is generally done in batches of multiple buckets for the oldest measurements, and insertion is generally done near the most recent measurements. Anything else may be inefficient but will still be supported.
  Durability guarantees are the same as for regular insert operations.
  In Milestone 1 we don't aim to be more performant than someone implementing our recommended bucketing scheme manually. However, we expect our format may turn out more economical and faster than the manual implementation.
Downstream Visible Behavioral Changes
  A time-series collection is implemented as a kind of writable non-materialized view on an underlying collection holding a more efficient representation of the time-series data. The creation of a time-series collection mydb.X results in the creation of a collection mydb.system.buckets.X as well. Additionally, if the database has no views yet, a collection mydb.system.views is created. Like other system collections, users should not directly interact with these: they perform all insert and query operations on their time-series collection mydb.X.
  The create command has a new timeseries option to create time-series collections.
  listCollections now may return the collection type timeseries in addition to collection and view.
  insert operations on a time-series collection db.X result in an upsert of a document in the system.buckets.X collection.
  Query operations on a time-series collection translate into queries on the buckets collection.
Detailed Design Implementations
Time-series Collection Creation
Creating a time-series collection X with options as described above, consists of these steps:
  Create a bucket collection system.buckets.X for holding the time-series buckets:
    Set the validator option to a JSON schema enforcing constraints on bucket documents. This validation is only structural to prevent accidental corruption by users and cannot cover all constraints. Updates by mongod itself are valid by construction, so in some implementations, do not require validation. Leave the validationLevel and validationAction to their strict/error defaults. Validation includes the following:
      Top-level field types of the bucket. No fields other than those defined below.
      Field types of fields inside control as defined below.
      Field type of control.time
    Create bucket indexes, see below.
  Create a new entry in the system.views collection with a timeseries field in addition to the viewOn and pipeline fields.

```
Bucket Schema
{ _id: ObjectId(...),
  control: {
    version: 1,
    min: { _id: ..., time: ISODate("2020-09-09T16:54:04.174Z"), field0:
      0.01, ... },
    max: { _id: ..., time: ISODate("2020-09-09T16:54:04.450Z"), field0:
      0.99, ... },
  },
  meta: ...,
  data: { _id: { 0:..., 1: ..., ...},
    time: { 0: ISODate("2020-09-09T16:54:04.174Z"),
      1: ISODate("2020-09-09T16:54:04.450Z"), ...},
    field0: { 0: 0.99, 1: 0.01,...},
    field1: { 2: "high", 42: "low",...}, // Missing fields are omitted
    ...}
}
```

The _id is chosen by the server and is always an ObjectId. The time part reflects control.min.time, see insertion.

The control field is an object that includes the version number as well as min and max fields that hold the minimum and maximum value of each field as determined by the BSON comparison order, taking into account any specified collation. The minimum/maximum of two BSON documents or of two arrays is the field-by-field minimum or maximum.

The meta field may be of any BSON type and contains either the value of the metaField field as specified at collection creation time, or null if that field is absent. This means that measurements with explicit null metadata and absent metadata will be placed into the same bucket. Only measurements with an equal meta field (ignoring field order, and not considering collation) are included in the same bucket.

The data field is an object that contains a nested object for each field present in any of the inserted measurements. These nested objects have field names that are decimal string representations of an incrementing counter starting at "0", reflecting the number of measurements inserted so far.

The maximum number of measurements in a bucket is limited, and a bucket is full once this limit is reached. Proposed value: 1000.

The maximum size of the measurements in a bucket is limited, and a bucket is full once the BSON size of the data field exceeds the limit. Proposed value: 125 kB.

The maximum time-range of a bucket is limited, so index scans looking for buckets containing a time T only need to consider buckets that are newer than T-limit. Possible value: 1 hour.

These values mean that for measurements smaller than approximately 128 bytes (excluding meta field) the capacity is limited by count and otherwise by size.

Bucket Indexes

The _id index of the bucket collection can be, in some implementations, a clustered index, so for bucket collections the _id will then equal the RecordId.

Specifying the expireAfterSeconds option makes the _id index become a TTL index.

Bucket Catalog

The global bucket catalog has an in-memory thread-safe ordered map indexed by a tuple <nss, metadata, _id>. For each bucket it contains:

A vector of measurements to be inserted.

The data size of the bucket, which is the total BSON size of the data object of the BSON serialization of the bucket, including measurements to be inserted.

The total number of measurements in the bucket, including uncommitted measurements and measurements to be inserted.

The number of committed measurements in the bucket.

The number of current writers.

A set containing all new top level field names of the measurements to be inserted.

The set of top level field names of the measurements that have been inserted into the bucket.

Most recent commit info, such as the timestamp, cluster time, etc. required for the update return.

The catalog also has an "idle bucket" queue with references to all buckets that do not have writers. This queue allows expiring entries in the bucket catalog if their total size exceeds some (big) threshold. On step-down this queue is flushed, so the bucket catalog is empty.

The catalog serves two main purposes:

Allow efficient discovery of buckets that are not full for given meta-data and time.

Synchronize and batch concurrent updates to the same bucket.

Time-Series Insertion

One goal is to transform an insert of a measurement into a time-series collection (which is much like a writable non-materialized view) into an insert or update on the bucket collection. The measurement is first added to the in-memory bucket's vector of measurements to be inserted, then one writer takes all pending inserts, turns them into an upsert and commits, repeating until all writes are committed.

For inserting a measurement X with metadata M with time field value T in a time-series collection C, atomically do the following:

Get a bucket B from the bucket catalog that is not full, has a namespace matching that of C, the same metadata M, and the largest _id such that _id.getTimestamp( )≤T. If no such bucket exists, generate a new bucket B with an _id equal to a newly generated ObjectId whose timestamp is forced to be equal to that of T rounded down to second granularity.

Increment the bucket's number of current writers.

Add X to B's vector of measurements to be inserted.

Increment the bucket's total number of measurements.

For each new top level field name N in X, update the bucket data size to account for an empty object with name N and add N to the set of top level names to be inserted.

For each BSON element in X, except metadata, add the element size to the bucket data size, taking into account that the name will be changed to a positional number.

Return the number of committed measurements and the number of uncommitted measurements to the caller (the insert operation) which either becomes a committer or a waiter, see below.

If the above action returns with number of uncommitted measurements equal to 1, the operation that did the insert has become a committer and must perform the following actions until the number of uncommitted measurements is zero:

Atomically retrieve a set of measurements to be committed:

Swap the vector of measurements to be inserted with an empty vector.

Merge the set of new field names into the set of all inserted field names and clear the set of new field names.

Rewrite the measurements inserts into a single update or insert operation, similar to:

```
db.x.update({ObjectId("5f62dbd3cf977776758918ac"),
  {$max:{"control.max.x":1}, // This is a simplification:
   $min:{"control.min.x":1}, // see Bucket Schema above.
   $set:{"data._id.1": ObjectId("5f62dcfacf977776758918ad"),
     "data.time.1": ISODate("2020-09-17T03:50:18Z"),
     "data.x.1": 1}}});
```

See below for caveats on updating buckets.
Execute the update.
Update the number of committed measurements in the bucket and notify any waiters.
Once there are no more uncommitted measurements, the committer does the following:
Decrement the number of writers, and if it reaches zero, the committer pushes the bucket onto the queue of idle buckets, destroying as many old idle buckets as necessary to stay within limits.
Generate a response, possibly indicating failure, for the insert command to share with all waiters.
When the number of uncommitted measurements is greater than 1, the insert operation is a waiter, and must wait until the number of committed measurements is such that it includes the insert. In that case, the waiter does the following:
Read any required commit info and generate a result for the insert operation.
Decrement the number of writers for the bucket, and if it reaches zero the waiter pushes the bucket onto the queue of idle buckets, destroying as many old idle buckets as necessary to stay within limits.

Details Updating Time-Series Buckets
The actual update using $set as illustrated above results in measurement data subdocuments with their keys sorted lexicographically rather than numerically. This is a result of $set inserting new elements in their sorted location rather than at the end. Fortunately, the new delta (v: 2) oplog entries can express the desired semantics without full replacement, so we update using these semantics.
We directly construct the delta update format, so we use the same diff applier code for the actual bucket update both as primary and as secondary.
We may need to special-case delta updates that add new fields to be more efficient in order to achieve customer expectations. The performance goals in this project only concern bulk load as done by TSBS, which uses more efficient inserts rather than updates.

Time-Series Collection Dropping
The drop command will automatically drop both the time-series collection and the underlying buckets collection. We'll prohibit users from dropping the system.views collection if there are time-series collections. Interruption of the dropDatabase command can cause an orphaned buckets collection, as can some other scenarios such as interrupted initial sync, or a partial restore. Retrying the operation will fix that.

Example Special-Purpose Computer System

A special-purpose computer system can be specially configured as disclosed herein. According to one embodiment the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 8:
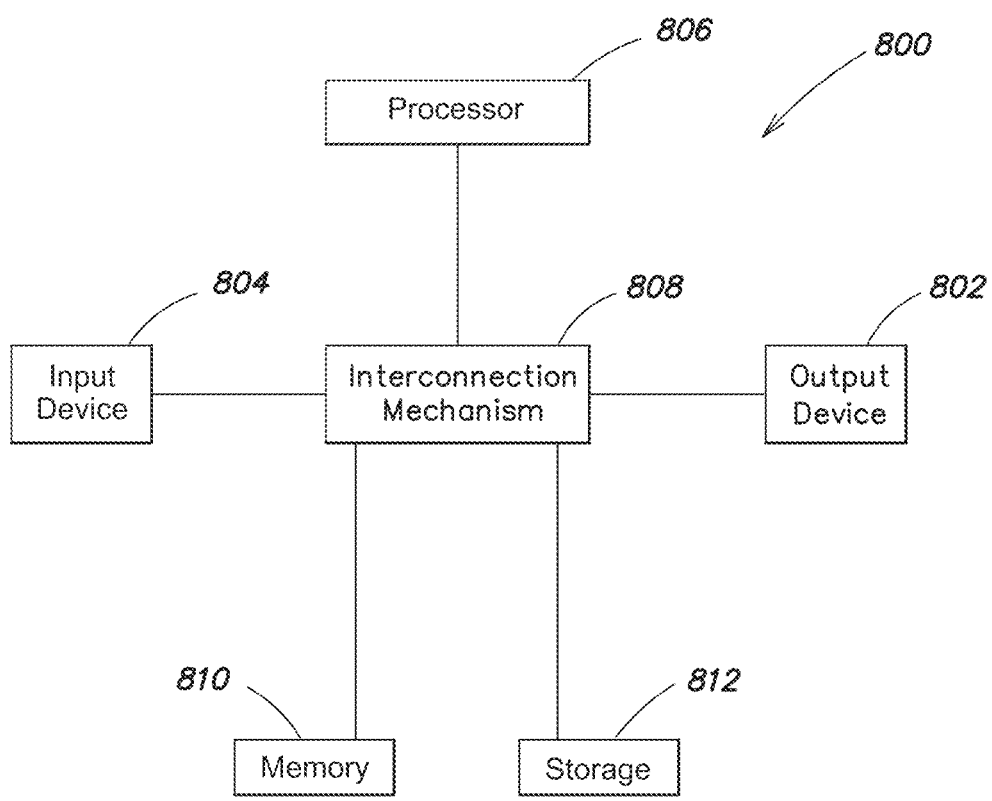
FIG. 8 is a block diagram of an example special-purpose computer system according to some embodiments.

FIG. 8 shows a block diagram of an example special-purpose computer system 800 on which various aspects of the present invention can be practiced. For example, computer system 800 may include a processor 806 connected to one or more memory devices 810, such as a disk drive, memory, or other device for storing data. Memory 810 is typically used for storing programs and data during operation of the computer system 800. Components of computer system 800 can be coupled by an interconnection mechanism 808, which may include one or more busses (e.g., between components that are integrated within a same machine) and/or a network (e.g., between components that reside on separate discrete machines). The interconnection mechanism enables communications (e.g., data, instructions) to be exchanged between system components of system 800.

Computer system 800 may also include one or more input/output (I/O) devices 802-804, for example, a keyboard, mouse, trackball, microphone, touch screen, a printing device, display screen, speaker, etc. Storage 812 typically includes a computer readable and writeable nonvolatile recording medium in which computer executable instructions are stored that define a program to be executed by the processor or information stored on or in the medium to be processed by the program.

Figure 9:
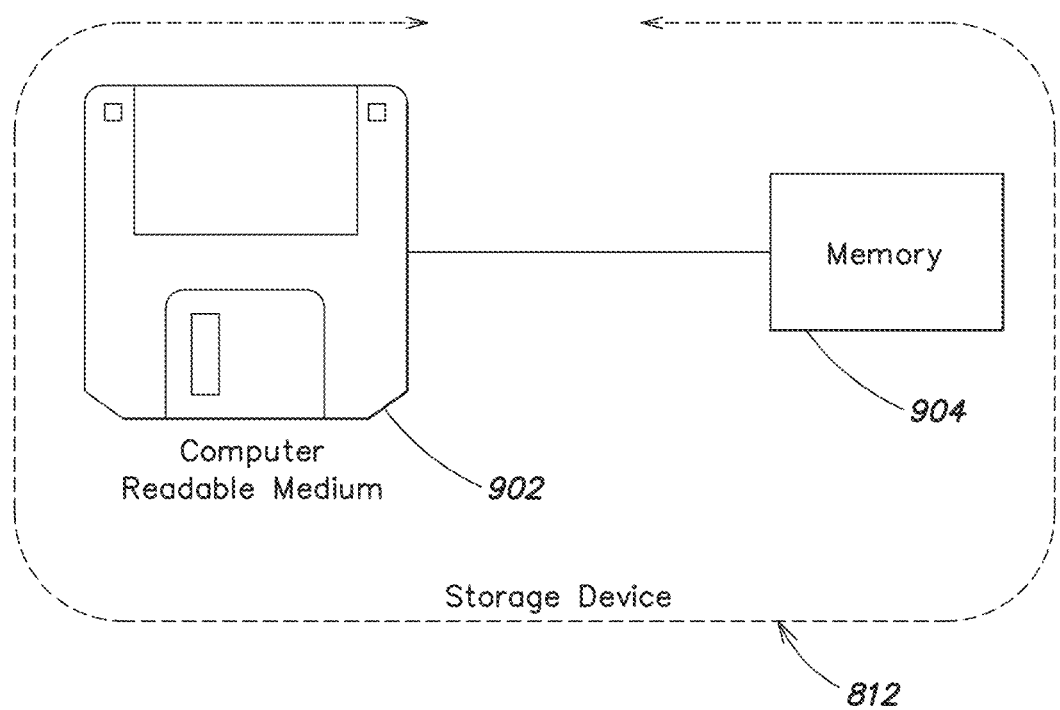
FIG. 9 is a block diagram of an example disk or flash memory according to some embodiments.

The medium can, for example, be a disk 902 or flash memory as shown in FIG. 9. Typically, in operation, the processor causes data to be read from the nonvolatile recording medium into another memory 904 that allows for faster access to the information by the processor than does the medium. This memory is typically a volatile, random access memory such as a dynamic random-access memory (DRAM) or static memory (SRAM). According to one embodiment, the computer-readable medium comprises a non-transient storage medium on which computer executable instructions are retained.

Referring again to FIG. 9, the memory can be located in storage 812 as shown, or in memory system 1110. The processor 1106 generally manipulates the data within the memory 810, and then copies the data to the medium associated with storage 812 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 800 is shown by way of example, as one type of computer system upon which various aspects of the invention can be practiced, it should be appreciated that aspects of the invention are not limited to being implemented on the computer system as shown in FIG. 8. Various aspects of the invention can be practiced on one or more computers having a different architectures or components than that shown in FIG. 8.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

A distributed system according to various aspects may include one or more specially configured special-purpose computer systems distributed among a network such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

CONCLUSION

Having thus described several aspects and embodiments of this invention, it is to be appreciated that various alterations, modifications and improvements will readily occur to those skilled in the art. Such alterations, modifications, and improvements are intended to be part of this disclosure and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system comprising:
   at least one processor configured to execute a database engine configured to:
   store, in a database, a plurality of timeseries events as a plurality of documents within a bucket in a columnar format, each of the plurality of documents comprising a time value for one of the plurality of timeseries events and metadata associating the document with a common source of the plurality of timeseries events,
   wherein the bucket stores the time values of the plurality of documents in the columnar format and the bucket further stores common metadata that is common to the plurality of documents, the common metadata associating the plurality of documents with the common source of the plurality of time series events; and
   perform an unpacking of the bucket using a pipeline operator.

2. The system according to claim 1, wherein the database engine is configured to unpack one or more of the plurality of timeseries events from the bucket.

3. The system according to claim 1, wherein the database engine is configured to identify one or more buckets of a data collection identified in the database to unpack.

4. The system according to claim 2, wherein the database engine is configured to unpack the one or more of the plurality of timeseries events from the bucket one event at a time.

5. The system according to claim 1, wherein the database engine is configured to inspect a top-level data region of the bucket based on field names and wherein the database engine is further configured to construct a list of events to unpack from the bucket.

6. The system according to claim 1, wherein the database engine is configured to store a time-based event that is represented by a single logical document.

7. The system according to claim 1, wherein the database engine is configured to create an on-demand materialized view of the plurality of documents responsive to an unpacking event.

8. The system according to claim 7, wherein the on-demand materialized view of the plurality of documents is an independent collection of data.

9. The system according to claim 8, wherein the independent collection of data is created within a pipeline processing stage using at least one pipeline operator.

10. A method comprising acts of:
    executing, by at least one processor, a database engine, the executing comprising:
    storing, by the database engine in a database a plurality of timeseries events as a plurality of documents within a bucket in a columnar format, each of the plurality of documents comprising a time value for one of the plurality of timeseries events and metadata associating the document with a common source of the plurality of timeseries events,
    wherein the bucket stores the time values of the plurality of documents in the columnar format and the bucket further stores common metadata that is common to the plurality of documents, the common metadata associating the plurality of documents with the common source of the plurality of time series events; and
    performing an unpacking of the bucket using a pipeline operator.

11. The method according to claim 10, further comprising an act of unpacking one or more of the plurality of timeseries events from the bucket.

12. The method according to claim 10, further comprising an act of identifying one or more buckets of a data collection identified in the database to unpack.

13. The method according to claim 11, further comprising an act of unpacking the one or more of the plurality of timeseries events from the bucket one event at a time.

14. The method according to claim 10, further comprising an act of inspecting a top-level data region of the bucket based on field names and constructing a list of events to unpack from the bucket.

15. The method according to claim 10, further comprising an act of storing a time-based event that is represented by a single logical document.

16. The method according to claim 10, further comprising an act of creating an on-demand materialized view of the plurality of documents responsive to an unpacking event.

17. The method according to claim 16, wherein the on-demand materialized view of the plurality of documents is an independent collection of data.

18. The method according to claim 17, wherein the independent collection of data is created within a pipeline processing stage using at least one pipeline operator.

19. The system according to claim 1, wherein the database comprises a flexible schema database and the metadata comprises a key-value pair.

20. The method according to claim 10, wherein the database comprises a flexible schema database and the metadata comprises a key-value pair.

21. A database system, comprising:
a database; and
at least one processor configured to store timestamped measurements in the database using a bucket data structure at least in part by:
storing, in the bucket data structure, time values of a plurality of documents in a column, each of the plurality of documents representing a timestamped measurement of the timestamped measurements and comprising a time value of the time values and a metadata value; and
storing, in the bucket data structure, a common metadata value that matches the metadata value of the plurality of documents, wherein the common metadata value associates the plurality of documents with a source that generated the timestamped measurements represented by the plurality of documents,
wherein the at least one processor is further configured to unpack the bucket data structure using a pipeline operator.

22. The database system of claim 21, wherein the bucket data structure comprises a plurality of columns storing data values of the plurality of documents, and the common metadata value is stored outside of the plurality of columns.

* * * * *